(12) United States Patent
Aritsuka et al.

(10) Patent No.: US 7,675,410 B2
(45) Date of Patent: Mar. 9, 2010

(54) SENSOR-NET SYSTEMS AND ITS APPLICATION SYSTEMS FOR LOCATIONING

(75) Inventors: Toshiyuki Aritsuka, Kodaira (JP); Norio Ohkubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 11/797,749

(22) Filed: May 7, 2007

(65) Prior Publication Data

US 2008/0164997 A1 Jul. 10, 2008

(30) Foreign Application Priority Data

May 8, 2006 (JP) ............... 2006-128846

(51) Int. Cl.
*G08B 1/08* (2006.01)
(52) U.S. Cl. .................. 340/539.1; 455/456.1; 370/310
(58) Field of Classification Search ............. 340/539.1; 455/456.1; 370/310
See application file for complete search history.

(56) References Cited

U.S. PATENT DOCUMENTS

| | | | | |
|---|---|---|---|---|
| 6,754,199 B1 * | 6/2004 | Choi et al. | ............... | 370/342 |
| 7,035,240 B1 * | 4/2006 | Balakrishnan et al. | ...... | 370/338 |
| 7,130,538 B2 * | 10/2006 | Wetzel et al. | ................ | 398/45 |
| 7,352,280 B1 * | 4/2008 | Rockwood | ................. | 340/521 |
| 2004/0137915 A1 * | 7/2004 | Diener et al. | ............ | 455/456.1 |
| 2005/0141465 A1 * | 6/2005 | Kato et al. | ................... | 370/337 |
| 2006/0253570 A1 * | 11/2006 | Biswas et al. | ............... | 709/224 |
| 2007/0076638 A1 * | 4/2007 | Kore et al. | ................... | 370/310 |
| 2007/0133469 A1 * | 6/2007 | Shin et al. | ................... | 370/331 |
| 2007/0195759 A1 * | 8/2007 | Chowdhury et al. | ......... | 370/389 |
| 2007/0223497 A1 * | 9/2007 | Elson et al. | ................. | 370/400 |
| 2007/0262863 A1 * | 11/2007 | Aritsuka et al. | ........ | 340/539.22 |
| 2008/0016440 A1 * | 1/2008 | Liu et al. | .................... | 715/700 |
| 2008/0080441 A1 * | 4/2008 | Park et al. | ................... | 370/338 |
| 2008/0164997 A1 * | 7/2008 | Aritsuka et al. | ........ | 340/539.13 |
| 2009/0100173 A1 * | 4/2009 | Nagoya et al. | .............. | 709/224 |

FOREIGN PATENT DOCUMENTS

| | | |
|---|---|---|
| JP | 08-129061 | 10/1994 |
| JP | 11-178042 | 12/1997 |
| JP | 2002-533692 | 12/1999 |
| JP | 2004-112482 | 9/2002 |
| JP | 2005-525003 | 9/2002 |
| JP | 2004112482 A * | 4/2004 |
| WO | WO 00/38460 | 6/2000 |
| WO | WO 03/021851 A2 | 3/2003 |

* cited by examiner

*Primary Examiner*—Benjamin C Lee
*Assistant Examiner*—Bradley E Thompson
(74) *Attorney, Agent, or Firm*—Stites & Harbison PLLC; Juan Carlos A. Marquez, Esq.

(57) ABSTRACT

The position of a node is identified. There is provided a module for identifying the position of a node using a locator node that sniffs communication of the node in a sensor network system capable of continuously tracking a situational change in the state, position or the like of people or an object.

20 Claims, 38 Drawing Sheets

FIG. 12
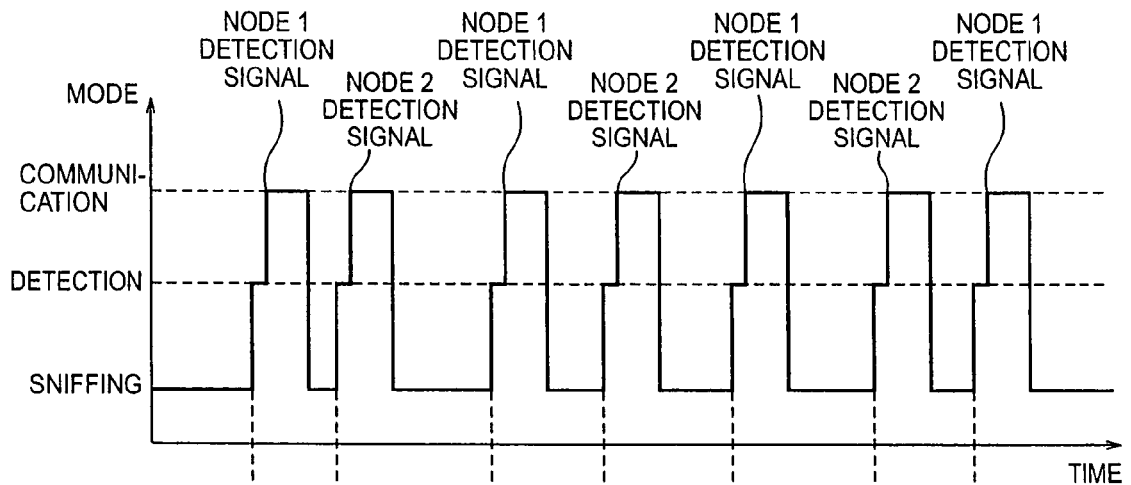
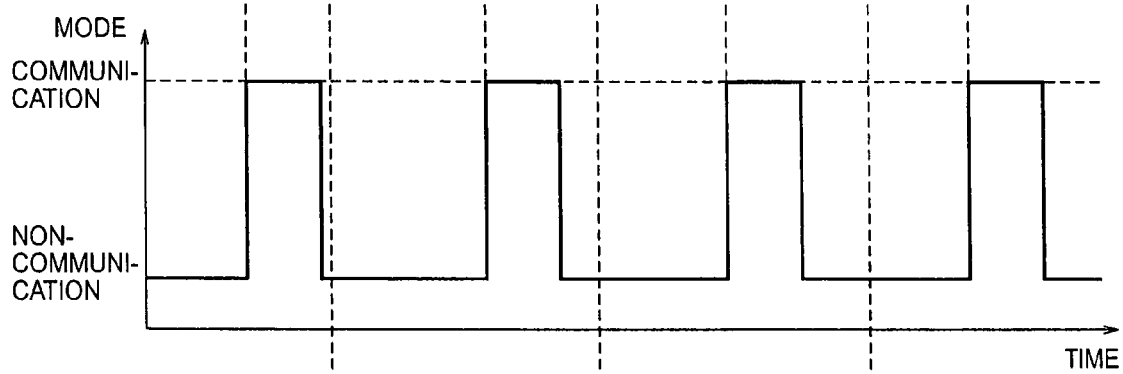
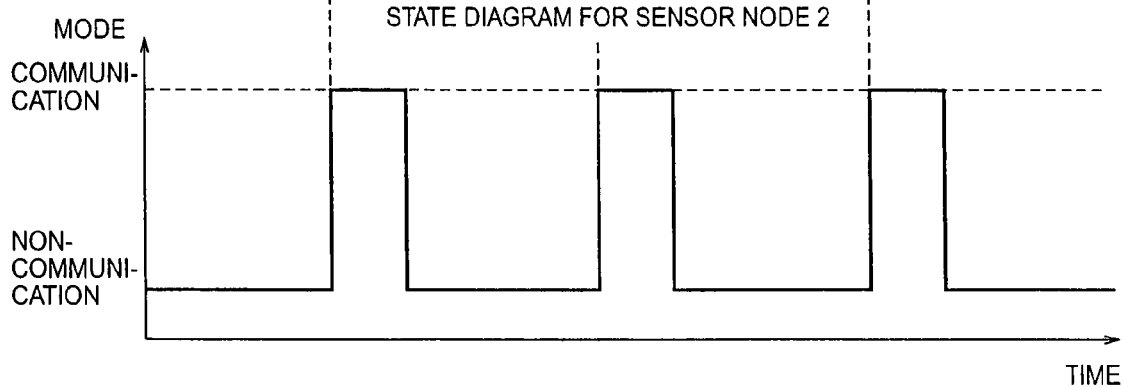

STATE DIAGRAM FOR LOCATOR NODE (SUCCESSIVE COMMUNICATION TYPE)

FIG. 25

SENSOR INFORMATION TABLE (STB)

| DATA ID | SENSOR TYPE | MEANING | MEASURED DATA | INSTALLATION PLACE | OBSERVATION INTERVAL | DATA LINK POINTER |
|---|---|---|---|---|---|---|
| 01 | NAME TAG | LOCATION | NONE | PS-1 | 3s | DDS1/home/·· |
| 02 | TEMPERATURE | TEMPERATURE | TEMPERATURE | FIRST CONFERENCE ROOM | 60s | DDS2/home/·· |
| 03 | HUMIDITY | HUMIDITY | HUMIDITY | FIRST CONFERENCE ROOM | 60s | DDS1/home/·· |
| 04 | HUMAN SENSOR | PRESENCE OF PEOPLE | 1/0 | ENTRANCE | EVENT | DDS1/home/·· |
| | | | | | | |

EVENT TABLE (ETB)

| DATA ID (DID) | EVENT CONTENTS (EVT) | DATA HOLDER (DHL) |
|---|---|---|
| XXX | >A1 | Yes |
| YYY | =p1 | No |
| | | |

ACTION ANALYSIS SETTING SEQUENCE

SINGLE ACTION SETTING SEQUENCE

SENSOR-NET SYSTEMS AND ITS APPLICATION SYSTEMS FOR LOCATIONING

CROSS-REFERENCE TO RELATED APPLICATION

The present invention is related to U.S. patent application Ser. No. 11/797,574 (Hitachi Docket No. 310600323US01) filed, May 04, 2007 entitled "Sensor Network System and Sensor Network Position Specifying Method" claiming the Convention Priority based on Japanese Patent Application No. 2006-128849 filed on May 8, 2006.

INCORPORATION BY REFERENCE

The present application claims priority from Japanese application JP2006-128846 filed on May 8, 2006, the content of which is hereby incorporated by reference into this application.

BACKGROUND OF THE INVENTION

The present invention relates to sensor network systems capable of continuously tracking a situational change in the state, position or the like of people or an object, and in particular relates to the fields in which locationing of a mobile object is effective.

Conventionally, in the fields of: the security management with respect to behavior of people in buildings, urban areas and the like; the commodities management in distribution process in warehouses, stores and the like; the health and safety management of people in medical facilities or homes; and the condition monitoring of pets, livestock and the like, there has been proposed and also been put in practical use a method in which a tag provided with a means for transmitting an ID capable of identifying the individual to the outside is attached to mobile objects such as people, commodities, animals or the like, and then the information on the tag is read from the outside, thereby managing the mobile objects.

In managing a mobile object, one of the important information to be managed is the position of the mobile object in addition to the identification of the individual by means of an ID. By combining the ID and the position of a mobile object with a time when it is observed, it is possible to obtain information, such as the current position of a specific mobile object, a route of movement, relation between a plurality of mobile objects, relation with an observed field, and the like. In the above-described fields, for example, a situation of breaking into a restricted entry area by a facility worker, tracing of a distribution channel of commodities, checking of a patient's location, and the like can be grasped from the above information.

As a method for identifying the position of a mobile object, there is disclosed a method for using a wireless terminal such as a mobile phone, as a tag for sending an ID, and a base station for communicating with the wireless terminal. For example, there is a method in which wireless communication base stations are arranged such that the communication areas may not overlap to each other, and when a wireless terminal communicates with the nearest base station, the position of this wireless terminal is assumed to be the position of the base station to which this communication is carried out.

There is also a method, in which a means for measuring time until a signal of a wireless terminal reaches a base station is provided, and at least three or more base stations receive the signal wave from the wireless terminal simultaneously, and based on the measuring results of the differences in time when the radio wave reached, the distance between each base station and the terminal is estimated and thus the position is identified based on the principle of trilateration (see JP-A-08-129061 for example).

There is also a method in which in place of the time difference, the distance between each base station and a terminal is estimated from the difference in the radio field strength of signals received from the terminal to thereby identify the position based on the principle of trilateration (see JP-A-11-178042 for example).

Moreover, as a method for identifying the position of a wireless terminal based on the principle of trilateration, there is a method in which a statistical model of the radio field strength is determined by a training for each target space, and then by using this model the measurement error is reduced (see JP-A-2004-112482 and JP-A-2005-525003 for example).

SUMMARY OF THE INVENTION

In using a wireless terminal as a tag attached to a mobile object in the application field of the above-described background art, a longer wireless communicable distance is advantageous in that the installation interval of base stations at the communication destination can be extended. On the other hand, any application field requests that the position of a mobile object is observed as accurately as possible.

In this regard, the conventional method of regarding the position of a communicating base station as the position of a wireless terminal has a problem in that the error increases when the communication distance between the terminal and the base station is long.

Because the method for locationing based on trilateration which JP-A-08-129061 and JP-A-11-178042 disclose use of at least three or more base stations as the reference for locationing, it is necessary to arrange the base stations sufficiently closely so that a terminal can communicate with three or more base stations simultaneously. Moreover, in order to estimate the position of a terminal with sufficient accuracy, the position of each base station needs to be determined accurately in advance.

Moreover, in the trilateration method based on the distance estimation using a time difference, the method being disclosed in JP-A-08-129061, in order to obtain as high measurement accuracy as possible, a means for precisely carrying out time synchronization between base stations is required because the time periods during which the base stations carried out communication with a terminal need to be compared accurately.

In the trilateration method based on the distance estimation using the radio field strength, the method being disclosed by JP-A-11-178042, the radio field strength needs to be measured accurately in order to obtain as high measurement accuracy as possible. However, in the application places in the above-described background arts, the radio field strength is affected by static and dynamic conditions of propagating environment, such as presence of objects that absorb or reflect the radio wave, such as walls, floors, the arrangement and material of installation objects, existing people and articles and the like, as well as humidity, other radio waves and the like. Thus, it is difficult to identify the position of a terminal with sufficient accuracy. In this respect, although JP-A-2004-112482 and JP-A-2005-525003 disclose determining of a statistic model, the characteristics of a target space need to be exhaustively measured for modeling. Moreover, a complicated computation needs to be carried out in order to determine the position.

Moreover, in any of the above-described conventional arts, the distance between a terminal and a base station may extend to the maximum value of the communicable distance at the longest, and one or more objects that shield the radio wave may exist or may appear in between the terminal and the base station. In that case, locationing is not possible. Moreover, in the above-described conventional arts, a terminal typically needs to transmit a signal for locationing.

A summary of a representative one among the present inventions disclosed in the present application will be described briefly as follows. A sensor-net system comprised of: a node including a sensor for obtaining a sensing data, a first controller that generates a first transmit data including the sensing data and a node ID information, and a first wireless processor that transmits the first transmit data to a base station; a locator node including a second wireless processor that sniffs a transmit data from the node to the base station when the node exists in a detection area of the locator node, and a second controller that extracts the node ID information from the transmit data and generates a second transmit data including the extracted node ID information and a locator node ID information; a base station including a node communication processor that receives the first transmit data and extracts the first node ID information when the node exists in a communication area of the base station, and receives the second transmit data and extracts the second node ID information and the locator node ID information when the second transmit data is transmitted from the locator node, and a node manager that transmits to a server the ID information extracted from at least one of the first transmit data and the second transmit data; and a server including an event-action manager that receives the ID information, a recording part that records in a locator node position table that relates the locator node ID information to a position of the locator node, and a database manager that identifies the position of a node existing in at least one of the detection area and the communication area, using the received ID information and the locator node position table.

The advantages of the present invention are as follows. It is not necessary to estimate the accurate distance between a base station and a sensor node, thus eliminating the need for precise locationing of the base station. Accurate time synchronization between base stations is not required, thus eliminating the need to arrange base stations closely. Complicated computation for reducing the effects of fluctuation in the radio field strength is not required. The sensor node does not need to transmit a signal for locationing, thus allowing the power consumption of the sensor node to be reduced.

Other objects, features and advantages of the invention will become apparent from the following description of the embodiments of the invention taken in conjunction with the accompanying drawings.

BRIEF DESCRIPTION OF THE DRAWINGS

FIG. 12 is a view explaining an example of the state diagram of a locator node.

FIG. 23 is an explanatory view showing an example of an arrangement of wireless sensor nodes and the like.

FIG. 25 is an explanatory view showing an example of a sensor information table.

DETAILED DESCRIPTION OF THE EMBODIMENTS

The present invention eliminates the need for complicated processing, such as precisely locationing a base station and the like, by identifying the position of a node with the use of a locator node.

Hereinafter, embodiments of the present invention will be described with reference to the accompanying drawings.

Figure 1:
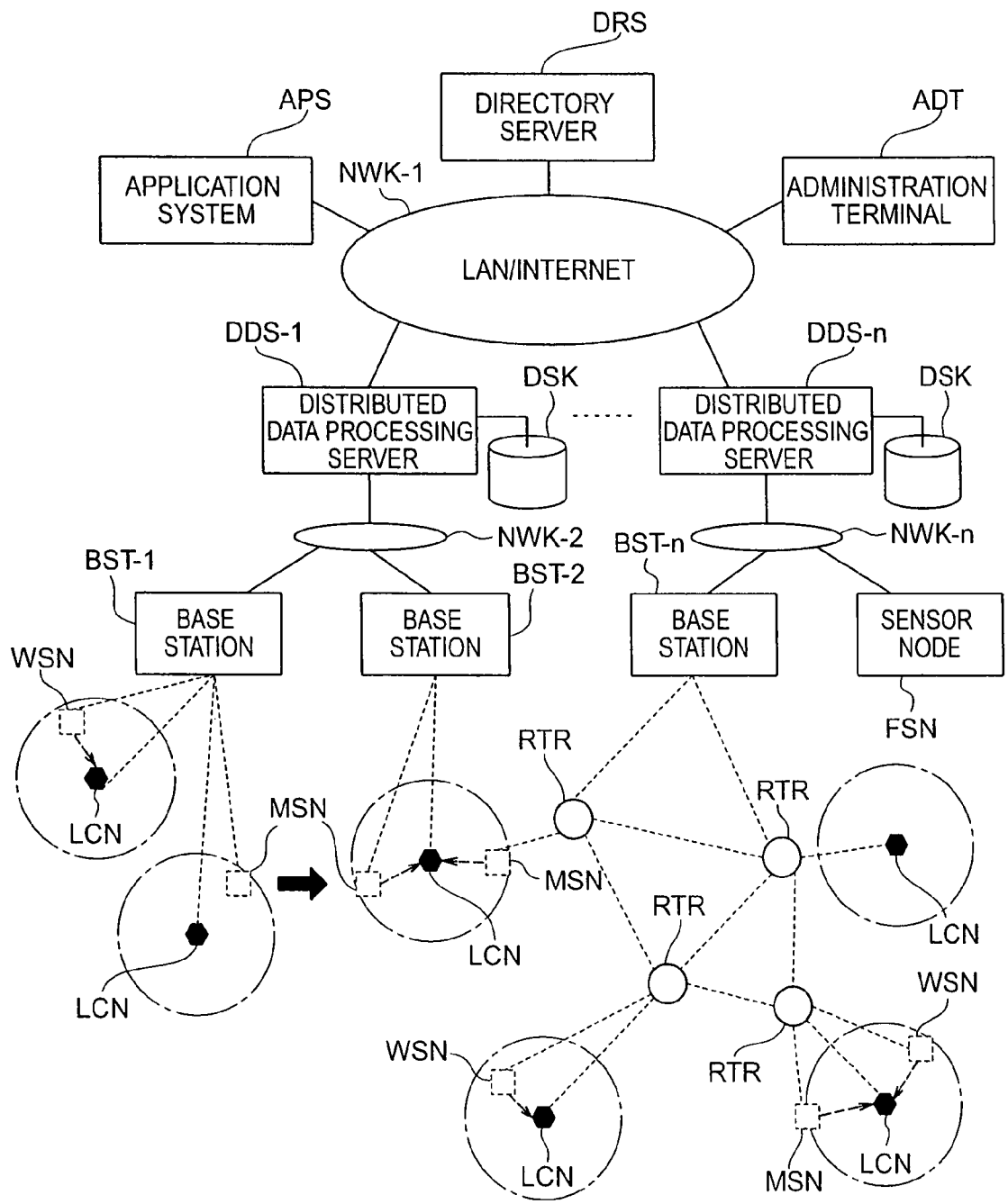
FIG. 1 is a configuration diagram showing an example of a sensor network system for identifying the position of a sensor node using a locator node.

FIG. 1 is a configuration diagram of a sensor network system for identifying the position of a sensor node by using a locationing locator node that sniffs the communication from the sensor node. Although in this specification, a base station BST, a distributed data processing server DDS, and a directory server DRS are disclosed as one embodiment, these components may be included in one data processing server, so that one data processing server may implement these components.

<Outline of Sensor Network System SNS Configuration>

A sensor node WSN (wireless sensor node) and a sensor node MSN (wireless mobile sensor node) are installed at predetermined positions or mounted to predetermined objects or humans or the like to collect pieces of information regarding environments or the mounted objects and to transmit the pieces of information to base stations BST-1 to BST-n. The sensor nodes include the wireless sensor node WSN and the wireless mobile sensor node MSN connected to the base stations BST-1 to BST-n by a wireless network, and a wired sensor node FSN connected to a network NWK-n by a wired line.

For example, a fixedly installed wireless sensor node WSN is configured such that a mounted sensor senses a surrounding situation periodically, and transmits sensing information to a preset base station BST directly or through a router RTR that relays wireless communication. The wireless mobile sensor node MSN is presumed to be installed in a mobile object and be mobile, e.g., carried by a human or mounted on a car, and transmits information directly to a near base station BST or through a near router RTR to a base station BST, to which the router RTR is connected.

Moreover, the locator node LCN is installed in a predetermined position, detects sensor nodes existing therearound, and transmits information on a detected sensor node directly to the base stations BST-1 to BST-n or through the router RTR that relays wireless communication. The locator node LCN has a function to sniff the communication which a sensor node transmits to the base station BST or the router RTR, and detects the sensor node when the sensor node appears within a predetermined specific distance from the locator node LCN, and transmits the detected information to the base station BST.

In addition, the router RTR may exist between the sensor node WSN or MSN and the base station, or may constitute a multi-hop type relay network that connects a plurality of routers RTR with a bus and relays, or a mesh type relay network that connects a plurality of routers RTR in a mesh form and relays.

Here, the wireless sensor nodes are indicated by WSN or MSN as a whole (generically), and the individual wireless sensor nodes are indicated by suffixes such as WSN-1 to WSN-n or MSN-1 to MSN-n. Hereinafter, similarly, other components are generically represented without any suffixes, and individually represented by suffixes "-1 to -n".

One or more wireless sensor nodes WSN, MSN, and locator nodes LCN are connected to the base stations BST-1 to BST-n each, and the base stations BST-1 to BST-n each are connected to the distributed data processing servers DDS-1 to DDS-n that collect data from each sensor node through networks NWK-2 to NWK-n. In addition, the networks NWK-2 to NWK-n connect the base station BST to the distributed data processing server (distributed server) DDS. The distributed data processing server DDS can vary the number of connections depending on a system size. Moreover, it is assumed that the communication between the sensor node WSN or MSN, or the locator node LCN and the base station BST may be directly carried out as described above unless otherwise stated, or may be carried out through a transit network by means of the router RTR, and that the sensor network system described in this embodiment has a function to control this transit network. The function to control the transit network will not be described in detail here because the function used in an ordinary wireless transit network can be applied.

The distributed data processing servers DDS-1 to DDS-n each include a disk system DSK to store data and the like which the wireless and wired sensor nodes (hereinafter, referred to simply as "sensor nodes") each detect, and a CPU and a memory (not shown), and executes a predetermined program. As described below, the distributed data processing server DDS carries out actions, such as collecting measured data from sensor nodes, storing and processing the data in accordance with predefined conditions, and notifying or transferring the data to the directory server (management server) DRS or another server through the network NWK-1. In addition, the network NWK-1 is composed of a LAN, the Internet, or the like.

Here, the data collected from a sensor node is mainly an inherent ID for identifying the sensor node, and a sensed numeric data, and the data collected from the locator node LCN is mainly an inherent ID for identifying the locator node LCN and an inherent ID for identifying the sensor node which the locator node LCN detected, and although each data expresses a change in the chronological order, each data itself is not in a form to be readily used by an application system APS. Then, in the directory server DRS, the output data of a sensor node is converted into a real world model (humans, objects, states, or the like) based on a predetermined definition, the real world model being readily used by the application system APS, and is provided to the application system APS.

In addition, targets, from which the distributed data processing servers DDS-1 to DDS-n collect data, are the sensor node and locator node LCN belonging to the base station BST of the networks NWK-2 to NWK-n to which the distributed data processing servers are connected, and the wireless sensor node MSN that has moved from another base station BST. Moreover, the wired sensor node FSN may be connected to the distributed data processing servers DDS-1 to DDS-n. Needless to say, the wired sensor node FSN can be connected to the base station BST, and the base station BST can manage the wired sensor node FSN in the same manner as the wireless sensor node.

To the network NWK-1, there are connected the directory server DRS that manages a real world model that is related to pieces of sensing information sent from the distributed data processing server DDS, a manager administration terminal ADT that carries out the setting and management of the directory server DRS, the distributed data processing server DDS, the base station BST, and the sensor node, and the application system APS that utilizes pieces of information of this directory server DRS. In addition, the administration terminal may be prepared for a sensor manager who manages sensor nodes and for a service manager who manages services of the sensor network, respectively.

The directory server DRS comprises a CPU and a memory, and a storage system (not shown), and executes a predetermined program and manages objects that are related to significant information as described below. In other words, when the application system APS requests access to a real world model through an application interface, the directory server DRS accesses the distributed data processing servers DDS-1 to DDS-n that possess the measured data corresponding to the real world model, and obtains the corresponding measured data and converts the sensing data into a form to be readily used by the application system APS, as required, and passes this to the application system APS.

In this example, the sensor-net system is configured using the base station BST that carries out communication, the base station BST being coupled with the sensor nodes and the locator nodes LCN, the distributed data processing server DDS for collecting information on the sensor node and the locator node LCN through BST, and the directory server DRS for managing a real world model that is related to the sensing information of the distributed data processing server DDS as described above. However, the base station BST, the distributed data processing server DDS, and the directory server DRS may be configured on the same hardware. In addition, in an example of configuring a communication network between a node and a base station with a wireless network or the like within a relatively short distance, the base stations need to be arranged within a communicable distance from the node. Then, if only the base station function is separated, the configuration of one base station becomes simple and the size and cost can be reduced, so that many base stations can be arranged at various places in an observation field. As a result, the entire field can be made a communicable area at relatively low cost. On the other hand, for example, if one distributed data processing server is arranged in one observation field to carry out management and data collection of nodes of the entire field, and also the directory server manages a plurality of observation fields, then an advantage can be obtained that the decentralization of processing and the supervision of the sensor-net system are easily carried out.

Figure 2:
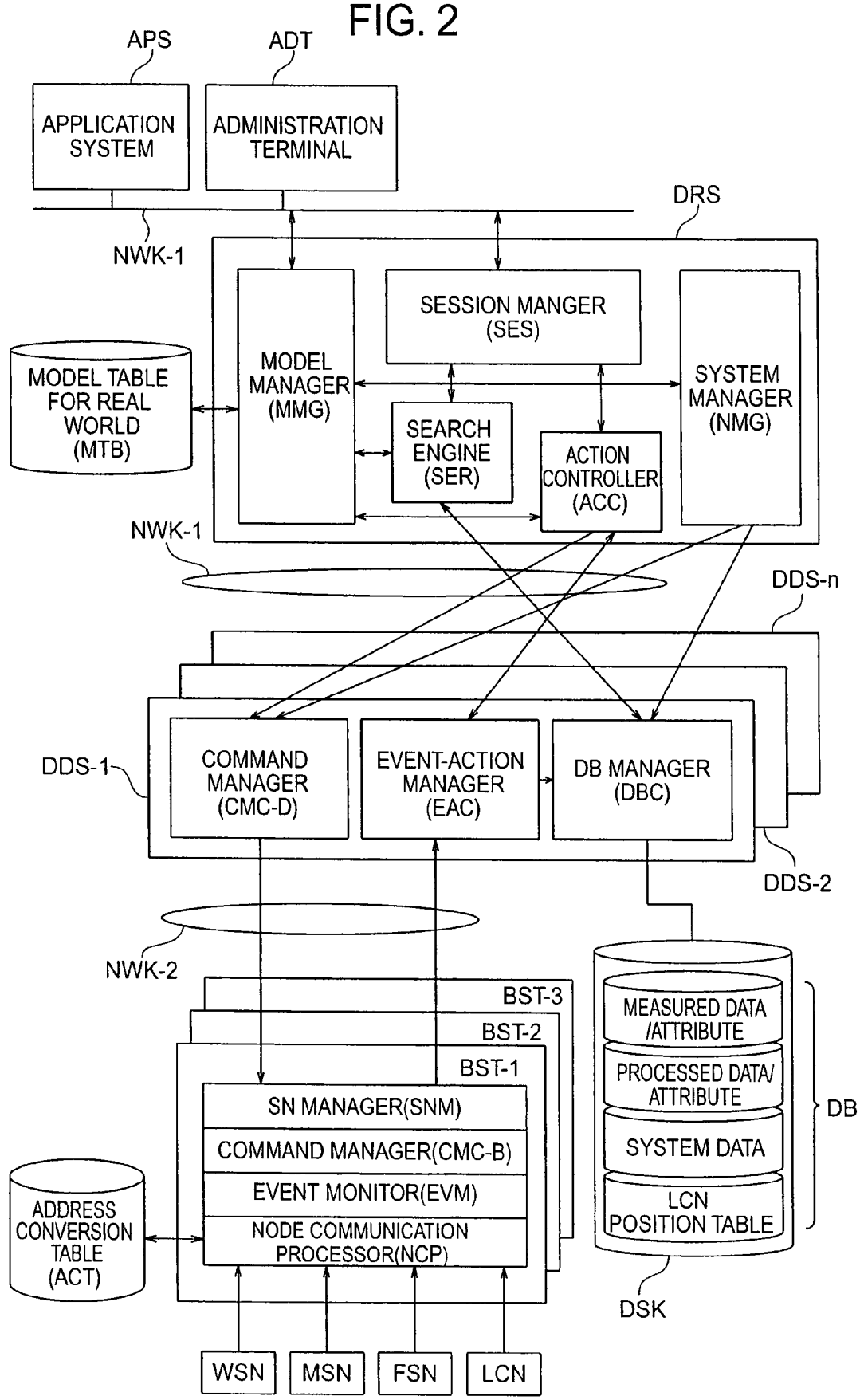
FIG. 2 is a block diagram showing an example of a function of the sensor network.

FIG. 2 is a functional block diagram of the sensor network system shown in FIG. 1. Here, to simplify explanation, the detail of the distributed data processing server DDS-1 alone among the distributed data processing servers DDS-1 to DDS-n of FIG. 1 is shown, and also the base station BST-1 alone among the base stations BST-1 to BST-n connected to the distributed data processing server DDS-1 is shown. The other distributed data processing servers DDS and base stations BST are configured in a similar manner. Hereinafter, the configuration of each component will be described.

<Base Station BST>

The base station BST manages the predetermined subordinate wireless sensor nodes WSN, MSN, wired sensor node FSN, and locator node LCN, and transmits data, which the sensor node and locator node LCN each measured, state data of the node itself, and the like, to the distributed data processing server DDS.

A node communication processor NCP receives communication from the sensor node and the locator node, and converts, with the use of an address conversion table ACT, the address information of the node into an address format used in a host system including the distributed data processing server DDS, the address information being included in the receiving contents. The node communication processor NCP also extracts various data, such as the sensing result included in the receiving contents, the state of the sensor node itself, such as the residual battery capacity, the number of times of communication retry.

In this embodiment, at the time of communication between a node and a base station, a local address and a PAN (Personal Area Network) ID are used as the address information for identifying the node. Here, the PAN ID is an ID assigned in the unit of a wireless network that comprises one base station BST, the wireless sensor node WSN connected to the base station BST, and the locator node LCN. In other words, in order to identify to which network each component belongs, the same PAN ID is given to a node, a locator node, and a base station belonging to one PAN. Moreover, the local address which a sensor node or a locator node has is assigned in advance as to be unique within the PAN to which each node belongs. Accordingly, the ID of a node is uniquely determined within a sensor-net system SNS by a combination of the PAN ID and the local address. Moreover, a global address described below is an ID that is given to each node in the sensor-net system, or is assigned to each node in advance.

Here, in this specification, S_PID which is the PAN ID and a local address S_LAD which a sensor node has are defined as the sensor node ID information, and the L_PID and local address L_LAD which the locator node has are defined as the locator node ID information.

On the other hand, for the sensor node and the locator node, in order to prevent confusion with a node belonging to another sensor-net system or to other similar system, a unique identification needs to be carried out in an area where a node belonging to another system may possibly intermingle with. Moreover, in order to integrate and process a node information of another system in the distributed data processing server DDS, the directory server DRS, and the application system APS, all of the nodes need to be identified uniquely. For this reason, a global address for individual identification is assigned to each node.

Usually, the number of nodes belonging to each PAN is small as compared with the number of nodes belonging to the sensor-net system SNS, to which the relevant node group belongs, and belonging to the whole of the other systems. Accordingly, it is possible to reduce the data size required for expressing the local address as compared with the data size required for expressing the global address. Accordingly, at the time of local communication between a node and a base station in the same PAN, the address data size of a node that is attached at the time of communication can be reduced, and as a result, the entire data amount of communication can be reduced. In particular, in carrying out wireless communication whose band is limited, communication time is reduced by reducing the communication data amount, thus providing an advantage in terms of saving in transmission-line occupation time as well as in terms of reduction in power consumption of sensor nodes.

As described above, a node processor NCP shown in FIG. 2 carries out conversion from a local address to a global address using the address conversion table ACT. In addition, in FIG. 2, an example is disclosed in which the address format of a node used in communication between a node and a base station differs from the address format used in a host system including the distributed processing server DDS. However, in the case where there is no limit on the communication data amount, no problems may occur in practical use even if the both formats are the same. In this case, the address conversion table ACT is not required.

An event monitor EVM monitors, as an event, the global addresses which are the ID information of the sensor node and locator node obtained by the node communication processor NCP, and the sensing result and the node state information. The event monitor EVM also notifies the sensor node manager SNM of the results of processing, such as data conversion, abnormality judgment and the like, that are carried out based on predetermined judgment conditions according to the contents, such as the sensing result and the state of the node.

A command manager CMC-B transmits and receives a command between a command manager CMC-D of the distributed data processing server DDS-1 described below. For example, in response to a command from the distributed data processing server DDS-1, the command manager CMC-B carries out parameter setting of the base station BST-1, carries out state parameter setting of the base station BST-1, or transmits the state of the sensor node and the locator node LCN to the distributed data processing server DDS-1.

The sensor node manager SNM carries out data communication with an event-action manager EAC of the distributed data processing server. Specifically, the sensor node manager SNM receives the sensing result of the sensor node and the locator node LCN which the sensor node manager SNM manages, and the processing result of the node state information from the event monitor EVM, and transmits these to the distributed data processing server DDS through NWK-2 according to predetermined transmission conditions.

Moreover, the sensor node manager SNM holds management information (operation state, residual power or the like) of the sensor node and locator node LCN which the sensor node manager manages. Then, upon receipt of an inquiry regarding the sensor node and the locator node LCN from the distributed data processing server DDS-1, the sensor node manager SNM notifies the management information in place of each sensor node and locator node LCN. In other words, by entrusting the base station BST with the management of the sensor node and the locator node LCN, the distributed data processing server DDS-1 that takes charge of many sensor nodes and locator nodes LCN can reduce its own load.

Moreover, when the event monitor EVM detects an abnormality, the sensor node manager SNM updates the management information of the sensor node and the locator node LCN, and notifies the information of the abnormal sensor node and locator node LCN to the distributed data processing server DDS-1. In addition, the abnormality of the sensor node and the locator node LCN means a functional stop of the sensor node and the locator node LCN or a state to reach the functional stop, such as when there is no response from the sensor node and the locator node LCN, or when power of the sensor node and the locator node LCN drops equal to or less than a predetermined threshold value.

Moreover, upon receipt of a command (setting of output timing) for the sensor node and the locator node LCN from the command controller CMC-D of the distributed data processing server DDS, the sensor node manager SNM transmits this command to the sensor node and the locator node LCN to execute setting, and updates the management information of the sensor node and the locator node LCN after receipt of a notification indicating completion of the setting from the sensor node and the locator node LCN. In addition, the output timing of the sensor node and the locator node is, for example, a cycle in which the wireless sensor node WSN periodically transmits data to the base station BST-1.

<Distributed Data Processing Server DDS>

The distributed data processing server DDS-1 comprises the following configuration.

A disk system DSK stores a database DB.

The command controller CMC-D communicates with the base station BST and the directory server DRS described below to transmit/receive a command or the like.

The event-action manager EAC receives data from the sensor node manager of the base station. Specifically, each time it receives from the base station BST the measured data from the sensor node and locator node LCN, the event-action manager EAC obtains IDs of the sensor node and the locator node LCN included in the measured data, and reads an event generation rule corresponding to the IDs of the sensor node and the locator node LCN from a table described below (event table ETB of FIG. 27) to determine if there is an event generation corresponding to the value of the measured data. Further, the event-action manager EAC executes an action corresponding to the event generation relevant to the ID of the sensor ID.

The contents of action execution include the processing, such as converting the measured data into secondary data based on the rules predetermined by an application developer, a system designer or the like, storing the measured data and the secondary data in the database DB through the database manager DBC, and notifying to the directory server DRS.

As shown in FIG. 1, according to this embodiment, with respect to the plurality of base stations BST, by arranging the plurality of distributed data processing servers DDS that integrate some of the base stations BST regionally (or locally), it is possible to process pieces of information from many sensor nodes and locator nodes LCN in a distributed manner. For example, each distributed data processing server DDS can be installed on each floor in an office building or the like, and each distributed data processing server DDS can be installed in each building at a plant or the like.

The disk system DSK of the distributed data processing server DDS-1 stores, as the database DB, the measured data of the sensor nodes WSN, MSN, FSN and the locator node LCN, and the secondary data obtained by processing these measured data received from the base station BST, the system data regarding the base station BST, the wireless sensor nodes WSN, MSN, wired sensor node FSN and the locator node LCN, and a locator node position table in which the ID information of the locator node LCN is related to information on the installation place of the locator node LCN in advance.

The database manager DBC of the distributed data processing server DDS-1 stores in the database DB the measured data that is the output of the sensor node and the locator node LCN sent from the event-action manager EAC. When necessary, the database manager DBC also numerically processes the measured data, or stores in the database DB the secondary data obtained by combining the measured data with other data. In addition, the system data is updated as required in response to a request from the administration terminal ADT or the like Moreover, in response to the sensor node ID information which the locator node LCN detects, the database manager DBC invokes the installation place from the relevant locator node ID information using the locator node position table, and relates this as the position of the sensor node to thereby relates the position of the sensor node to the sensing data, and transmit this to the directory server DRS. In addition, when an ID information of the same sensor node has been sent synchronously from a plurality of locator nodes, such as when the sensor node exists in an overlapping area of the sensor node detection areas of a plurality of locator nodes LCN or the like, the database manager DBC relates the position of the sensor node by carrying out a processing described below, the processing being carried out when a plurality of locator nodes detected the sensor node, the processing being predetermined as one of actions corresponding to an event generation described in the above event-action manager EAC.

<Directory Server DRS>

The directory server DRS for managing the plurality of distributed data processing servers DDS comprises the following configuration. A session manager SES controls communication from the application system APS or the administration terminal ADT connected through the network NKW-1.

The model manager MMG manages the correspondence relationship between a real world model (object) readily used by the application system, the measured data collected from the sensor node by the distributed data processing server DDS or the secondary data, and the position information of the sensor node that is determined based on the sensor node detection information collected from the locator node. This management is based on a real world model list MDL set in the model table for real world MTB.

The directory server DRS also manages the position information (link of URL or the like) on the existence place of the measured data or the secondary data equivalent to the real world model. In other words, the application system developer can directly access the measurement information of the sensor node and the locator node LCN by designating the real world model, the measurement information varying every moment. The amount of history of the measured data from the sensor node and the locator node LCN and the secondary data increases with time, whereas the amount of real-world model information does not increase even if time elapses and only the contents thereof vary. The detail of this real world model will be described below.

In addition, the model table for real world MTB is stored in a predetermined storage system (not shown) or the like of the directory server DRS.

The action controller ACC of the directory server DRS communicates with the event-action manager EAC or the command manager CMC-D of the distributed data processing server DDS to receive an event-action setting request from the application system APS or the administration terminal ADT. Then, the action controller ACC analyzes the contents of the received event or action with reference to the information of the model table for real world MTB, and establishes the functional sharing between the directory server DRS and the distributed data processing servers DDS-1 to DDS-n according to the analysis result. In addition, one action or event may involve not only in one distributed data processing server DDS but in the plurality of distributed data processing servers DDS-1 to DDS-n.

The search engine SER refers to the model table for real world MTB to execute retrieval in the database DB of the distributed data processing server DDS based on an object retrieving request received by the session manager SES.

In addition, when the retrieving request is a query, a correspondence relationship to the database DB is formed according to the contents of the query, and SQL (structural query language) conversion of the query is executed to implement retrieval. In addition, the retrieved database DB may be across the plurality of distributed data processing servers DDS. Moreover, the latest data acquisition (streaming) is enabled by the action setting of the action controller ACC. For example, an action of always transferring the relevant data to the application system APS can be set in the event-action manager EAC of the relevant distributed data processing server DDS.

Next, the system manager NMG integrally manages the distributed data processing server DDS connected to the network NWK-1 to thereby constitute the sensor network, the base station BST connected to the distributed data processing server DDS, and the sensor node and the locator node LCN connected to the base station BST. The system manager NMG provides an interface regarding registration and retrieval of the distributed data processing server DDS, the base station BST, the sensor node, and the locator node LCN to the administration terminal ADT or the like, and manages the state of each system and the state of the sensor node and the locator node LCN.

The system manager NMG can issue a command to the distributed data processing server DDS, the base station BST, the sensor node, and the locator node LCN, and manages resources of the sensor network based on this command. In addition, the sensor node or the locator node LCN receives a command from the system manager NMG through the command manager CMC-B of the higher-rank base station BST, and the base station BST receives a command from the system manager NMG through the command manager CMC-D of the higher-rank distributed data processing server DDS.

In addition, examples of commands which the system manager NMG issues through the command manager CMC-D include resetting, parameter setting, data deletion, data transfer, routine event/action setting and the like.

<Example of Sensor Node>

Figure 3:
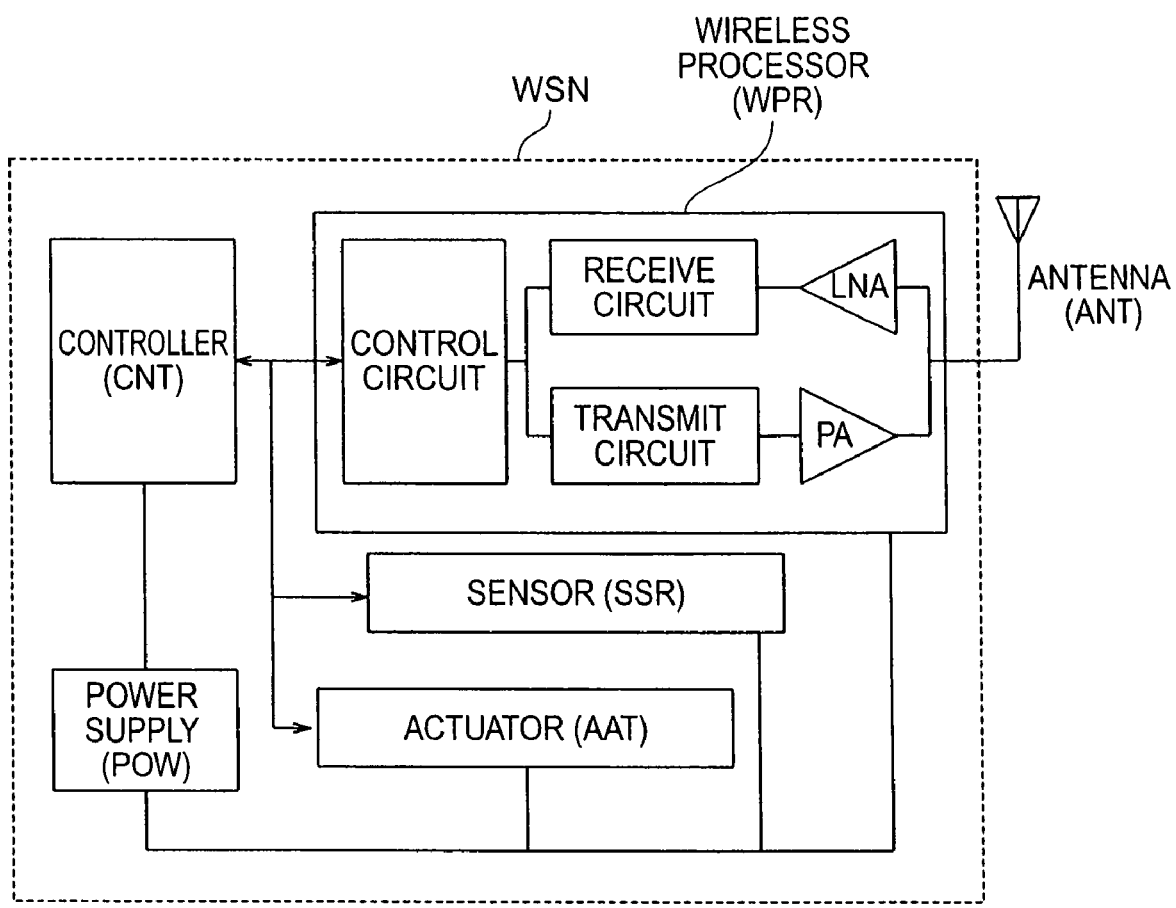
FIG. 3 is a block diagram showing an example of a wireless sensor node WSN.
Figure 4:
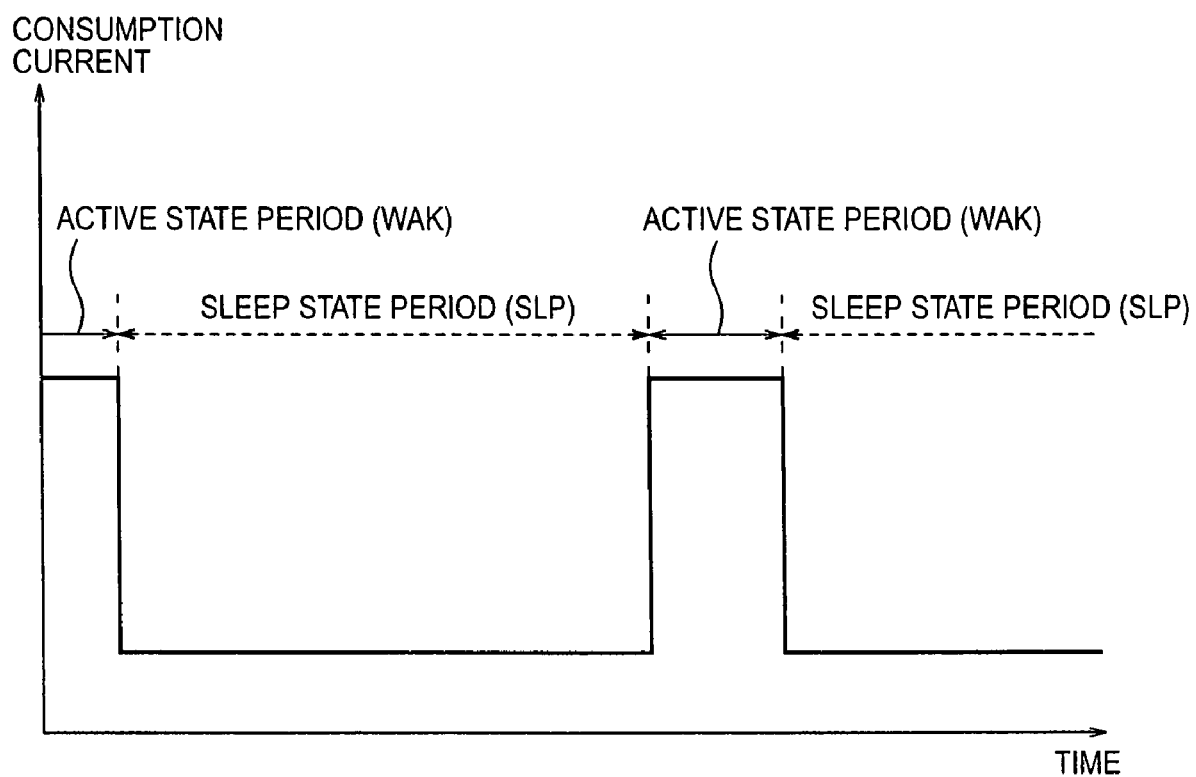
FIG. 4 is a graph showing an example of the operation state of a wireless sensor node, showing a relation between time and consumption current.

Next, FIGS. 3 and 4 show an example of a sensor node.

FIG. 3 is a block diagram showing an example of the wireless sensor node WSN.

A sensor SSR measures a state amount (temperature, humidity, luminance, position and the like) of a measured object or a change in the state amount.

An actuator AAT comprises an output device such as LED, a loudspeaker, a vibrating motor and a liquid crystal display monitor, and a driver for driving the same.

A wireless processor WPR comprises a receive circuit for receiving wireless communication such as a command and a reply sent from the base station BST after the wireless communication is amplified by an LNA (low noise amplifier) through an antenna ANT, a transmit circuit for transmitting a signal generated in the sensor node WSN to the base station BST through the antenna ANT after the signal is amplified by PA (power amplifier), and a control circuit for controlling the receive circuit and the transmit circuit based on control signals from a controller CNT.

The controller CNT reads the measured data of the sensor SSR at a preset cycle or irregularly, adds preset data ID of the sensor node to this measured data to transfer this to the wireless processor WPR. For the measured data, time information for sensing may be given as a time stamp. Moreover, the controller CNT controls the actuator AAT and drives the output device based on a command received through the wireless processor WPR, the sensing result, and a designated processing procedure, and furthermore controls the power supply state of each element constituting the sensor node by controlling a power supply POW. In addition, though not illustrated in FIG. 3, the controller CNT block includes a storage device, such as a memory for holding various data and control programs.

Moreover, the controller CNT analyzes a received command and performs predetermined processing (e.g., setting change and the like). Moreover, the controller CNT monitors the residual power (or charging amount) of the power supply POW, and transmits an alarm of no power from the wireless processor WPR to the base station BST when the residual power drops below a threshold.

In order to execute long-time measurement with limited battery power, it is preferable that the wireless processor WPR operates intermittently to reduce power consumption. For example, as shown in FIG. 4, the controller CNT stops driving of the sensor SSR in a sleep state SLP, and switches from the sleep state to an active state WAK at a predetermined timing so as to drive the sensor SSR to transmit the measured data.

The power supply POW supplies power to the wireless processor WPR that communicates with the base station BST, and to the respective blocks, SSR, AAT, CNT and WPR. Moreover, the power supply POW may typically use a battery (including a secondary battery), but not limited thereto, and may include an autonomous energy generation mechanism such as a solar battery or vibration power generator, or if not a mobile sensor node, power may be supplied from an external power supply.

In addition, although FIG. 3 is an example in which one sensor node includes one sensor SSR and actuator AAT, a plurality of sensors SSR and actuators AAT may be arranged therein. Alternatively, in place of the sensor SSR, a memory for storing a unique identifier ID may be provided and the sensor node may be used as a tag. Moreover, the wireless mobile sensor node MSN and the wired sensor node FSN can be also configured in the same manner as in FIG. 3 and FIG. 4.

<Example of Locator Node>

Examples of the locator node LCN are shown in FIG. 7 to FIG. 14.

Figure 7:
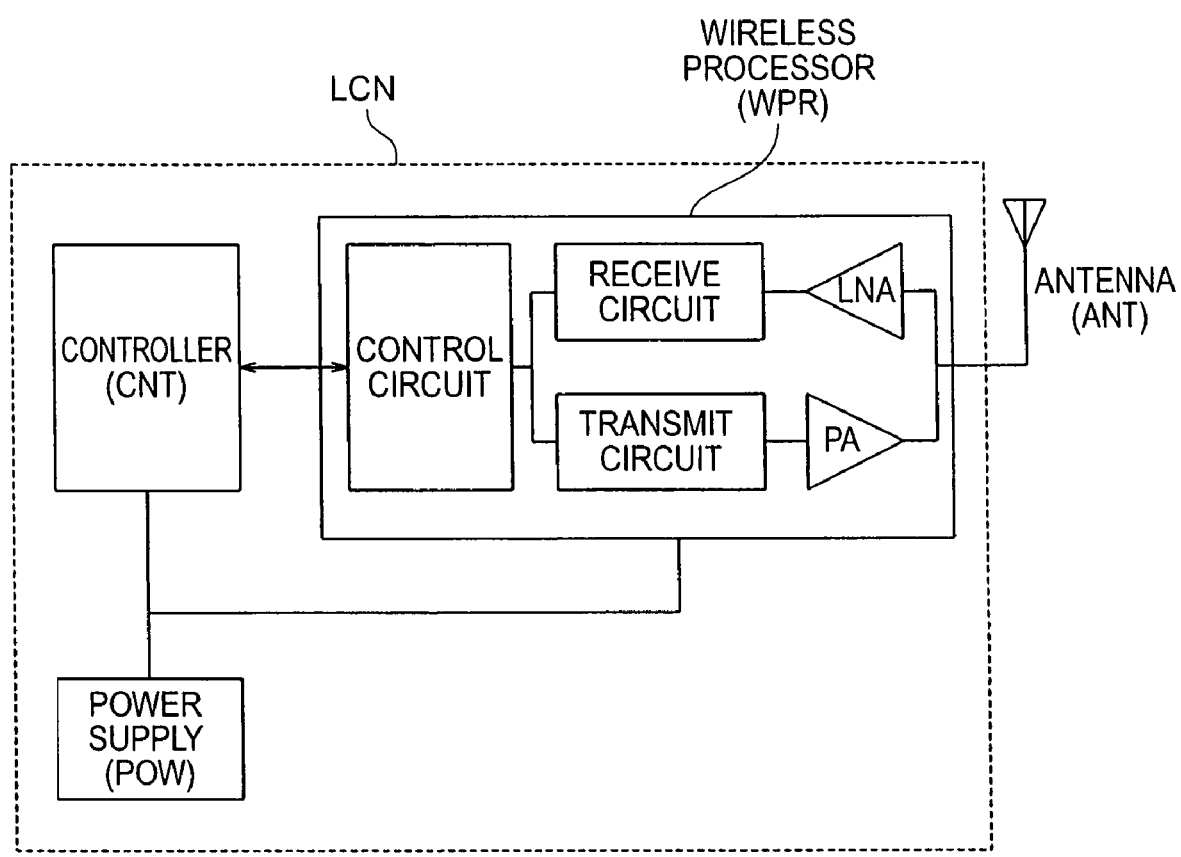
FIG. 7 is a block diagram showing an example of the locator node LCN.

FIG. 7 shows a configuration example of the locator node LCN. The locator node comprises at least a wireless processor WPR for sniffing the communication from a sensor node to a base station and carrying out communication with the base station BST, a power supply POW for supplying power to the respective blocks CNT and WPR, a controller CNT for controlling the wireless processor WPR and the power supply POW, and the antenna ANT for carrying out transmitting/receiving. The controller CNT adds an ID of a locator node to the sniffed information and transfers it to the wireless processor. The controller CNT, the wireless processor WPR, the power supply POW and the antenna ANT in FIG. 7 can be constituted from the completely same components as those of the wireless sensor node WSN in FIG. 3. The main purpose of the locator node LCN is to sniff communication of a nearby sensor node and transmit information to the base station BST, thus the sensor SSR and actuator AAT described in FIG. 3 are not described, but the sensor SSR and the actuator AAT may be mounted in the same manner as in the configuration example of the wireless sensor node WSN of FIG. 3. Accordingly, it is also possible to constitute the locator node LCN from the completely same hardware as that of the wireless sensor node WSN of FIG. 3.

The locator node LCN includes at least a node sniffing mode for sniffing communication of a nearby sensor node and a communication mode for communicating with the base station BST. In the usual communication mode, in order to carry out communication with the base station BST stably, the setting is made so that the communicable distance becomes as long as possible, and in the node sniffing mode the sensor node detection area NDA is set according to the accuracy requirement for locationing in the application. Setting of this sensor node detection area is carried out by the controller controlling the wireless processor.

The configuration example of FIG. 7 is an example of realizing the communication mode and the node sniffing mode with one hardware configuration. For example, when the maximum communicable distance between the locator node LCN and the base station BST in the communication mode is set to Am and the detection area radius in the node sniffing mode is set to Bm (A>B), the low noise amplifier LNA and the receive circuit in the wireless processor WPR of FIG. 7 need to receive radio wave arriving from a base station BST at distances up to the maximum μm at the time of the communication mode and detect the communication from the sensor node at distances over the maximum Bm at the time of the node sniffing mode.

A first method for this purpose is a method of using a radio field strength index called RSSI (Received Signal Strength Indicator). In other words, this is a method in which the strength at the time of sniffing the radio wave sent from a sensor node whose RSSI value is Bm is set to a threshold, and at the time of the node sniffing mode, only when RSSI of the sniffed radio wave is higher than this threshold, an ID information of the sensor node is obtained from the sniffed radio wave and is transmitted. The radius of a detection area can be modified by adjusting the threshold.

The decision whether or not RSSI exceeds the threshold may be carried out in the control circuit for controlling the receive circuit or may be carried out in the controller CNT.

A second method is a method in which the low noise amplifier LNA gain is tailored to a predetermined distance. The gain of LNA is usually adjusted so as to treat this LNA at the maximum gain by an AGC (auto gain control) function or the like according to a received radio field strength. Accordingly, it is possible to absorb a difference in the received radio field strength and amplify to a signal level required for the subsequent receive processing so as to carry out the receive processing. However, if the receiving level is too low, the reliability of the signal can not be guaranteed because the signal is buried in noise or the like, and therefore, a processing is required in which a signal that does not exceed a certain signal level even if amplified to the maximum by AGC is not regarded as a valid signal but is ignored, or the like.

On the other hand, if the setting is made such that the strength of radio wave, which a sensor node at distance equal to the preset radius of the detection area sent, is treated as the receivable lowest level, then upon receipt of a signal with lower than this radio wave strength the signal can not be treated as a valid signal. As a method of setting for this purpose, if the LNA gain is fixed to such a value that the strength of radio field, which a sensor node at distance equal to the detection area radius sends, is the receivable lowest level, it is possible to detect only communication of sensor nodes existing within a predetermined detection area at the time of the node sniffing mode. Moreover, the radius of the detection area can be modified by adjusting the fixed gain value. Moreover, the signal level for subsequent processing may be adjusted to an optimum value by amplifying the LNA gain by AGC with the above-described lowest level being as an upper limit. In this case, the information on the amplification factor that is actually applied in the AGC needs to be notified to a subsequent receiving processor so that the original signal level value may be known.

Incidentally, the above-described first method and second method may be used in combination. Generally, wireless wave that reaches an antenna of a receiver from a transmission source is overlapping wave of direct wave that reaches directly form the transmission source and indirect wave that reaches through a plurality of paths (multipath), as a result of reflection, diffraction, and transmission due to walls, floors, ceilings, installations and the like. As the respective radio waves have different paths to the antenna, the propagating distance differs, resulting in shifted arrival times. Due to the phase difference caused by this, radio waves reinforce each other or weaken each other (multipath fading). The radio wave transmission conditions vary depending on the position of the transmission source and receive circuit, and on the spatial and temporal characteristics of surrounding environment, thus the strength of radio wave that reached is not constant. Fluctuation in this radio field strength may cause an error in the set radius of the detection area. Usually, it is assumed that the longer the distance between a transmission source and a receiver antenna, the greater the effect of multipath fading becomes.

On the other hand, according to the method of identifying the position of a sensor node using the locator node LCN of the present invention, the distance between a transmission source and a receiver antenna is short as compared with the trilateration method based on distance estimation using a radio field strength, and therefore, the effect of measurement error due to multipath fading may be expected to be small. Accordingly, the measurement accuracy increases, and the complicated computation for reducing the effect of fluctuation of radio field strength is not required, thus improving the processing speed.

Figure 8:
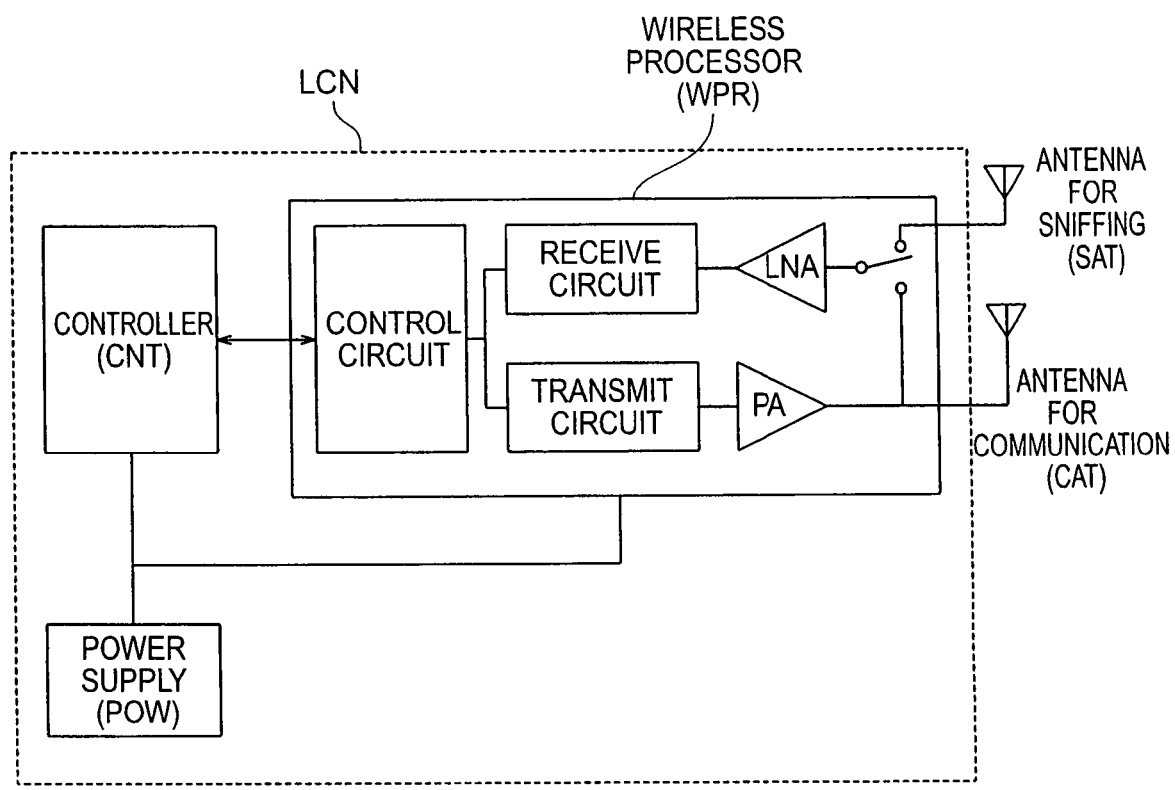
FIG. 8 is a block diagram showing an example of the locator node LCN.

FIG. 8 shows an example in which the above-described communication mode and node sniffing mode are realized by switching to an antenna suitable for each mode. In the configuration of FIG. 8, a switch that switches an antenna for communication CAT and an antenna for sniffing SAT is provided, so that the antenna for communication CAT is connected at the time of communication and the antenna for sniffing SAT is connected at the time of node sniffing. For the antenna for sniffing SAT, an antenna whose receiving sensitivity is lower than that of the antenna for communication CAT is used, and the antenna sensitivity is tailored to the detection area radius you want to set.

Figure 9:
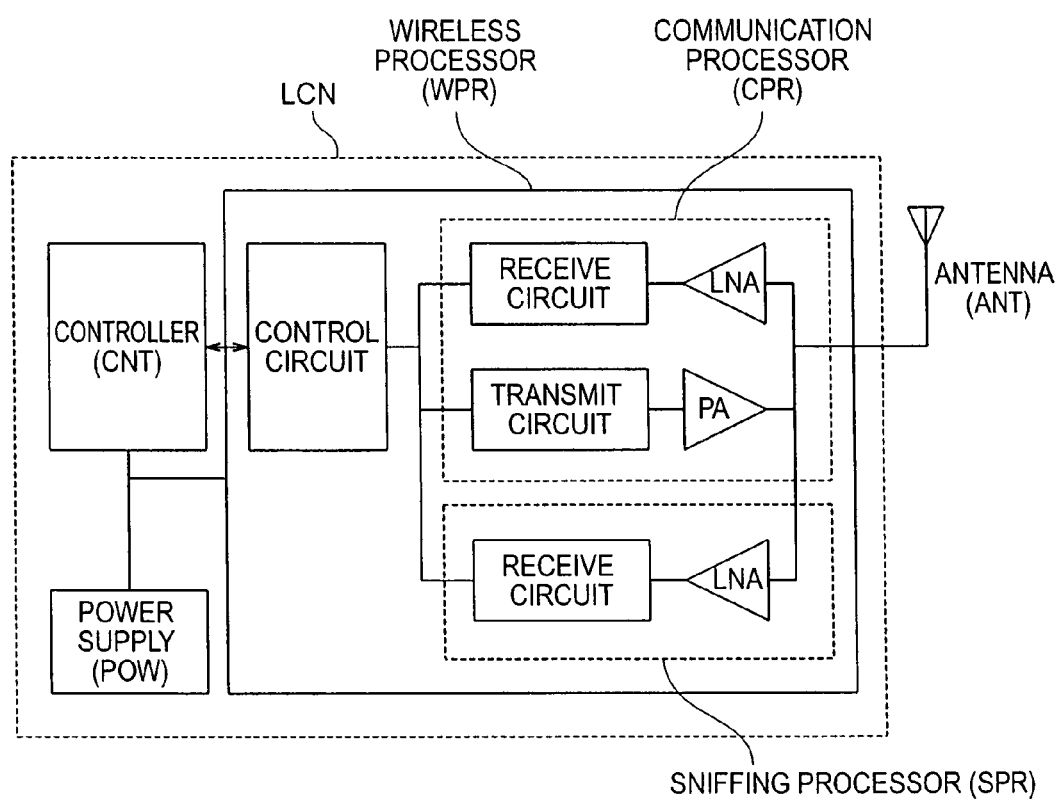
FIG. 9 is a block diagram showing an example of the locator node LCN.
Figure 10:
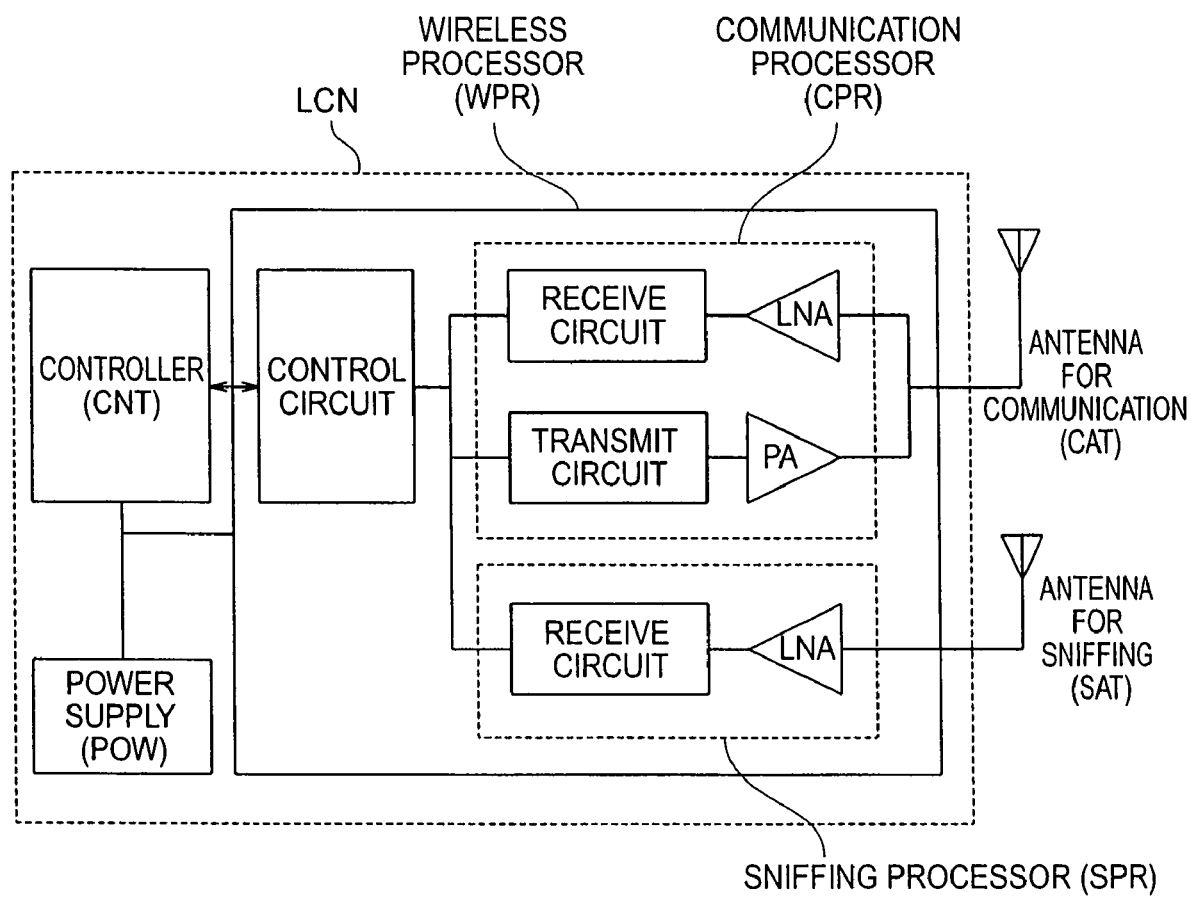
FIG. 10 is a block diagram showing an example of the locator node LCN.

FIG. 9 shows a configuration example of preparing two receive circuits for communication and sniffing. In the wireless processor WPR, a communication processor CPR and a sniffing processor SPR are provided. The communication processor CPR has a receive circuit for receiving a signal of the base station BST at the time of the communication mode and a transmit circuit for transmitting a signal to the base station BST. The sniffing processor SPR has a receive circuit adjusted so as to sniff only the communication of a sensor node existing within a predetermined detection area radius at the time of the node sniffing mode. A control circuit carries out communication using the communication processor CPR at the time of the communication mode and sniffs the communication of the sensor node using the sniffing processor SPR at the time of the node sniffing mode. In this configuration example, the communication mode and the node sniffing mode can be executed simultaneously. Moreover, as shown in FIG. 10, the antenna for communication CAT may be connected to the communication processor, and the antenna for sniffing SAT may be connected to the sniffing circuit.

<Identifying the Position of a Sensor Node by a Locator Node>

Figure 5A:
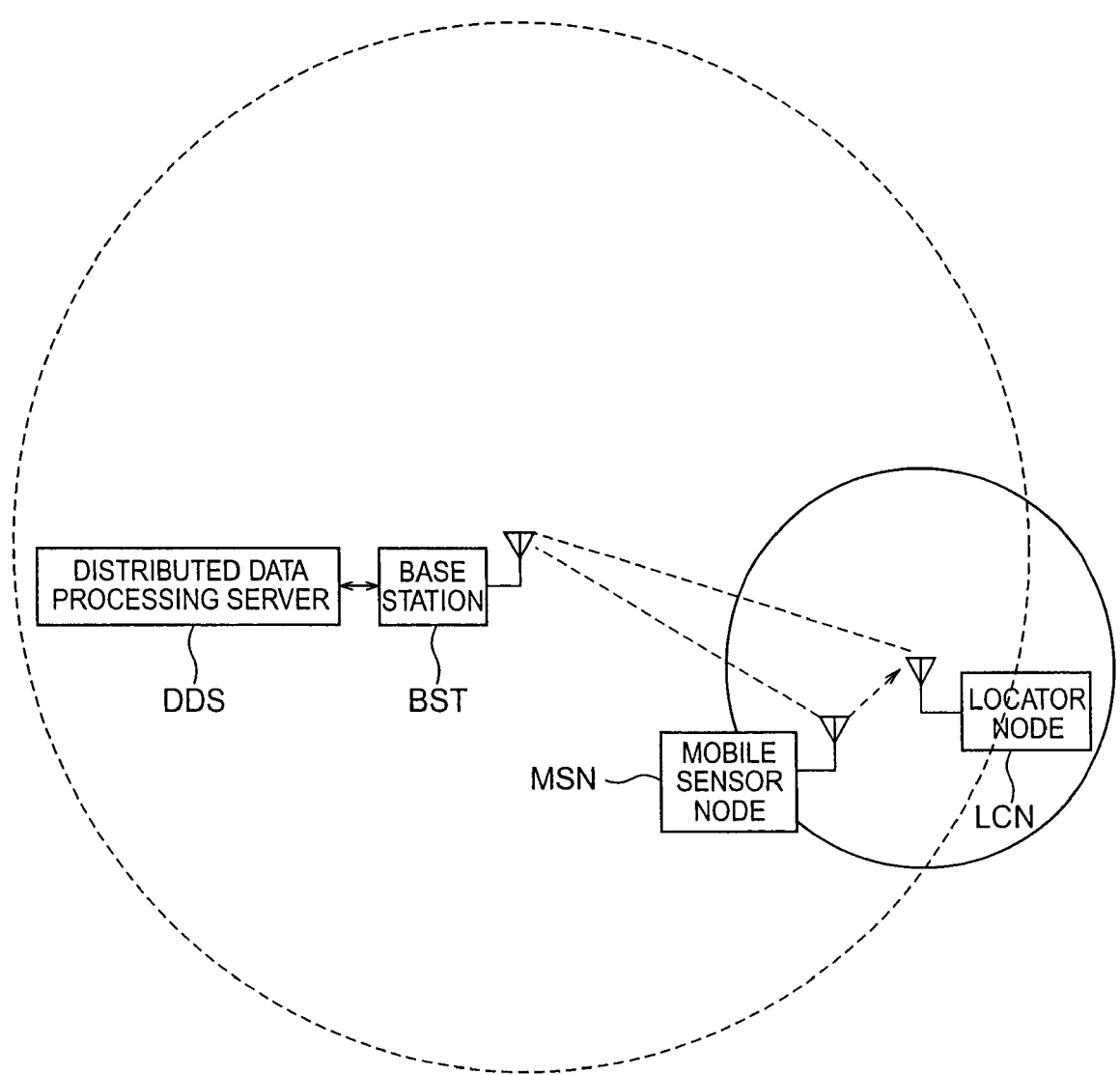
FIG. 5A is a view explaining an example of a method of detecting a mobile sensor node by a locator node LCN.
Figure 5B:
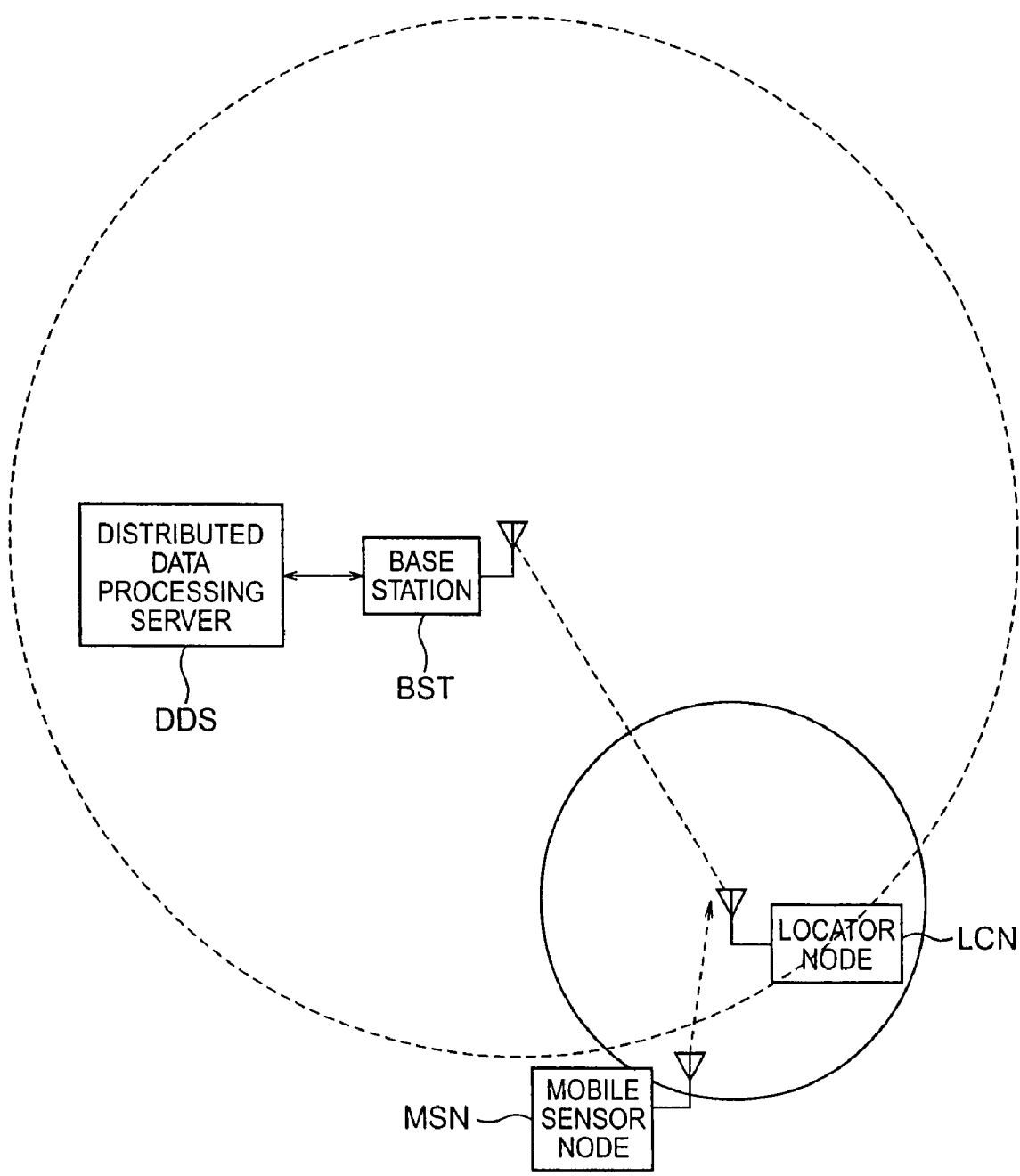
FIG. 5B is a view explaining an example of a method of detecting the mobile sensor node by the locator node LCN.
Figure 5C:
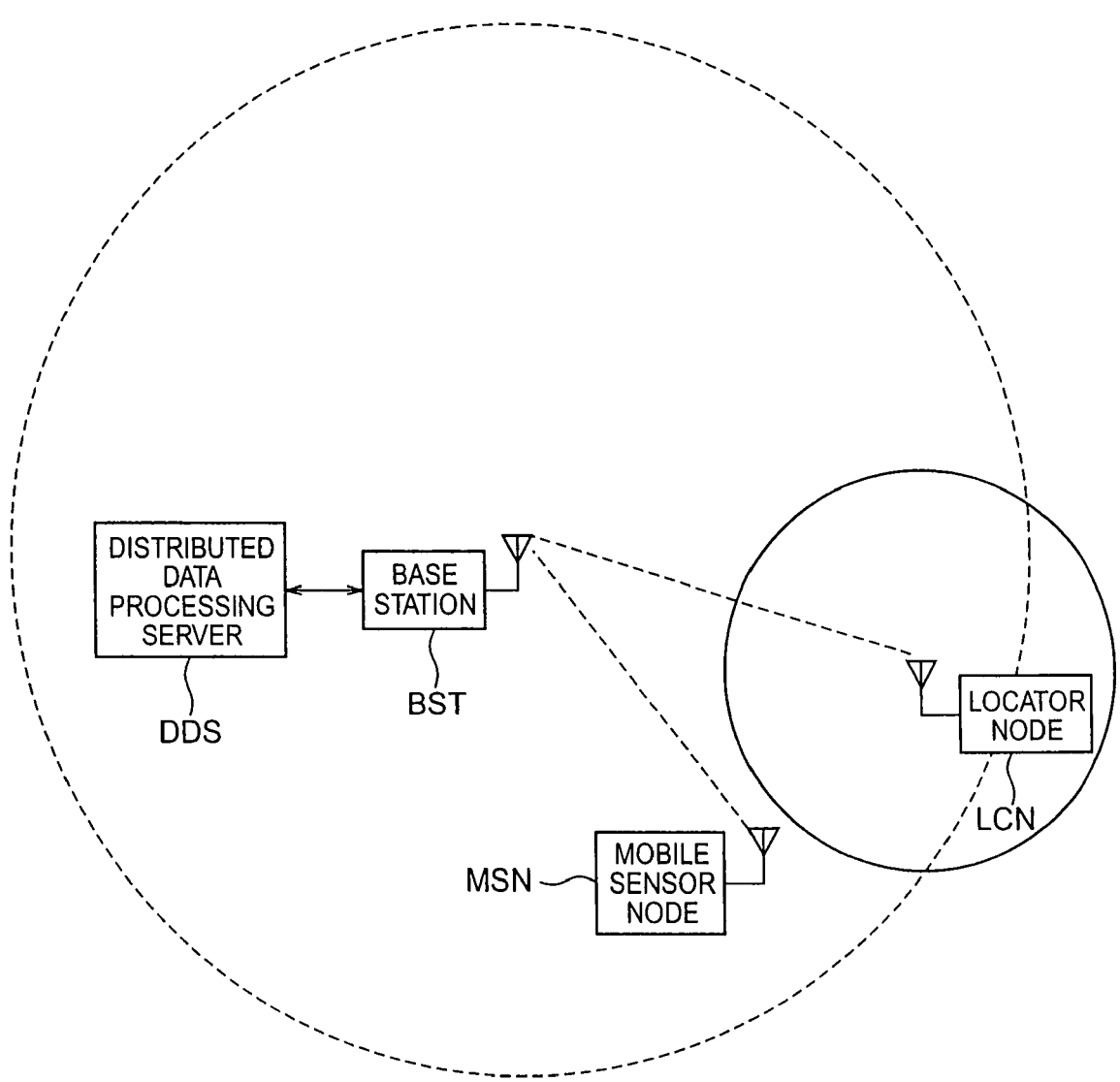
FIG. 5C is a view explaining an example of a method of detecting the mobile sensor node by the locator node LCN.

FIGS. 5A-5C are views explaining how to detect a mobile sensor node by the locator node LCN. The locator node LCN is positioned as one component of the sensor network SNS and communicates with the base station BST using the same communication method as that of the sensor node. The locator node LCN sniffs the communication from a sensor node to a base station within a predetermined area as described above, and extracts information including an ID or the like of this sensor node and transmits it to the distributed data processing server DDS through the base station BST.

FIG. 5A shows a case where a locator node and a sensor node exist with a base station within a communication area, and the sensor node exists within the detection area of the locator node. The base station receives data including sensing data and sensor node ID information from the sensor node, and data including the sensor node ID information that is sniffed from the locator node and locator node ID information. Moreover, a server sets the position of the locator node to the position of the sensor node when two pieces of the sensor node ID information included in the data received from the base station are the same. Thus, the sensing data can be related to the position of the node.

FIG. 5B shows a case where only the locator node exists within the communication area of the base station, and the sensor node exists within the detection area of the locator node. The base station receives only transmit data from the locator node and does not receive transmit data from the sensor node. Accordingly, the server detects that the sensor node exists within the detection range of the locator node and exits outside the communication area of the base station. In addition, this sensor node may not be a sensor node which the sensor-net system, to which the locator node belongs, manages. In that case, the server detects that a sensor node having unknown affiliation exists within the detection area of the locator node. At this time, if the transmit data of this sensor node has the same format as that of a sensor node which this sensor-net system manages, the base station obtains the ID information of the sensor node with unknown affiliation, and if the format differs, the base station transmits to the server information indicative of the sensor node having unknown affiliation and an unknown ID. Thus, the server or the application system can notify a system manager of the fact that the sensor node having unknown affiliation exists.

FIG. 5C shows a case where the locator node and the sensor node exist within the communication range with the base station, and the sensor node exists outside the detection area of the locator node. Although the base station extracts the sensor node ID information from transmit data received from the sensor node, it does not receive from the locator node data including the same sensor node ID information as the extracted sensor node ID information. Accordingly, the server detects that the sensor node exists within the communication range with the base station and exists outside the detection range of the locator node.

Thus, in the present invention, the position of a node existing within at least either one of the detection area of a locator node and the communication area of a base station is identified by using the locator node. For this reason, in contrast to the trilateration method, it is not necessary to estimate an accurate distance between a base station and a terminal, thus eliminating the need for precisely locationing of the base station. Moreover, accurate time synchronization between base stations is not required. A close or dense arrangement of base stations is not required, thus reducing the cost. Moreover, the locator node can be installed in a place, which a user desires, in consideration of elements that affect the radio field strength due to shielding objects, such as walls, floors, installations, and therefore, a complicated calculation for reducing fluctuation in the radio field strength is not required. Moreover, the sensor node just transmits sensing data to only a base station, and does not need to transmit a locationing signal to the base station or the locator node. For this reason, the power consumption of the sensor node can be reduced.

Figure 6:
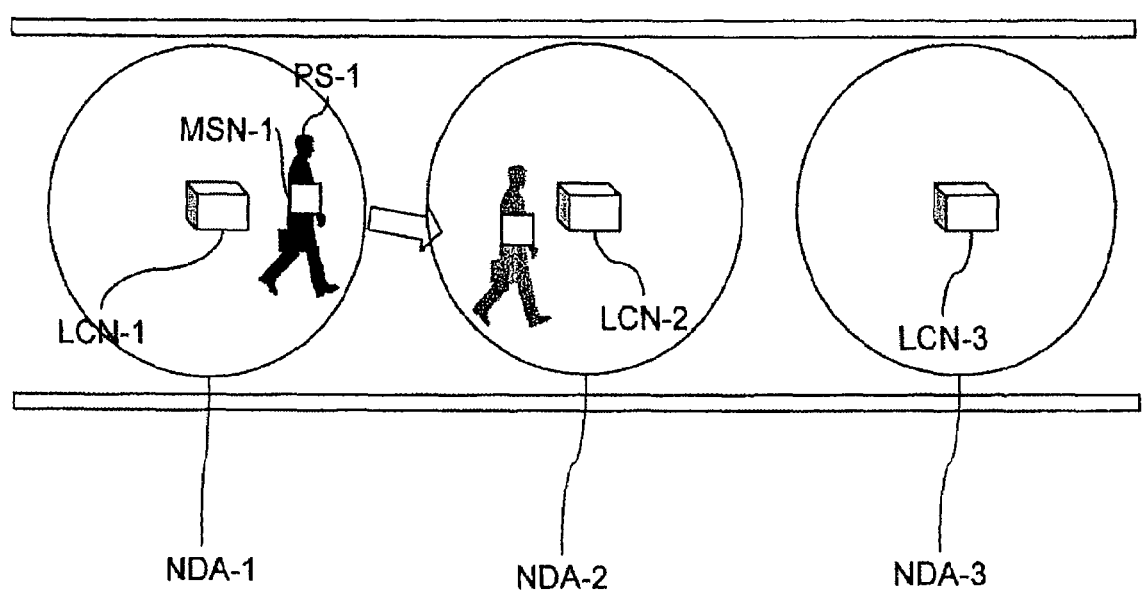
FIG. 6 is a view explaining an example of a concept of locationing a mobile object by a locator node LCN.

FIG. 6 shows a concept of identifying the position of a mobile object by the locator node LCN. Here, assume that a person PS-1 is a mobile object and that the person PS-1 has a mobile sensor node MSN-1. LCN-1 to LCN-3 represent locator nodes, respectively, and NDA-1 to NDA-3 represent sensor node detection areas in which the locator nodes LCN-1 to LCN-3 each can sniff communication of the sensor node. Because now the person PS-1 exists within the detection area NDA-1 of the locator node LCN-1, when the mobile sensor node MSN-1 carries out communication with a base station, the locator node LCN-1 sniffs this communication and obtains ID information of MSN-1 and transmits it to the distributed data processing server DDS. The distributed data processing server DDS manages the installation position information of each locator node LCN as a table (locator node position table in the DSK in FIG. 2), and determines that the position of the person PS-1 having MSN-1 is near the locator node LCN-1 based on the mobile sensor node MSN-1 detection information by the locator node LCN-1. Next, suppose that the person PS-1 moved in the detection area NDA-2 of the locator node LCN-2. If the mobile node MSN-1 carries out communication in this area, the locator node LCN-2 sniffs this communication to thereby detect the presence of MSN-1, and obtains the ID information of MSN-1 from this communication to transmit this to the distributed data processing server DDS. The distributed data processing server DDS determines that the position of the person PS-1 having MSN-1 is near the locator node LCN-2 based on the locator node position table. Thus, the sensor network system SNS can identify the position of a mobile object as the position of a neighboring locator node LCN every time a mobile object carries out communication within the detection area NDA of the locator node LCN while moving.

Figure 20:
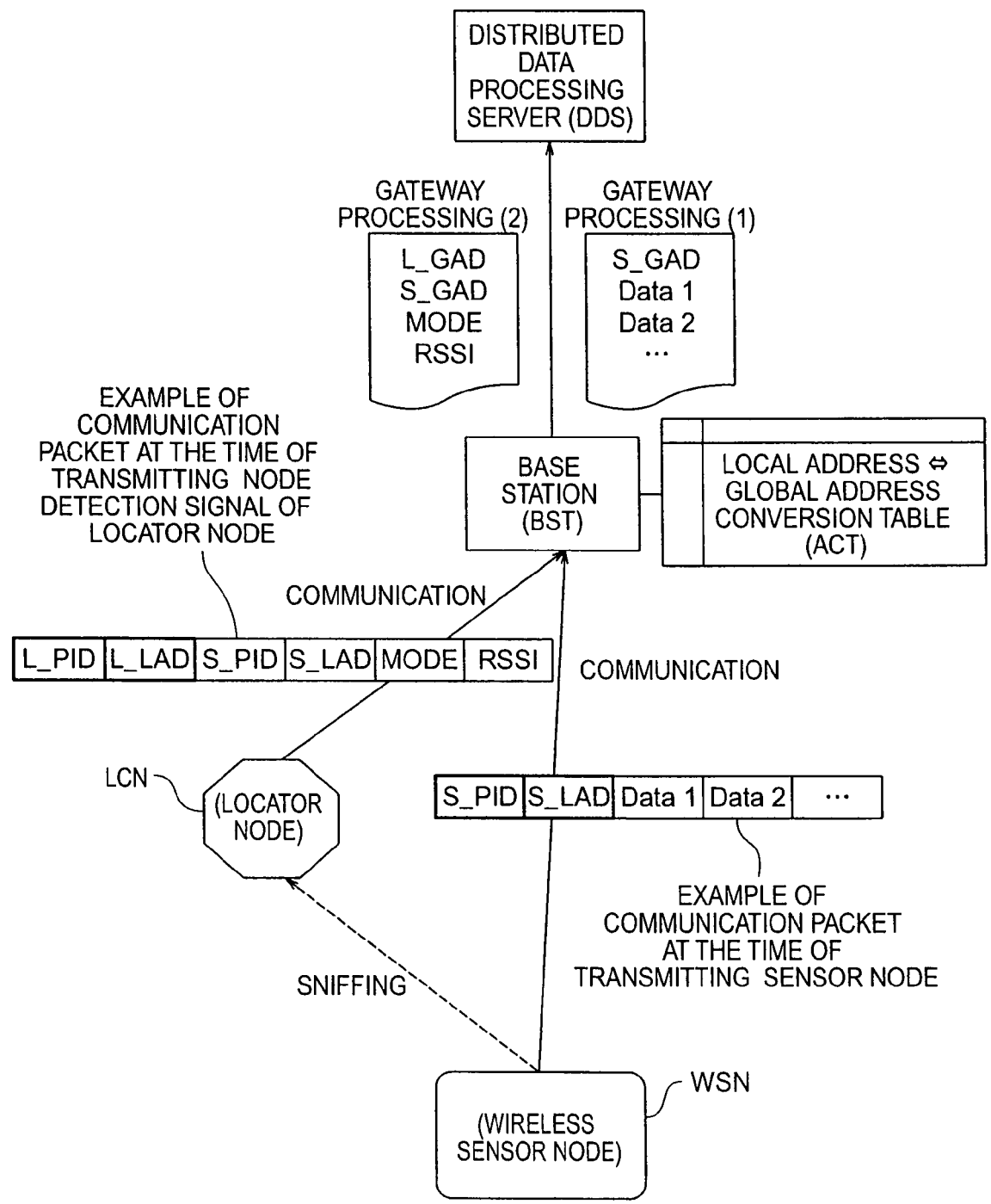
FIG. 20 is a view explaining an example of a data-flow.
Figure 21:
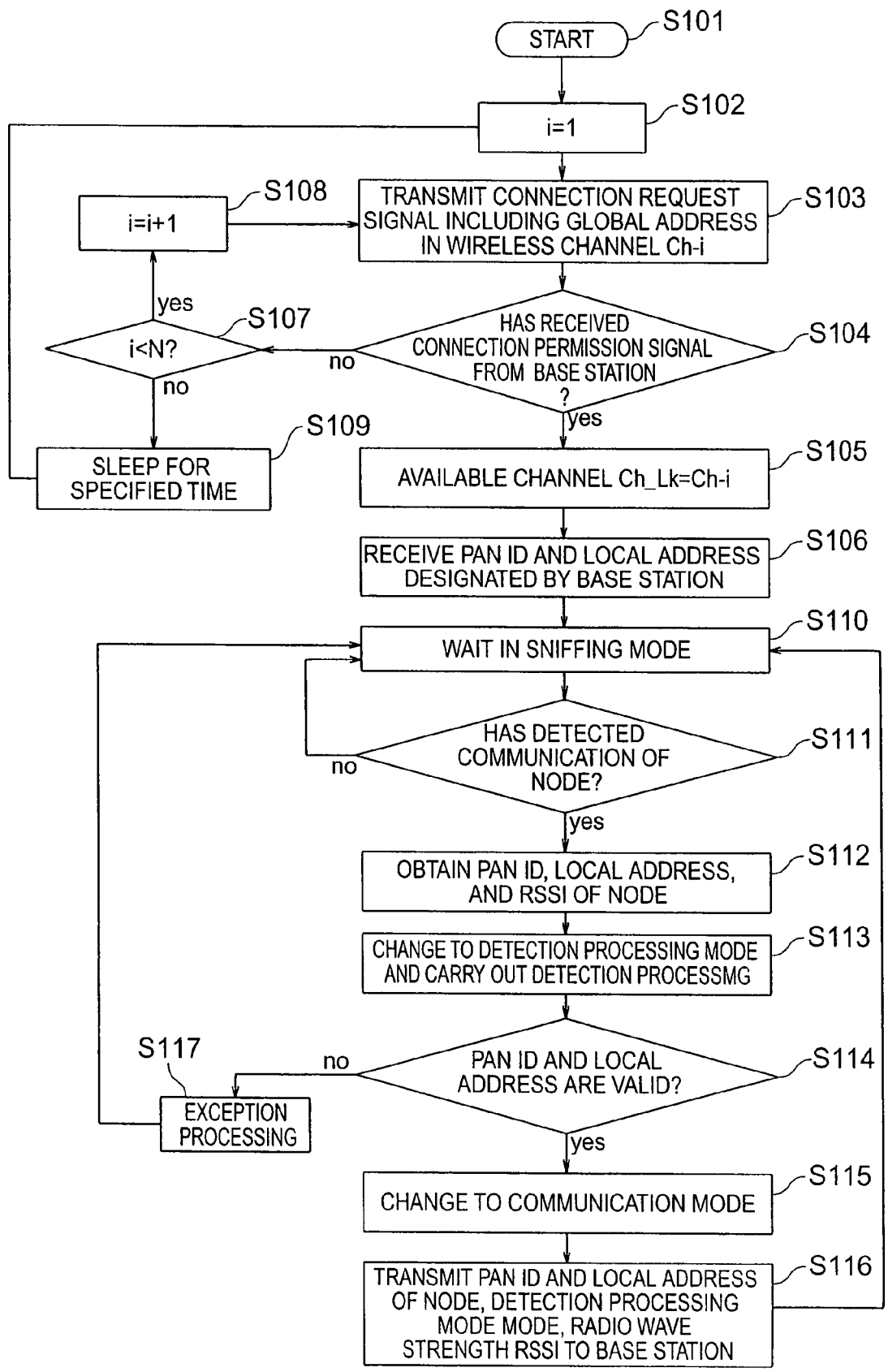
FIG. 21 is a view explaining an example of a process flow of a locator node.
Figure 22:
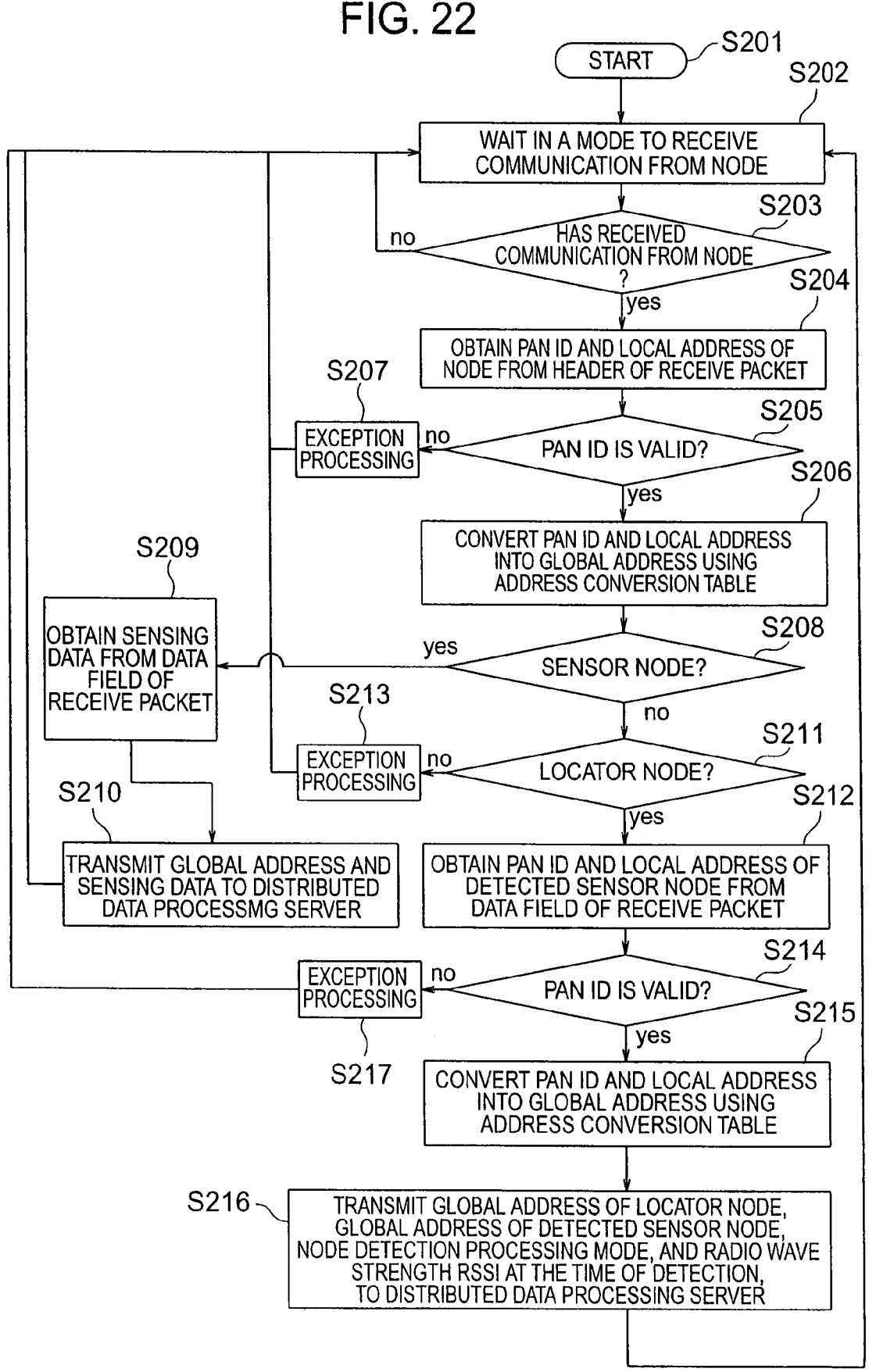
FIG. 22 is a view explaining an example of a process flow of a base station.

The detail of the method of identifying the position of a sensor node will be described using FIGS. 20-22. FIG. 20 is a view explaining an example of a data flow when the locator node LCN sniffs the communication which the wireless sensor node WSN transmitted. As illustrated as an example of a communication packet at the time of transmission of the sensor node, a packet having S_PID, which is a PAN ID of the sensor network, and a local address S_LAD in a packet header, and having data (Data 1, Data 2, . . . ) of sensor values or the like in a data field is transmitted to the base station BST from the wireless sensor node WSN. Taking the configuration of the wireless sensor node of FIG. 3 as an example, the sensor values (Data 1, Data 2, . . . ) which the sensor SSR obtained under an instruction or the like from the controller CNT together with the local address S_LAD of the wireless sensor node WSN itself, which is held in a storage system (not shown) in the controller CNT, and S_PID, which is PAN ID to which the wireless sensor node WSN belongs, are processed into a communication packet, which is sent through the wireless processor WPR.

The processing carried out in the locator node LCN will be described using FIG. 21. At the time of power on of the locator node or at the time of reset (S101), in order to search and connect to a connectable base station, the locator node LCN, using a plurality of radio channels ch-i (i=1-N) sequentially (S102), transmits a connection request signal together with a global address which the locator node has (S103). On the other hand, upon receipt of a connection permission signal from a specific base station (S104), the locator node LCN determines this channel ch-i as an available channel (S105) and obtains the PAN ID and local address designated by this base station for use in the subsequent communication (S106). This flow is repeated until receipt of a connection permission signal from the base station (S107, S108). If not having received a connection permission signal from any radio channel, the locator node LCN determines that a base station that can respond does not exist within the communication range, and will retry after sleeping for a designated time (S109).

After the connection with the base station is established, the locator node is on standby in the node sniffing mode (S110), and attempts to detect communication from a node periodically, and upon detection of the communication of the node it acquires the PAN ID, local address and RSSI of the node (S111, S112). If having failed to receive the communication of the node, the locator node returns to the node sniffing mode.

Upon acquisition of the PAN ID, local address and RSSI of the node, the locater node changes to a detection processing mode to execute detection processing (S113). If the PAN ID and local address of the node obtained in the detection processing are the valid PAN ID and local address included in the range of a predetermined value (S114), then the locator node changes to the communication mode (S115). Then, the locator node transmits to the base station BST the PAN ID and local address of the detected sensor node, the detection processing mode MODE and the radio field strength RSSI at the time of sniffing the communication, together with the PAN ID and local address of the locator node itself (S116), and thereafter the locator node returns to the node sniffing mode.

In addition, if the obtained PAN ID and local address are detected not to be valid, the locator node carries out an exception processing of ignoring these or transmitting abnormality detection information to the base station BST or the like (S117), and thereafter the locator node returns to the node sniffing mode.

Taking the configuration of the locator node LCN of FIG. 7 as an example, the wireless processor WPR sniffs a packet of the wireless sensor node WSN and sends this to the controller CNT. The controller CNT obtains S_PID and S_LAD from the packet header of this packet. Then, these S_PID and S_LAD together with the local address L_LAD of the locator node LCN itself, which is held in the storage system (not shown) in the controller CNT, and L_PID of PAN ID to which the locator node LCN itself belongs, are processed into a communication packet, which is then sent through the wireless processor WPR.

In the example of FIG. 20, as the other information used in the distributed data processing server DDS or in the application, a node detection processing mode (either a node detection signal of a successive transmission type or a node detection signal of a concurrent transmission type) MODE to be described in FIGS. 11-14, and radio field strength RSSI when the communication of the wireless sensor node WSN was sniffed are also transmitted together. In the case where the locator node LCN is operating in the concurrent communication type to be described in FIG. 14, a signal for release is transmitted as the communication packet when the wireless sensor node WSN has departed from the detection area of the locator node LCN. The data field in this case includes at least S_PID, which is PAN ID of the wireless sensor node WSN, the local address S_LAD, and the node detection processing mode (mode indicative of a signal for release of the concurrent communication type) MODE.

Next, the processings carried out in the base station BST will be described using FIG. 22, but only the process upon receipt of a communication packet from the sensor node or the locator node LCN relevant to the present invention will be described in particular, and the description related to other processings which the base station BST carries out, such as initial setting, post processing, processing between servers, will be omitted.

Upon completion of preparation for receiving communication from the node (S201), the base station waits in a mode of receiving communication from the node (S202), and upon receipt of a communication packet transmitted from the wireless sensor node or the locator node LCN (S203), it obtains the PAN ID and local address of the node from the header of the received packet (S204). Then, if the above PAN ID is equal to a PAN ID to which the base station BST belongs, the above PAN ID is determined to be valid (S205), and the PAN ID and local address are converted into a global address using a local address <=> global address conversion table (S206).

When the received communication packet is transmitted from the wireless sensor node WSN, the PAN ID is S_PID, the local address is S_LAD, and the global address is S_GAD. Moreover, when the received communication packet is transmitted from the locator node LCN, the PAN ID is L_PID, the local address is L_LAD, and the global address is L_GAD.

The base station BST checks with the global address that is managed by the sensor-net manager SNM, and if the global address obtained by converting the local address included in the received packet is the one given to the wireless sensor node WSN (S208), the base station BST obtains the sensing data Data 1, Data 2, . . . from the data field of the received packet (S209). After transmitting to the data processing server DDS (S210), the base station BST returns to the mode of receiving communication from the node. If it is not determined that the PAN ID is valid, the received packet is ignored or undergoes an exception processing as the abnormality detection information (S207) and thereafter the base station returns to the mode of receiving communication from the node.

If the global address obtained by converting the local address included in the received packet is the one given to the locator node LCN (S211), the PAN ID and local address of the detected wireless sensor node are obtained from the data field (S212). If this PAN ID is equal to a PAN ID to which the base station BST belongs, this PAN ID is determined to be valid (S214), and the PAN ID and local address are converted into a global address using the local address <=> global address conversion table (S215). If the PAN ID is not determined to be valid, the received packet is ignored or undergoes an exception processing as the abnormality detection information (S217), and thereafter the base station returns to the mode of receiving communication from the node. Then, the global address of the locator node, the global address of the detected sensor node, the node detection processing mode MODE, and radio field strength RSSI of the detected communication are transmitted to the distributed data processing server DDS (S216). If the received packet is neither one of the wireless sensor node WSN nor of the locator node LCN, the received packet is ignored or undergoes the exception processing as a abnormality detection information (S213), and thereafter the base station returns to the mode of receiving communication from the node.

The DBC of the distributed data processing server checks the received S_GAD of WSN with the S_GAD included in the LCN, and if they are the same, the position of L_GAD is set to the position of S_GAD. Moreover, the position of S_GAD is identified using the locator node position table.

In addition, when the sensor node moved to a network of another base station, usually the PAN ID of this destination base station is newly given in response to a request from the node, but before giving this new PAN ID, the sensor node may communicate with the base station and the locator node may sniff this communication. In the above description, when the PAN ID of such sensor node differs from the PAN ID to which the base station belongs, the received packet is ignored, for example, or an exception processing such as processing as abnormality detection information is carried out. However, in the case where the base station BST has a local address <=> global address conversion table of another base station BST' that belongs to another PAN, even if the locator node LCN belonging to the same PAN as that of the base station BST sniffs the communication packet of a wireless sensor node WSN' belonging to another PAN, it is possible to convert the PAN ID and local address included in this communication packet into a global address PAN ID.

Moreover, if there is another locator node in the detection area of the locator node, then one locator node LCN-1 may detect another locator node LCN-2 depending on the timing. In this case, on the contrary, a detected side locator node LCN-2 detects a node detection signal packet which the detecting side locator node LCN-1 transmitted, and transmits this node detection signal packet, and again LCN-1 detects this packet, resulting in a cyclic state. Then, a constant packet dead time is provided in the node sniffing mode of the locator node, and when communication continuously transmitted from the same node is detected in a short time, control such as ignoring the received packet is carried out.

For example, the dead time may be a time until the locator node LCN detects a communication packet, which another node transmitted, and transmits a detection signal packet, plus a time required for detection processing, furthermore plus an appropriate margin time. If an interval that the same sensor node transmits a communication packet is set sufficiently long as compared with this dead time, it is not likely to fail to detect communication from a sensor node. In addition, an identification code indicative of the type of a node may be added, in advance, to a communication packet which each node transmits, so that the node detection processing is not carried out if a received packet includes the above identification code of the locator node when the locator node received the packet. Alternatively, the local address of a locator node that is potentially detected may be held in a storage system in each locator node in advance, so that the address check is carried out before carrying out detection processing, and when the local address included in the received packet agrees with the held local address of the locator node, the node detection processing is not carried out.

Although in this embodiment the PAN ID and local address of the detected sensor node are put in the data field of the node detection signal packet which the locator node transmits, it is also possible to put the local address of the detected sensor node into the short address area of a locator node of the node detection signal packet header and to put a global address, which the locator node holds, into the data field and transmit this. In this case, the base station just needs to convert only the local address of the packet header into a global address using the same processing routine as that of the communication packet from a sensor node, and to regard the global address of the locator node stored in the data field as the sensor value and transmit this as it is to the distributed data processing server DDS. For this reason, it is not necessary to provide a processor within the base station, the processor being for determining whether or not it is a packet from a locator node and for obtaining the local address of the sensor node from the data field only when it is a packet from the locator node and for converting this into a global address, and thus, the processing of the base station will be simplified.

<State Diagram of Locator Node>

Figure 11:
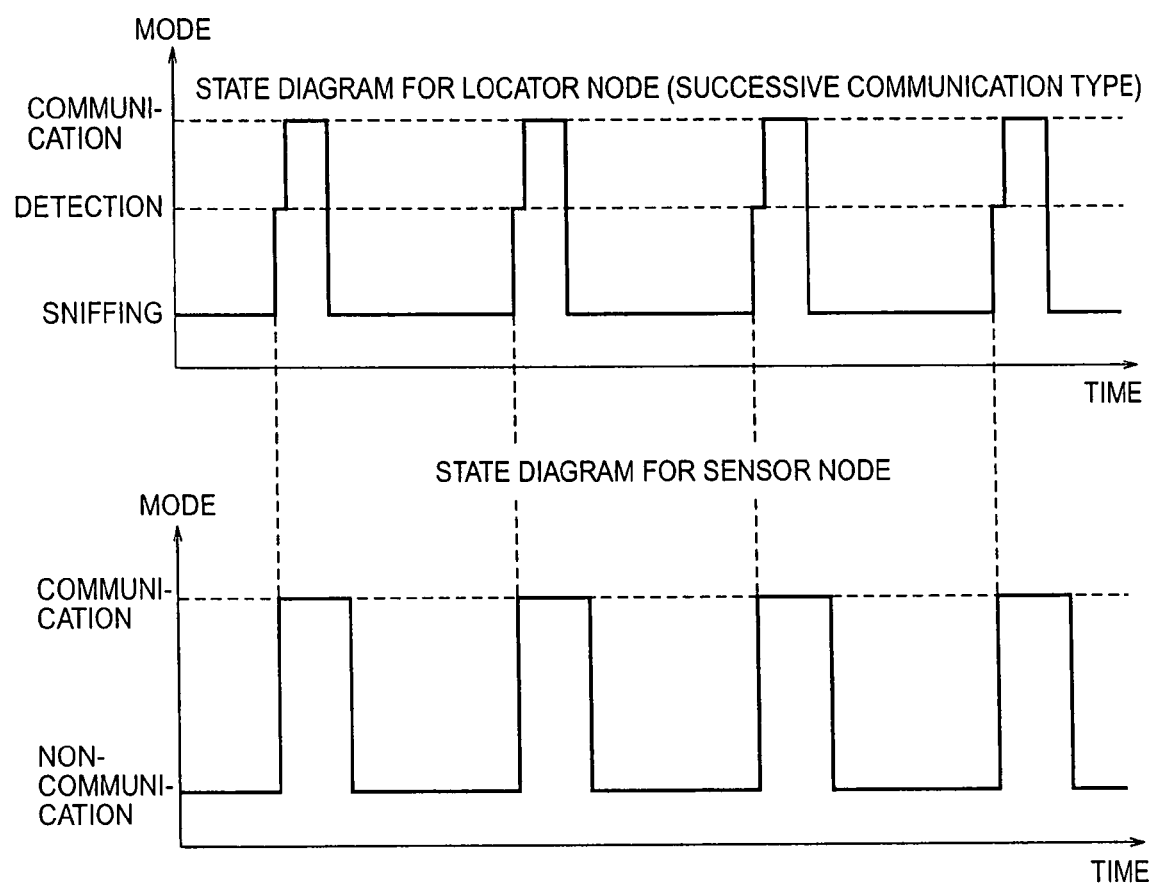
FIG. 11 is a view explaining an example of the state diagram of a locator node.

FIG. 11 is a view explaining a state diagram of a sensor node when the sensor node exists in the detection area of a locator node, and the corresponding state diagram of the locator node. Assume that the sensor node carries out communication periodically or by certain event-driven such as based on a sensing result or the like, and that the sensor node is repeating the communication mode and the non-communication mode alternatively (see the lower graph of FIG. 11).

On the other hand, assume that the locator node transits between three modes of node sniffing mode, detection processing mode, and communication mode (see the upper graph of FIG. 11). When the locator node is in the sniffing mode (S110 of FIG. 21), if the sensor node carries out communication, then the locator node detects the communication and the locator node changes to the detection processing mode (S113 of FIG. 21). In the detection processing mode, the locator node obtains ID information of the sensor node from the sniffed signal of the sensor node, and changes to the communication mode (S115 of FIG. 21), and transmits the obtained ID information of the sensor node (S116 of FIG. 21), and thereafter changes to the sniffing mode. The locator node carries out a series of operations successively every time it sniffs communication from the sensor node. Because in this way the locator node returns to the sniffing mode automatically, the locator node can obtain more information.

FIG. 12 is a view explaining the state diagram when two sensor nodes exist in the detection area of a locator node. Upon detection of communication of a sensor node 1, the locator node transmits ID information of the sensor node 1 as a node 1 detection signal, and upon detection of communication of a sensor node 2 it transmits ID information of the sensor node 2 as a node 2 detection signal. If communication of a sensor node occurs when the locator node is in a mode other than the node sniffing mode, the locator node cannot sniff communication of the sensor node, but in this case it sniffs in the next communication. In order to shorten the period that a locator node cannot sniff communication of the sensor node, as much as possible, shortening of the communication time of the locator node and sensor node, or resending of the communication of the sensor node, or the like may be carried out.

Figure 13:
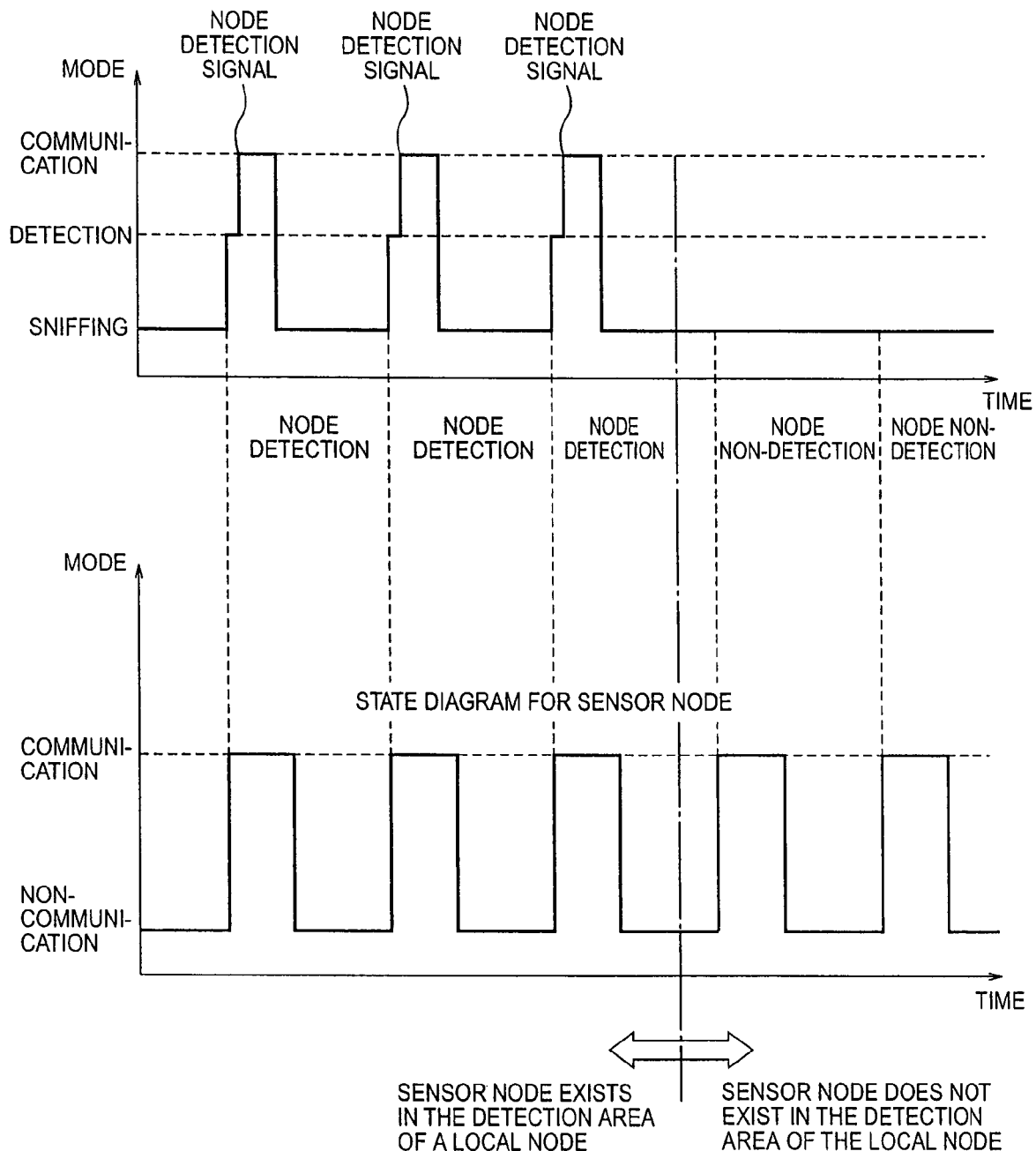
FIG. 13 is a view explaining an example of the state diagram of a locator node.

FIG. 13 is a view explaining the state diagram when a sensor node moved and departed from the detection area of a locator node. As shown in the view, while the sensor node exists in a detection area, the same state diagram as that of FIG. 11 is repeated, but after the sensor node departed from the detection area, the locator node cannot detect communication of the sensor node, and thus a node detection signal will not be transmitted from the locator node.

FIGS. 11-13 each show a method of a successive communication type in which every time a locator node sniffs communication of a sensor node, it transmits a detection signal, but in the case where the communication frequency of the sensor node is high or in the case where many sensor nodes exist in the detection area of the locator node, the communication frequency of a detection signal transmitted from the locator node becomes high, thus increasing the traffic.

Figure 14:
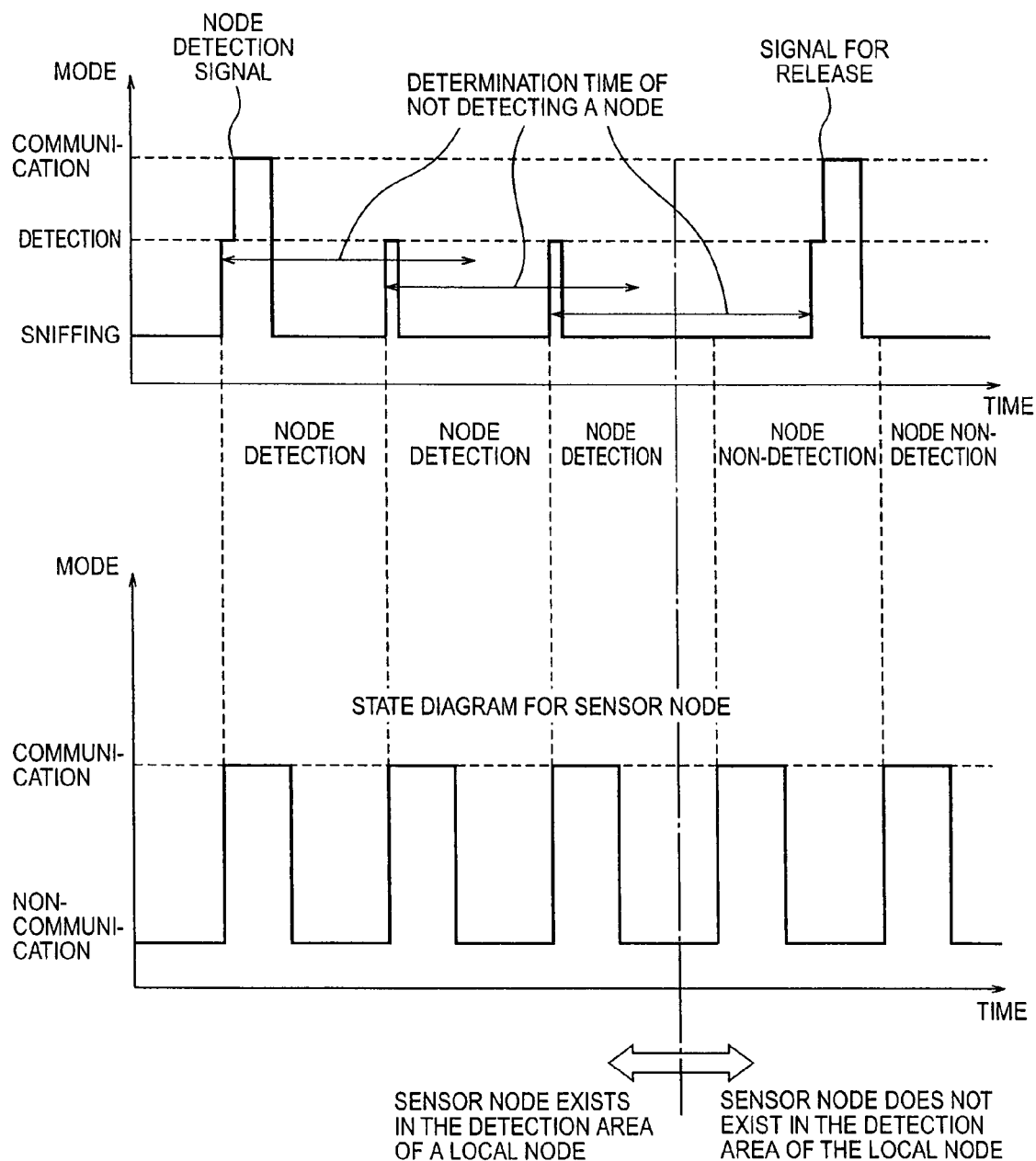
FIG. 14 is a view explaining an example of the state diagram of a locator node.

Then, as shown in FIG. 14, a method of a concurrent communication type may be used in which when a locator node detects communication of a sensor node for the first time, it transmits a node detection signal, and when the locator node can not detect communication of the sensor node, it transmits a signal for release.

In FIG. 14, the locator node detects communication, which the sensor node carried out for the first time after entering the detection area of the locator node, and transmits a node detection signal. The locator node has a "non-detecting determination time", and upon sniffing of the next communication from the same sensor node within this "non-detecting determination time", it detects the sensor node but does not transmit the detection signal. When the locator node could not detect the next communication from the same sensor node within the "non-detecting determination time" from the last detection of communication, such as when the sensor node departed from the detection area, or when the subsequent communication is not carried out due to other reasons, or the like, the locator node adds information indicative of departure of the sensor node after the "non-detecting determination time", to the sensor node ID information, and transmits this as a signal for release.

Moreover, the "non-detecting determination time" is a time specified for each sensor node, and thus even detection of communication from a different sensor node within a "non-detecting determination time" of a certain sensor node would not affect the measurement of the relevant "non-detecting determination time". For the "non-detecting determination time", a predetermined flat value may be used, or a value tailored to the communication interval of a detected sensor node may be used. For this purpose, a memory in the locator node holds a table in which the ID of a sensor node or the type thereof and information for determining the corresponding "non-detecting determination time" are described, and by referring to the table from the ID of a detected sensor node the "non-detecting determination time" is determined for setting up. Alternatively, it is also possible to inquire the distributed data processing server DDS when transmitting a node detection signal for the first time, and receive, as a command from the DDS, information on determining the "non-detecting determination time" for setting up.

Decision of whether to operate the locator node in the successive communication type or in the concurrent communication type can be implemented so as to cause the controller CNT of the locator node to carry out a pre-selected processing. Moreover, both methods may be provided so as to be switched by means of a DIP switch or the like attached to the locator node. Moreover, a method selected by the system administrator or the application developer may be transmitted as a command to a locator node through the directory server DRS, distributed processing server DDS, and base station BST, to thereby be switched. A means for observing a congestion situation or the like of transmission lines of wireless communication may be provided, so that a processing of selecting the concurrent communication type when the transmission lines are congested, and otherwise selecting the successive communication type and transmitting a switching command to a locator node is registered as an action by the function of the sensor-net system SNS, and upon acquisition of the congestion situation as an event, the event-action manager of the distributed data processing server DDS may determine to switch.

<Arrangement of Locator Nodes>

Figure 15:
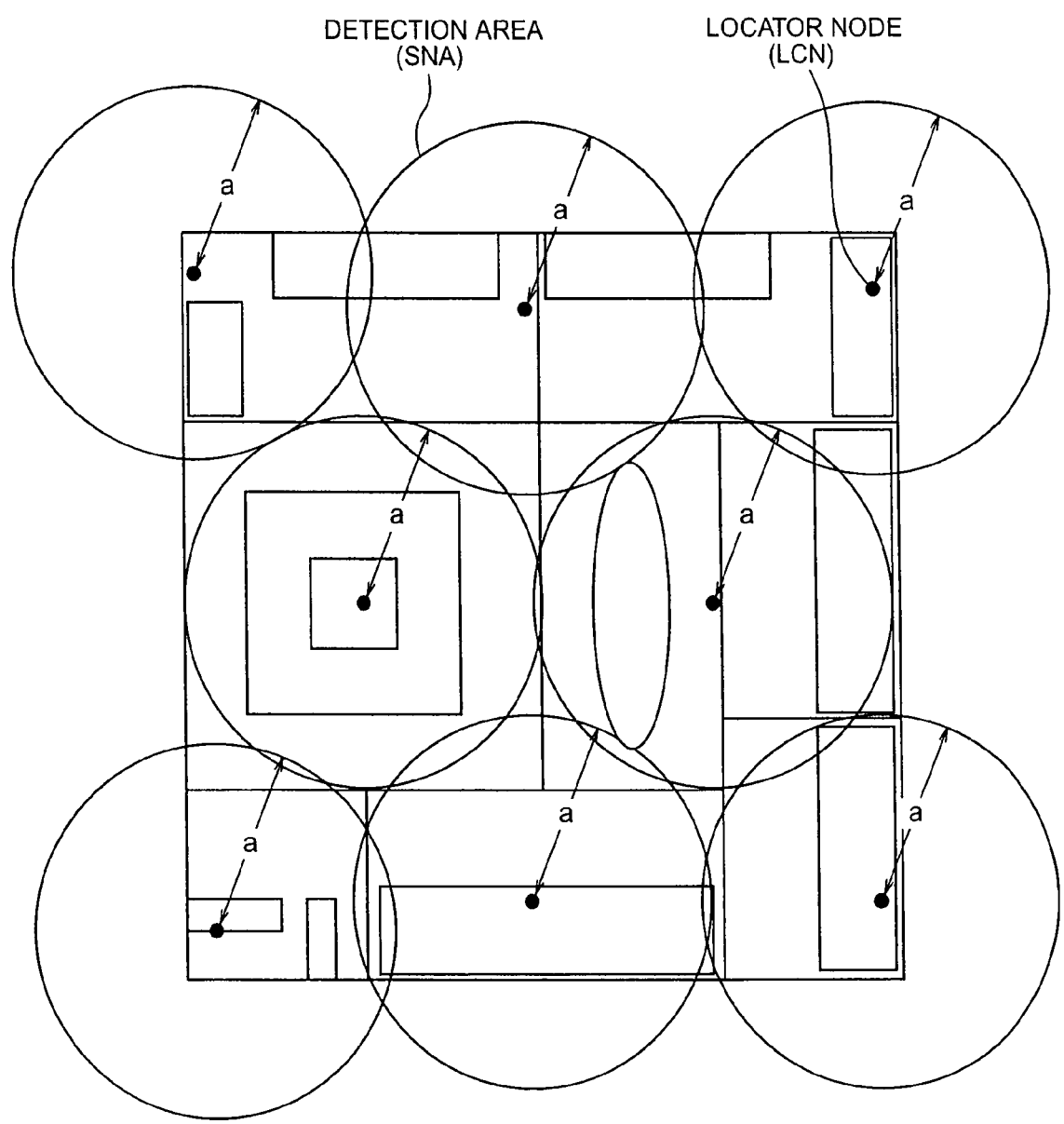
FIG. 15 is an example of arranging locator nodes in an observation field.

FIGS. 15-18 show an example of arranging locator nodes in an observation field. A small circle shown in the views indicates the locator node LCN, and a large circle indicates a detection area SNA thereof. FIG. 15 shows a setting example in which a whole observation field is covered with the detection areas SNA of a plurality of locator nodes. In this setting, increasing the radius a of the detection area allows the whole observation field to be almost covered with few locator nodes.

Figure 16:
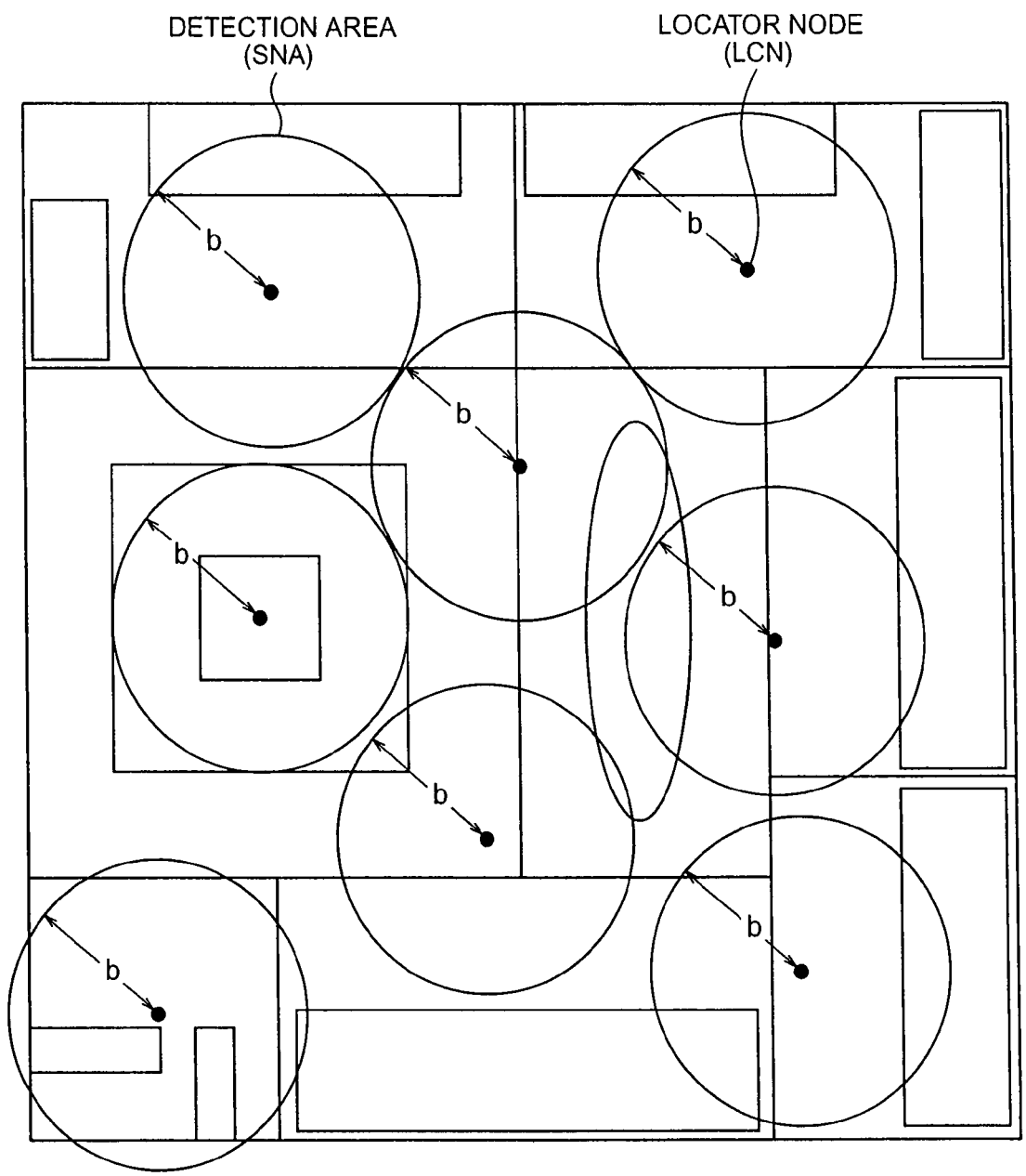
FIG. 16 is an example of arranging the locator nodes in the observation field.

FIG. 16 shows an example of setting detection areas having a relatively small detection radius b with the use of the same number of locator nodes. In this setting, with few locator nodes a position can be identified with high accuracy, but the whole observation field is not covered, so that there are areas where the position of a sensor node cannot be identified. In such a case, for example, the moving velocity and moving direction of a mobile sensor node are calculated based on the time when the mobile sensor node was detected and the arrangement of locator nodes, and then the moving direction and distance from the last observation point to the present point are integrated over time, thereby allowing the approximate position to be estimated. This allows the whole observation field to be covered even with few locator nodes. The computation of the moving velocity and moving direction, and the position estimation based on this are carried out in the application system APS or in the directory server DRS.

Figure 17:
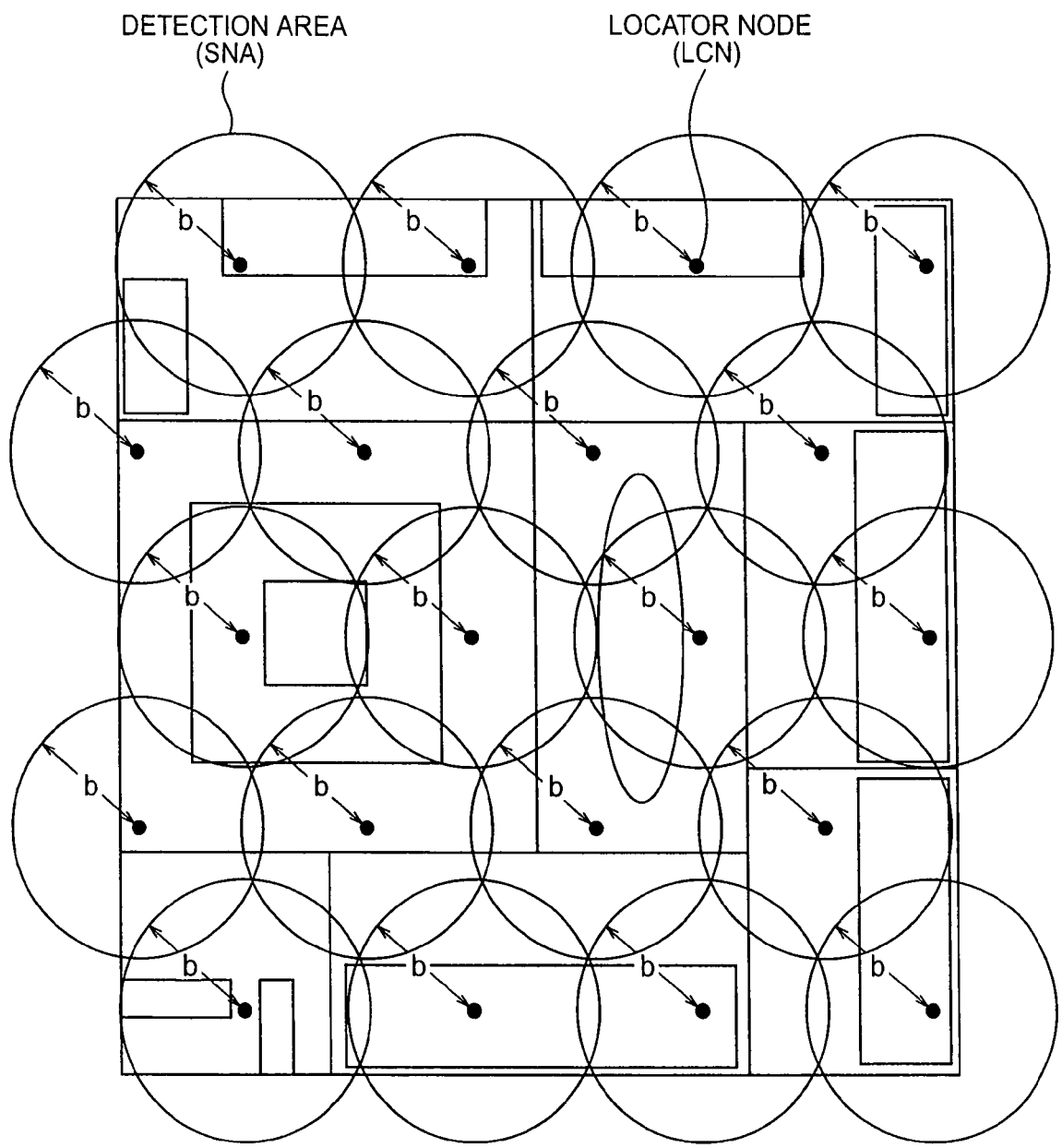
FIG. 17 is an example of arranging the locator nodes in the observation field.

FIG. 17 shows an example in which many locator nodes having a detection area of a relatively small detection radius b are arranged densely in the observation field. According to this setting, the entire observation field can be covered with high locationing accuracy.

Figure 18:
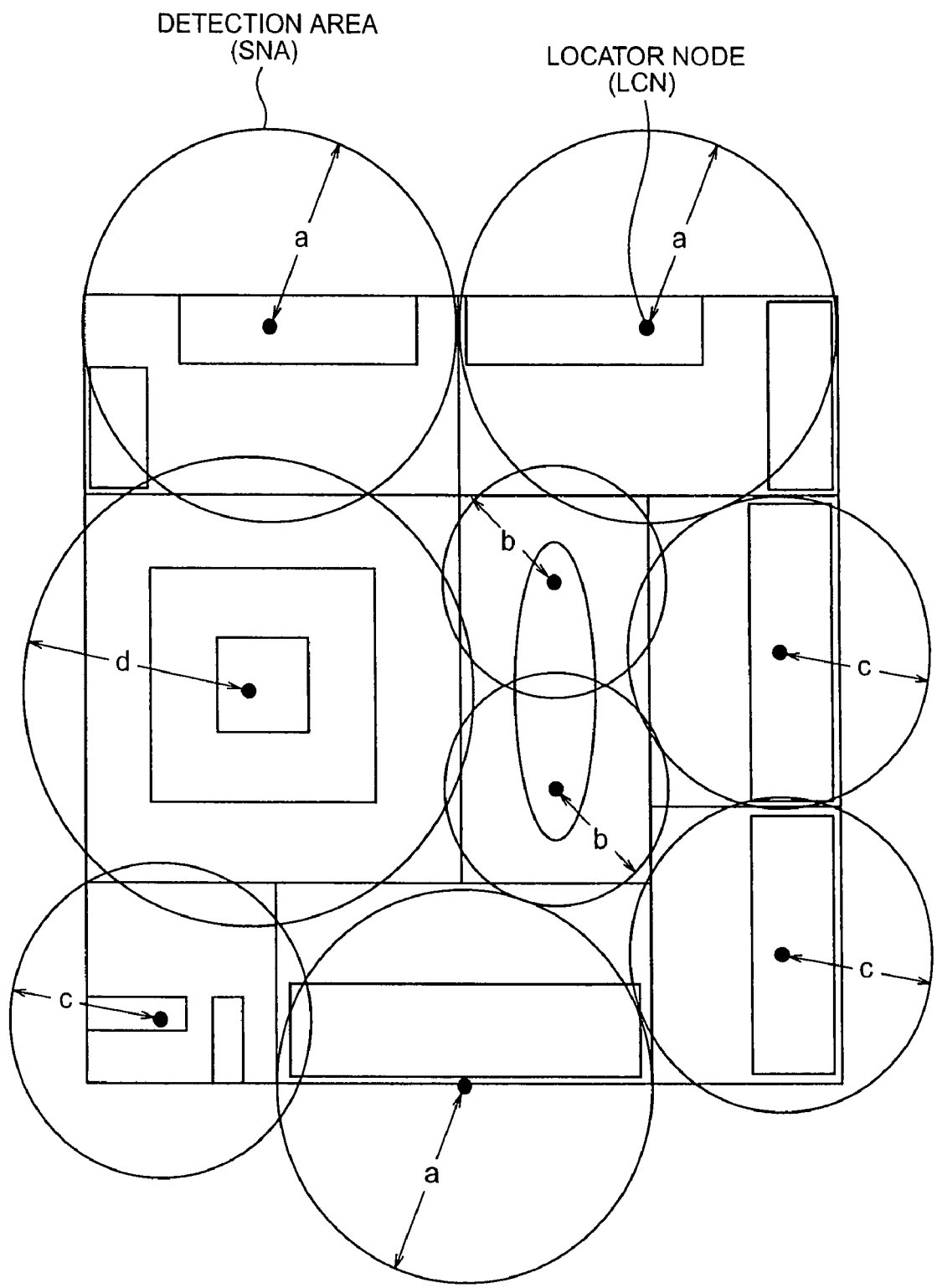
FIG. 18 is an example of arranging the locator nodes in the observation field.

FIG. 18 shows an example in which the arrangement of locator nodes LCN and the radius of the detection area SNA are tailored to the situation of the observation field. For example, in an area where an approximate position just needs to be known, a locator node of a large detection radius d is coarsely arranged, and in an area where you want to identify the position finely, locator nodes of a small detection radius b are arranged densely. In the intermediate area, locator nodes of an intermediate detection radius c are arranged, thereby allowing the required accuracy and coverage to be realized without increasing the number of locator nodes significantly.

In this way, by adjusting the number and the arrangement of locator nodes and the detection radius of detection areas, it is possible to carry out locationing with a setting optimum for the observation field and the application.

Figure 19:
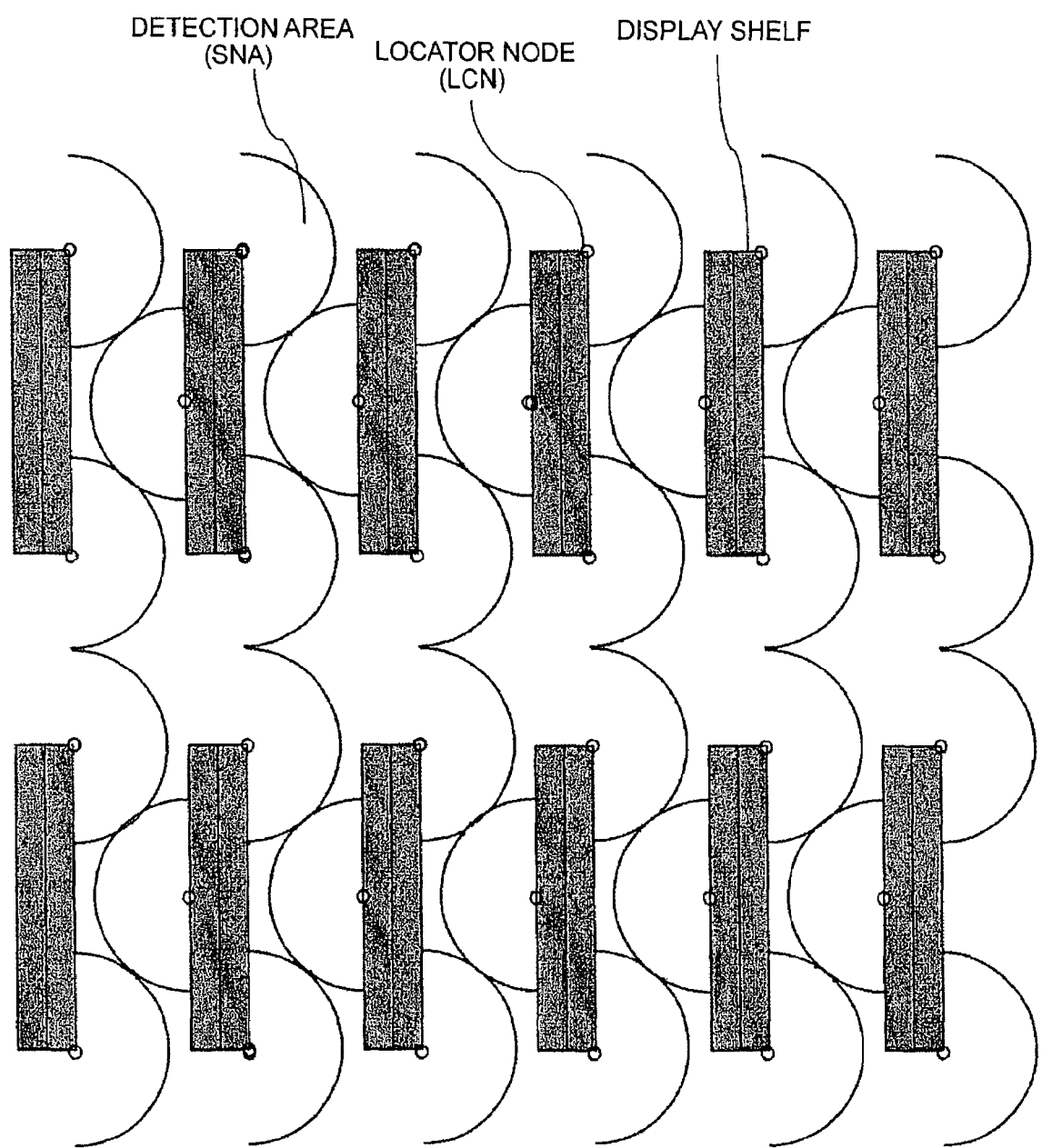
FIG. 19 is an example in case of controlling the directivity of a locator node.

FIG. 19 shows an example of controlling the directivity of a detection area in the node sniffing mode of a locator node LCN by giving a directivity to an antenna or by installing a radio-shielding object around the antenna or the like. For example, assume an application in which a locator node is installed on a commodity display shelf of a store to thereby identify the position of a mobile sensor node. Here, in the case where you want to know at which side of a passage between display shelves a mobile sensor node exists, if a control is made such that the shape of a detection area may be semi-circle, for example, seen from above by installing a shielding object around an antenna, or by using a directional antenna, or the like, the detection area can be limited to only the set direction. Moreover, for example, an installation object by which a sufficient radio shielding can be obtained, such as a metallic display shelf, may be used as the shield.

<Installation Example of Sensor Network>

Figure 23:
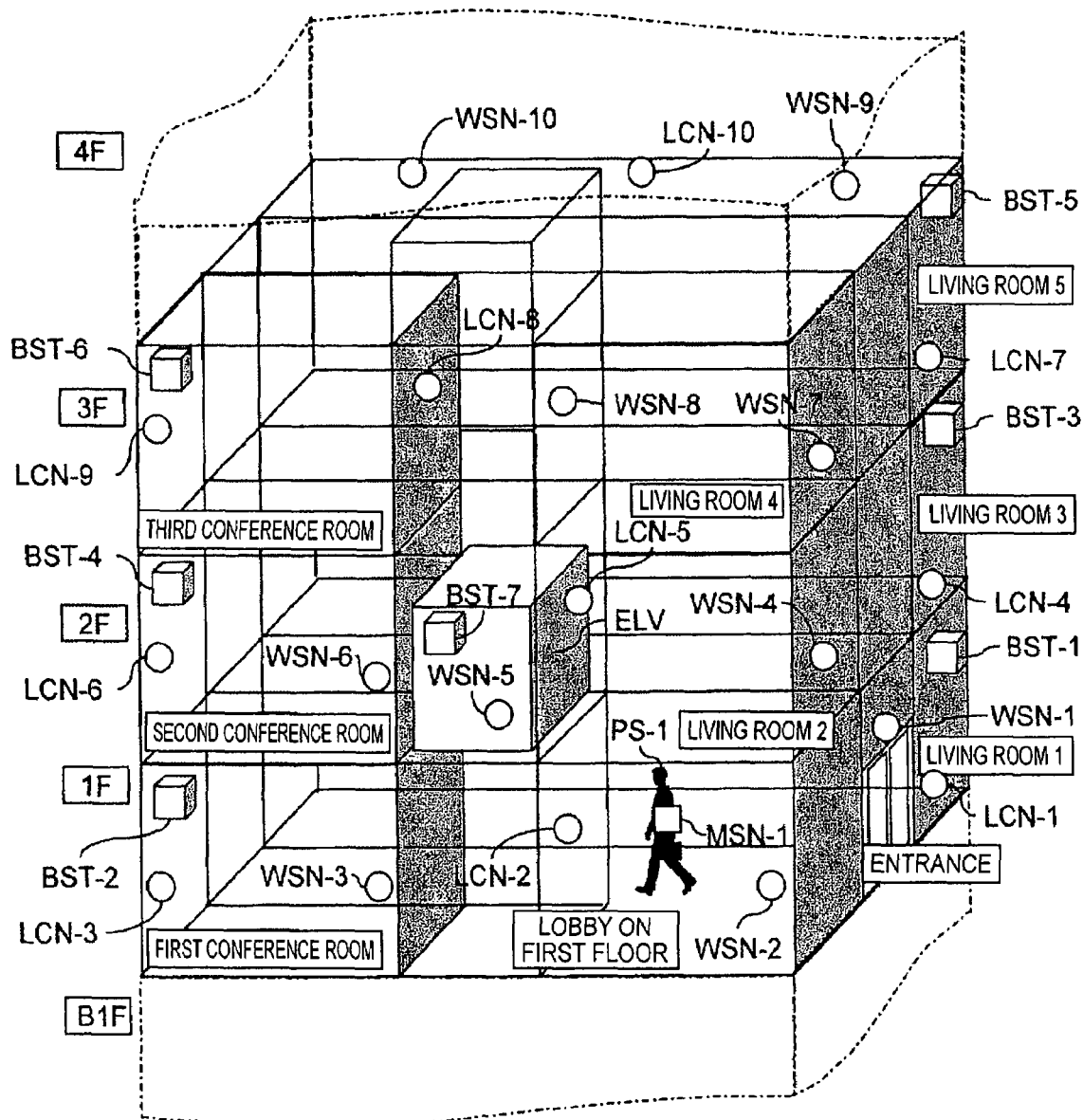

FIG. 23 is a view showing an installation example of sensor nodes and locator nodes connected to the distributed data processing server DDS. In the example of FIG. 23, an example is shown in which a base station is installed on each floor of an office building, a locator node is installed in a lobby, hallways, rooms, an elevator or the like, and a mobile sensor node is mounted to a person in the office building. Although this example will be described as an example of applying a wireless sensor node, whether the distributed data processing server and the sensor node are connected by a wireless network or connected by a wired network can be selected appropriately.

Within the office building of FIG. 23, for example, on the first floor, a base station BST-1 is installed in a living room 1, and a base station BST-2 is installed in the first conference room. Moreover, on the second floor, a base station BST-3 is installed in a living room 3, and a BST-4 is installed in the second conference room. Moreover, on the third floor, a base station BST-5 is installed in a living room 5, and a base station BST-6 is installed in the third conference room. A base station BST-7 is installed on a cage ELV of the elevator.

On the other hand, a locator node LCN is installed in each place in the office building, i.e., in places where the position of a mobile object such as people is to be identified. In FIG. 23, LCN-1 to LCN-10 are installed in an entrance, the lobby, the conference rooms, and the living rooms, respectively. A person PS-1 in the office building wears a name tag-like mobile sensor node MSN-1, for example. Moreover, WSN-1 to WSN-10 represent a stand alone type wireless sensor node. These wireless sensor nodes are installed, for example in the entrance to detect traffic of people with a human sensor, or are installed in the living room or the conference room to detect the absolute quantity of temperature, humidity, and brightness or a change thereof with a temperature sensor, a humidity sensor, and an luminance sensor.

The sensor nodes MSN-1, and WSN-1 to WSN-10, and the locator nodes LCN-1 to LCN-10 each transmit the state amount or a change in the state amount detected using a sensor by carrying out wireless communication with either one of the base stations BST-1 to BST-7 arranged in the office building, or transmit a node detection signal at the time of detecting the sensor node. The base stations BST-1 to BST-7 transmit to the distributed data processing server DDS through the networks NWK-2 to NWK-N shown in FIG. 1 the state amount or a change in the state amount received from the sensor node and the locator node.

<Operation Concept of Sensor Network>

Figure 24:
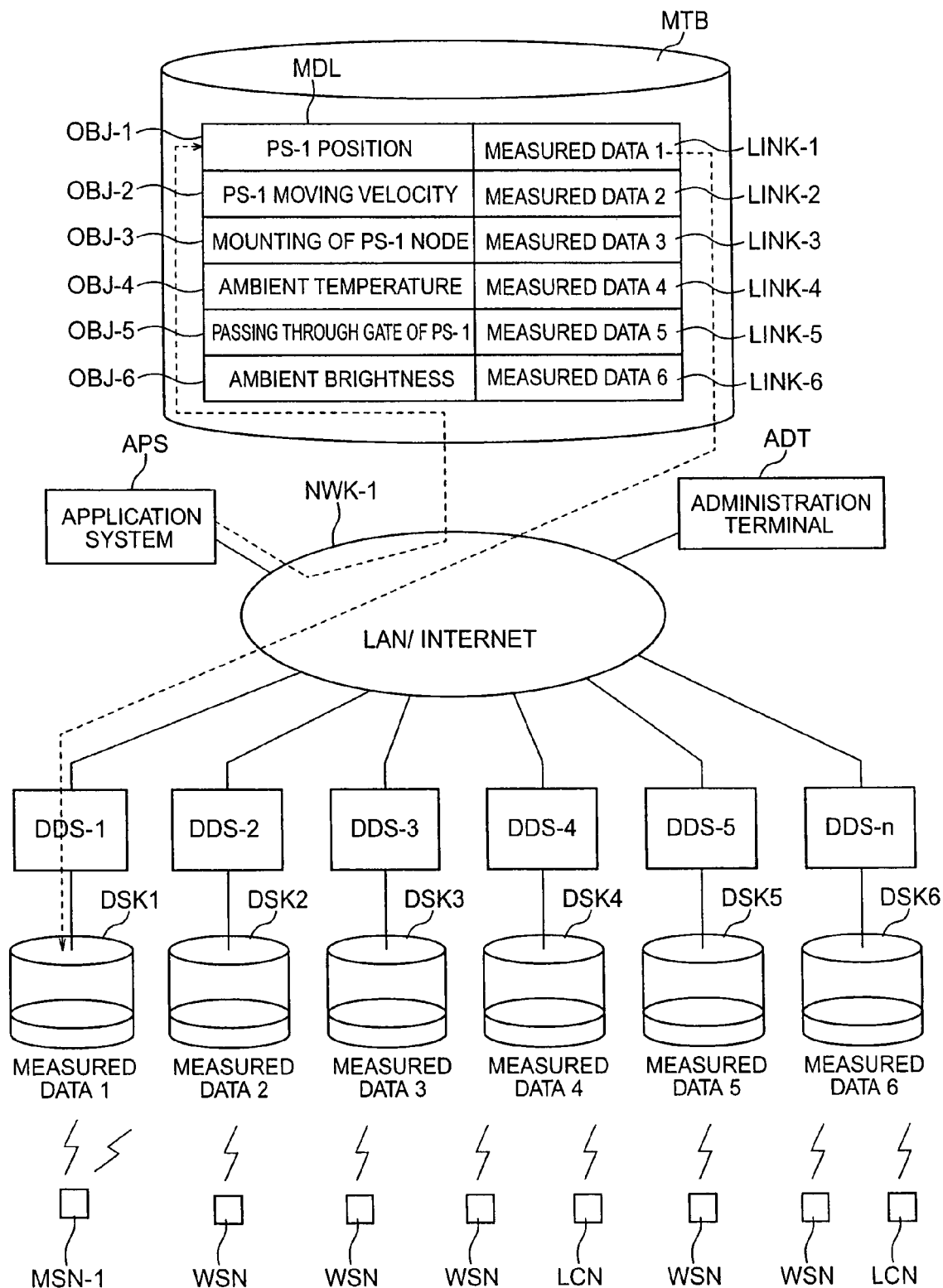
FIG. 24 is a block diagram showing an example of a relationship between objects and the measured data of sensor nodes.

Next, an overview of the operation of the sensor network SNS will be described using FIG. 24. FIG. 24 is a block diagram showing a relation between objects, which are specific forms of a real world model, and the measured data of sensor nodes.

The directory server DRS described using FIGS. 1 and 2 generates the following objects (from OBJ-1 to OBJ-6) in advance as the real world model as shown in FIG. 24 and defines them in a real world model list MDL of the model table for real world MTB. Here, it is presumed that the person PS-1 using the office building of FIG. 23 is shown, and this person has the wireless sensor node MSN-1 shown in FIG. 24.

The position information of the mobile sensor node MSN-1 is defined by the system manager NMG so as to be stored in the distributed data processing server DDS which the measured data 1 (data link pointer of FIG. 25) designates. The position information of the mobile sensor node MSN-1 is defined as the position of the locator node LCN that detected MSN-1.

Then, in the real world model list MDL of the model table for real world MTB, for an object (OBJ-1) which is a position of the person PS-1, presence of a data substance in a data link pointer of the measured data 1 (LINK-1) is defined, and the correspondence between the real world model and the actual data area is managed. In other words, in the real world model list MDL, the object which is the position (OBJ-1) of the person PS-1 is related to the data area of the distributed data processing server DDS corresponding to the measured data 1 (LINK-1). In the example of FIG. 24, the position information (in which base station BST it exists?) of the wireless sensor node MSN-1 indicating the position of the person PS-1 is stored in the disk system DSK of the distributed data processing server DDS-1, for example.

From the application system APS, a value of the PS-1 position (OBJ-1) can be accessed as if the value exists in the model table for real world MTB of the directory server DRS, however the actual data is stored not in the directory server DRS but in a preset disk system DSK 1 of the distributed data processing server DDS-1.

Moreover, an object (OBJ-2) which is a moving velocity of PS-1 is defined in the model table for real world MTB so that the moving velocity information of the moving sensor node MSN-1 may be stored in the measured data 2 (LINK-2). Although the method of calculating the moving velocity of the mobile sensor node MSN-1 is not limited in particular, as the simplest method it can be calculated from the time when the locator node LCN for detecting the moving sensor node MSN-1 switches. Moreover, the distributed data processing server DDS and the data area corresponding to the measured data 2 are defined and stored in a disk system DISK 2 of a distributed data processing server DDS-2, for example.

An object (OBJ-3) which is a node mounting state of PS-1 is defined in the model table for real world MTB so that the node mounting state, which is determined by detecting the attachment and detachment by means of a switch attached to a clip or the like of the name tag-type wireless sensor node MSN-1, may be stored in the measured data 3 (LINK-3). Moreover, the distributed data processing server DDS and the data area corresponding to the measured data 3 are defined. For example, the state of the switch attached to MSN-1 is stored in a disk system DISK 3 of a distributed data processing server DDS-3, for example.

An object (OBJ-4) which is ambient temperature is defined in the model table for real world MTB so that the temperature information measured by a temperature sensor of the wireless sensor node (e.g., WSN-3 in FIG. 23) connected to a base station (e.g., BST-1), to which the person PS-1 connects, may be stored in the measured data 4 (LINK-4). Moreover, the distributed data processing server DDS and the data area corresponding to the measured data 4 are defined. For example, the temperature from a wireless sensor node WSN-3 is stored in a disk system DISK4 of a distributed data processing server DDS-4, for example.

An object (OBJ-5) which is a state of PS-1 passing through a gate is defined in the model table for real world MTB so that person detection information measured by a human sensor of the wireless sensor node (e.g., WSN-2) connected to a base station (e.g., BST-1), to which the person PS-1 connects, may be stored in a measured data 5 (LINK-5). Moreover, the distributed data processing server DDS and data area corresponding to the measured data 5 are defined. For example, the person detection information from the wireless sensor node WSN-2 in FIG. 23 is stored in a disk system DISK 5 of a distributed data processing server DDS-5.

An object (OBJ-5) which is ambient brightness is defined in the model table for real world MTB so that luminance information measured by a luminance sensor of the wireless sensor node (e.g., WSN-3 in FIG. 23) connected to a base station (e.g., BST-1), to which the person PS-1 connects, may be stored in a measured data 6 (LINK-6). Moreover, the distributed data processing server DDS and the data area corresponding to the measured data 6 are defined. For example, the luminance from the wireless sensor node WSN-3 is stored in a disk system DISK 6 of a distributed data processing server DDS-6, for example.

In this way, each object OBJ defined in the model table for real world MTB stores the link pointer (LINK) corresponding to the measured data, and thus from the application system APS side the target data appears to be present in the directory server DRS, but the actual data is stored in the distributed data processing server DDS.

Then, in the information storing place LINK, a storing position of data to be used by the application system, the data being measured by a sensor node or being the secondary data obtained by converting the measured data into a form to be readily used by the application system, or the like, is set. The measured data from a sensor node is collected and accumulated in each distributed data processing server DDS, and if an event action is set in advance as describe below, a processing or the like is applied to the measured data, which is then stored as a secondary data in a predetermined distributed data processing server DDS.

Actual data collection and data accumulation from the sensor nodes, and data processing are carried out in the distributed data processing server DDS, and the directory server DRS manages the real world model, the information storing places, the definition of the sensor node, and the like.

Accordingly, the application system developer can obtain a desired data corresponding to a measured value (or secondary data) of a sensor node by retrieving the object OBJ without any need to know a position of the sensor node.

Then, the directory server DRS manages the data link pointer (linking destination) for each object OBJ, and the actual data is stored and processed in the distributed data processing server DDS. Thus, even when the number of sensor nodes is enormous, it is possible to prevent excessive loads on the distributed data processing server DDS. In other words, while using many sensor nodes, it is possible to suppress excessive traffic load on the network NWK-1 that interconnects the directory server DRS, the distributed data processing server DDS, and the application system APS.

In a state after a predetermined time elapsed from the start of measurement, the actual measured data from the sensor node is written in the disk systems DISK 1-DISK 6 of the distributed data processing server, and the amount of data increases with time.

However, in the link pointers LINK-1 to LINK-6 corresponding to the objects OBJ-1 to OBJ-6 set in the model list MDL of the model table for real world MTB of the directory server DRS, the amount of information does not change even if time elapses, but only the contents of information indicated by the link pointers LINK-1 to LINK-6 change.

In addition, although the example of FIG. 24 shows an example of storing in a different data processing server for each object, different objects can be stored in a disk system of the same data processing server, needless to say. In which data processing server the measured data of which object is to be stored may be determined from the viewpoint of easiness to handle the data processing, or the like.

<Relation Between Measured Data and Event>

Figure 26:
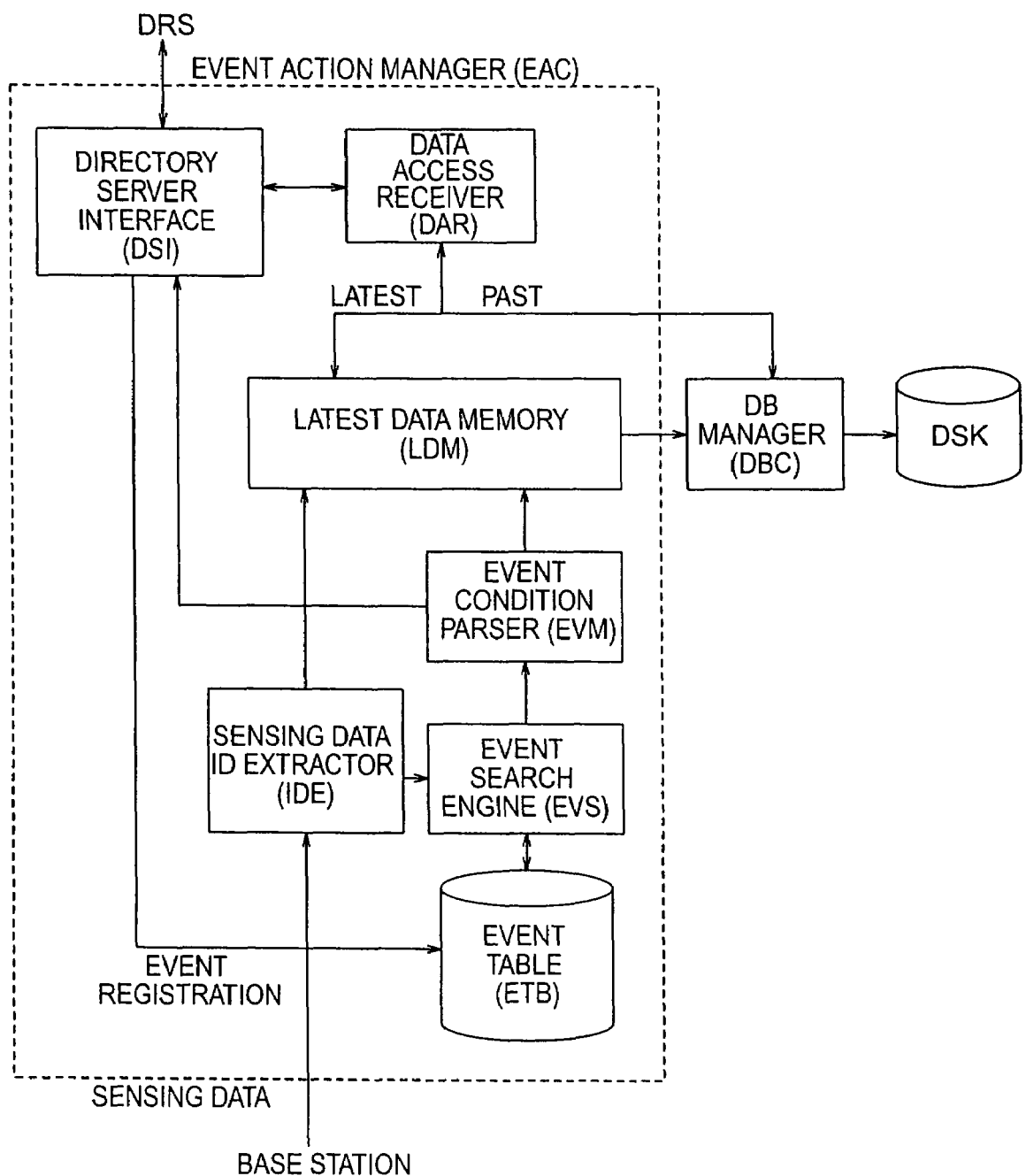
FIG. 26 is a block diagram showing an example of an event-action manager of a distributed data processing server DDS.
Figures 27, 28:
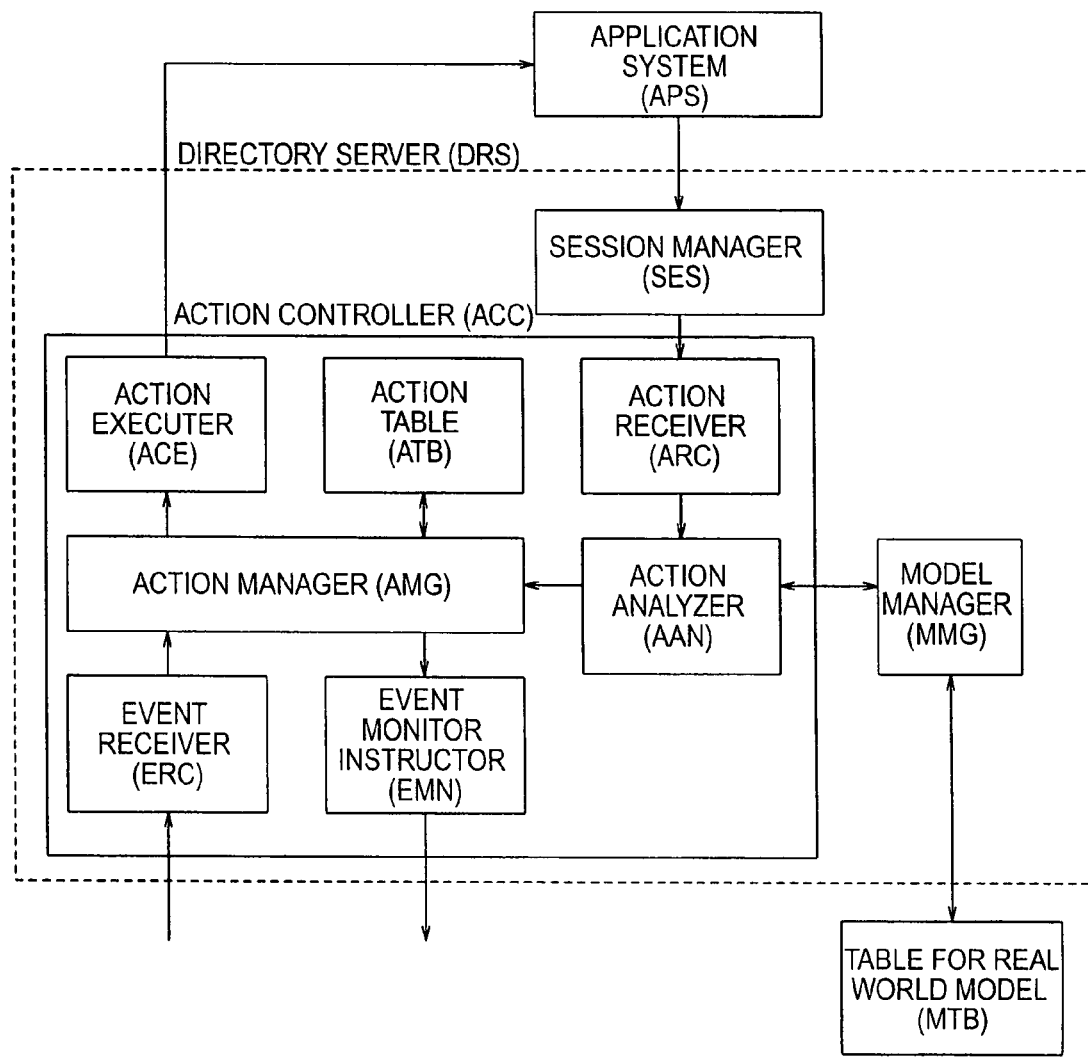
FIG. 27 is a view explaining an example of an event table.
FIG. 28 is a block diagram showing an example of an action controller ACC in a directory server DRS.

Next, FIG. 25, FIG. 26, and FIG. 27 show a relation between measured data collected by the distributed data processing server DDS and event actions based on the measured data.

FIG. 25 shows an example of a sensor information table STB managed by the directory server DRS. The sensor information table STB is stored in the model table for real world MTB. In the sensor information table STB, a sensor type, a meaning of sensing information, a measured value, an installation place, a sensing interval, and a data link pointer are stored for each data ID given to the measured data. Although here, an ID is given for each measured data considering that one sensor node is related to multiple types of sensing data, the sensor node ID can be used in place of the data ID if one sensor node is related to only one type of sensing data. Moreover, the example of information stored in the sensor information table shown in FIG. 25 is just one example, and both increase and decrease in the information to store are possible depending on the necessity for managing the sensor network system.

In FIG. 26, the event-action manager EAC of the distributed data processing server DDS includes an event table ETB for relating the measured data to an event through a directory server interface DSI, the measured data being collected from the base station BST. As shown in FIG. 27, in the event table ETB, one record is composed of a data ID (DID) assigned for each sensor node and given to the measured data, EVT which is an event generation judging condition regarding the measured data, and a data holder DHL that determines whether or not to store the measured data into the database DB.

For example, in the view, regarding a measured data whose data ID is "XXX", event generation is notified to the directory server DRS when its value is larger than A1. Moreover, a measured data whose data ID is "XXX" is set up to be written in the disk system DSK upon arrival of the data.

In the distributed data processing server DDS, the measured data received from the base station BST is first received by a sensing data ID extractor IDE, and a data ID which is an ID given to the measured data is extracted. Moreover, the sensing data ID extractor IDE sends the measured data to a latest data memory LDM.

The extracted data ID is sent to the event search engine EVS, where the event table ETB is retrieved and if there is a record that matches the data ID, then event contents EVT of the relevant record and the measured data are sent to an event condition parser EVM.

The event condition parser EVM compares a value of the measured data with the event contents EVT, and notifies event generation to the directory server DRS through the directory server interface DSI when the conditions are satisfied. Moreover, the event condition parser EVM transmits a data holder DHL request to the latest data memory.

The DB manager DBC receives data where the data holder DHL of the event table ETB is YES from the latest data memory LDM and writes this in the disk system DSK.

When the directory server interface DSI receives a measured data reference request from the directory server DRS, the distributed data processing server DDS sends the relevant access request to a data access receiver DAR.

If the access request is the latest data, the data access receiver DAR reads the measured data corresponding to data ID included in the access request from the latest data memory LDM and returns this to the directory server interface DSI. Alternatively, if the access request is past data, the data access receiver DAR reads the measured data corresponding to the data ID included in the access request from the disk system DSK and returns this to the directory server interface DSI.

In this way, the distributed data processing server DDS holds the latest data among the data of the sensor node collected from the base station BST in the latest data memory LDM, and records only the data, which is expected to be referred to later, in the disk system DSK. It is also possible to record the data in the disk system DSK only when the event is generated. In this case, it is possible to prevent an increase in the disk usage due to data being periodically (observation interval) collected. With the method described above, it is possible to manage the plurality of base stations BST (in other words, many sensor nodes) at one distributed data processing server DDS.

<Action Controller>

FIG. 28 is a block diagram showing the detail of the action controller ACC of the directory server DRS.

The action controller ACC automatically carries out a preset operation (action) based on the event generation that is received from the event-action manager EAC of the plurality of distributed data processing servers DDS.

For this reason, the action controller ACC comprises: an action receiver ARC for receiving action setting from the application system APS through the session manager SES; an action analyzer AAN that analyzes a received action with reference to information of the model table for real world MTB through the model manager (MMG) and sets the function (or load) sharing between the directory server DRS and the distributed data processing server DDS according to a result of the analysis; an action manager AMG for managing the definition and execution of an action; an action table ATB for storing a relation between the event and action in response to a setting request from the application system APS; an event monitor instructor EMN for sending to the distributed data processing servers DDS-1 to DDS-n a command for monitoring the event defined in the action table ATB; an event receiver ERC for receiving an event notification generated in each of the distributed data processing servers DDS-1 to DDS-n; and an action executer ACE for executing a predetermined operation based on the received event and the definition in the action table ATB.

Figure 29:
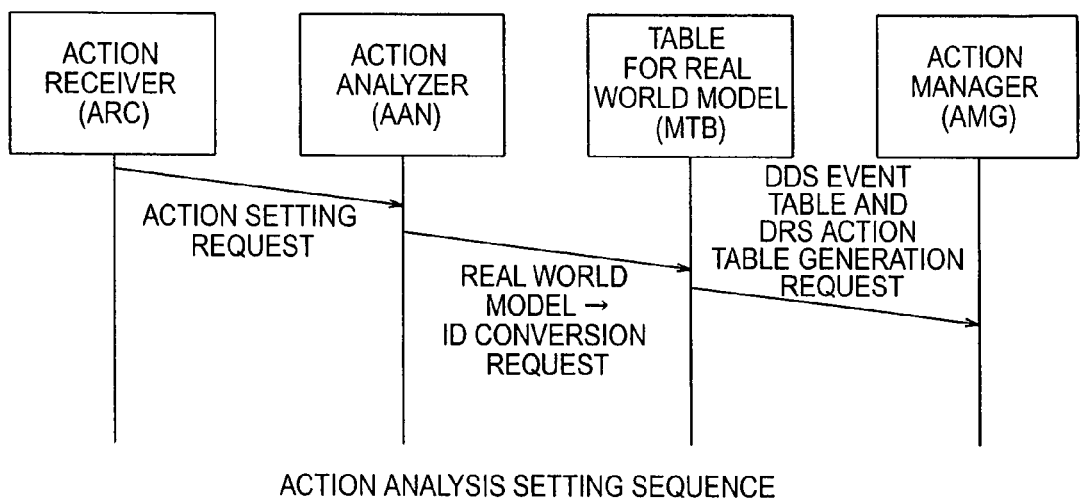
FIG. 29 is a view explaining an example of an action table.

Action registration will be described with reference to a time chart of FIG. 29. In FIG. 29, first, the application system manager connects to the action controller ACC in the directory server DRS from the application system APS and requests action setting. As an exemplary action, a case of setting of action to monitor that Mr. X passes through a gate such as an entrance and transmit a notification to the application system APS will be described.

Upon receipt of this action setting request, the action receiver ARC in the action controller ACC requests the action setting to the action analyzer AAN. The action analyzer AAN selects data ID of a monitoring target and determines a state of the measured data to generate an event. That is, the action analyzer AAN constructs an event in the real world of "passing through the gate of Mr. X" as a model which can be determined based on a sensing data accumulated in the sensor-net system.

Here, in the case of Mr. X=person PS-1, a model has been already defined in the model table for real world MTB as shown in FIG. 24, and thus a data ID (assume "X2") and a data link pointer (distributed data processing server DDS 1) for storing data are obtained from the real world model list MDL.

Next, in order to generate an event of "passing through the gate of Mr. X" at the distributed data processing server DDS, the action manager AMG transmits a command for generating the event of "passing through the gate of Mr. X" to the distributed data processing server DDS that manages the selected sensor node. Then, the action manager AMG sets an action of "transmitting a notification to the application system" in the action table ATB and sets the sensor node ID as an ID of an event for executing the relevant action.

Figure 30:
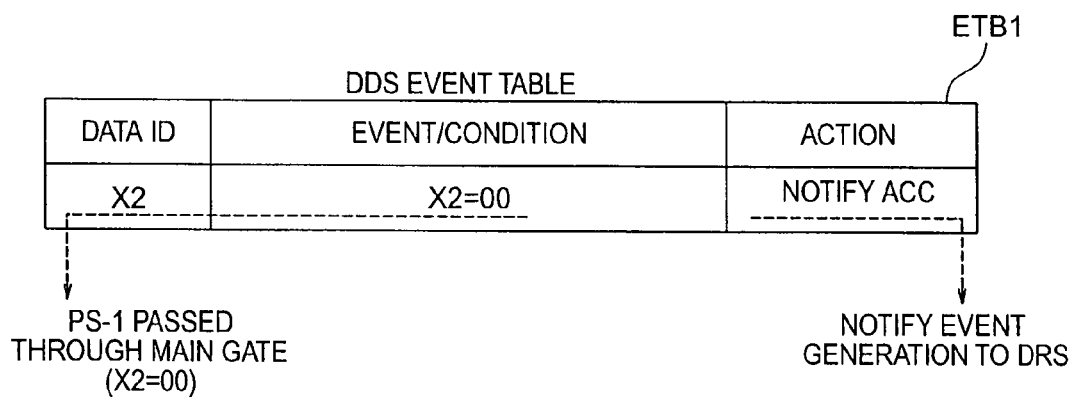
FIG. 30 is an explanatory view showing an example of an entry to an event table of the distributed data processing server DDS.

As shown in FIG. 30, at the distributed data processing server DDS that has received the command from the action manager AMG of the directory server DRS, for data ID=X2 obtained from the real world model list MDL, a condition "00" of "passing through the gate" and the action controller ACC of the directory server DRS as a notification destination of an event to be executed as an action are registered.

This will be specifically described using an example of FIG. 24. The directory server DRS causes the data processing server DDS-1, which manages the object OBJ-1 (position information on the wireless sensor node MSN-1), to register the event table ETB shown in FIG. 30. Here, assuming that the condition "00" is an ID of a base station that includes the relevant gate within the communication range, then the value of "00" will be returned as the value of the data ID (X2) corresponding to the object OBJ-1 (position information on the wireless sensor node MSN-1) when the person PS-1 passed through the relevant gate. When the real world event and the sensing information are related to each other in this manner and the condition of X2=00 is satisfied, the data processing server DDS-1 notifies an event generation to the action controller ACC in the directory server.

The above event generation condition is just one example, needless to say. For example, both of the information of a human sensor attached to the gate and the position information on the person PS-1 might be used as an event generation condition.

Figure 31:
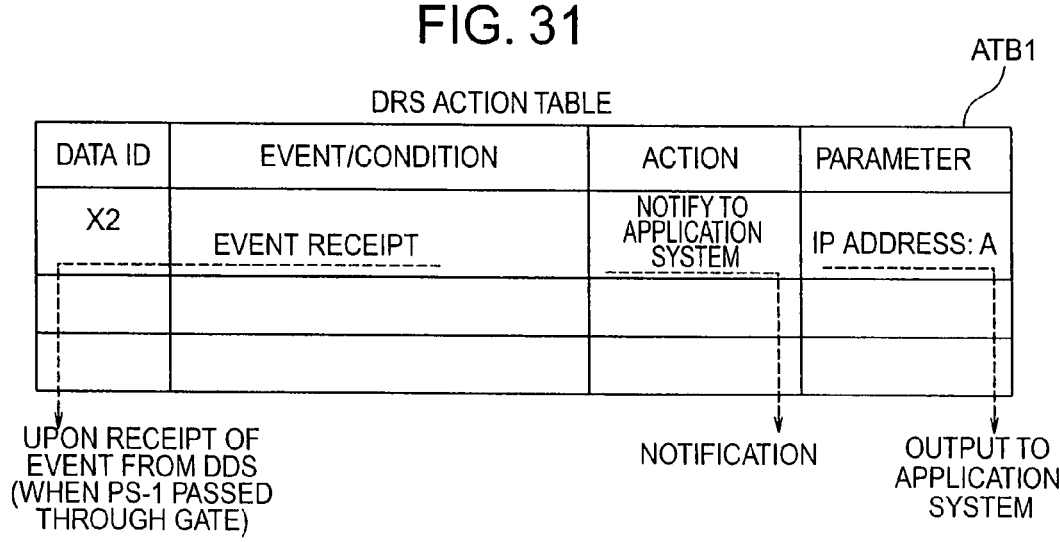
FIG. 31 is an explanatory view showing an example of an entry to an action table of the directory server DRS.

Moreover, the action table ATB of FIG. 31 is the action table ATB of the directory server DRS, and the data ID=X2 indicative of "passing through the gate of PS-1" is set in the data ID column indicative of an event ID of the monitoring target. Moreover, receipt of an event generation from the distributed data processing server DDS-1 is set in the event condition column, and notification to the application system APS is set in the column of action executed by the directory server DRS. Moreover, an IP address indicative of the application system APS is set in the action parameter column.

As shown in FIG. 31, the action, which the action manager AMG registers in the action table ATB, is set such that the receipt of the event of data ID=X2 is a condition of the event, and an action of notification to the application system is carried out to the address described in the parameter column.

Figure 32:
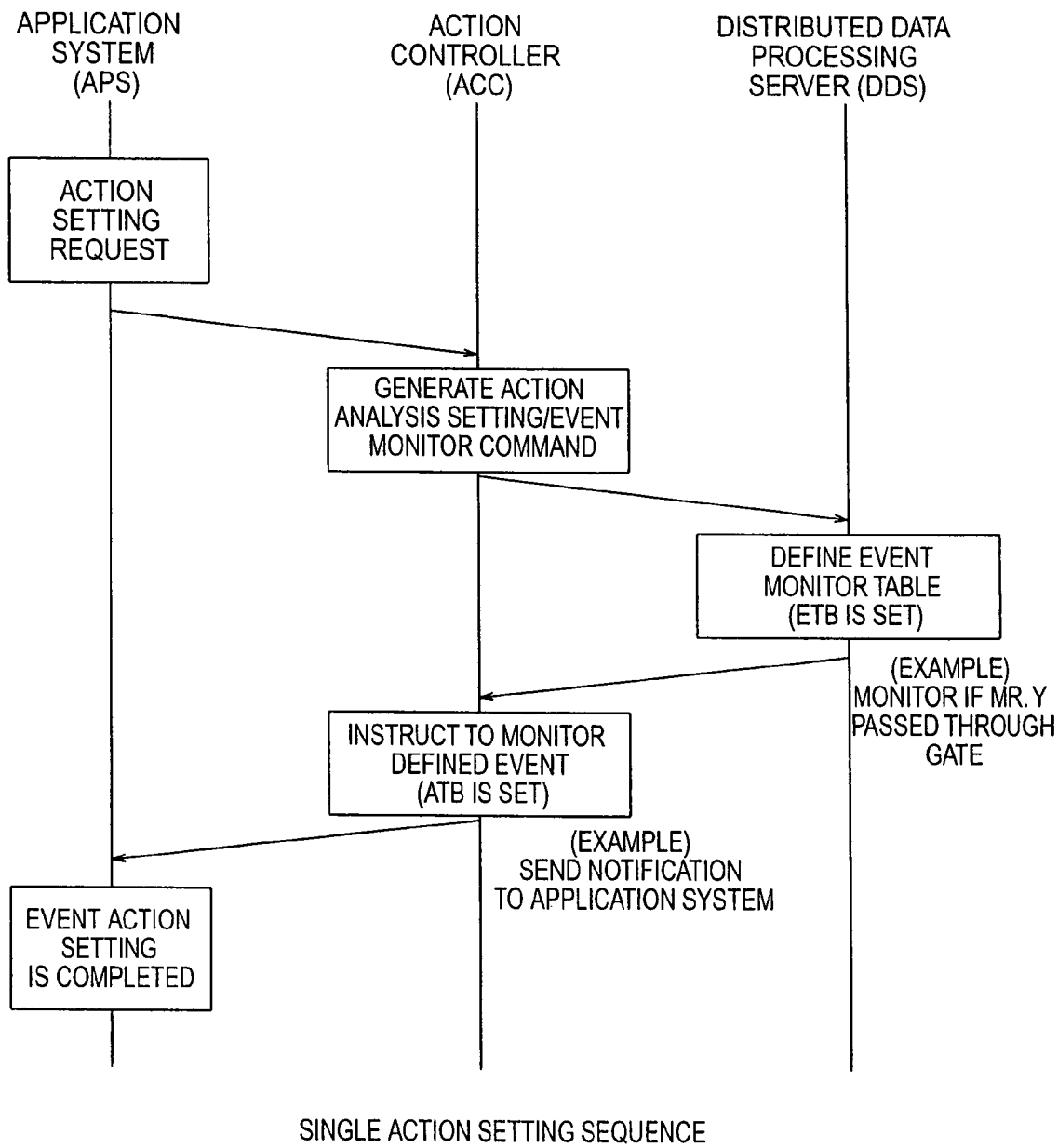
FIG. 32 is a time chart showing an example of a setting flow of a single action.

As described above, one action executed from one event generation is set as a single action, and the action setting described above takes a flow shown in FIG. 32. In other words, an action setting request is made from the application system APS to the action controller ACC in the directory server DRS, and a command for analyzing the action and monitoring the event is generated by the action controller ACC, and the event table ETB is defined by the event-action manager EAC in the distributed data processing server DDS. Subsequently, the action manager AMG of the action controller ACC instructs the event receiver ERC to monitor the registered event (data ID=X2). Accordingly, the action controller ACC notifies completion of a series of action setting operations to the application system.

<Execution of Action>

Figure 33:
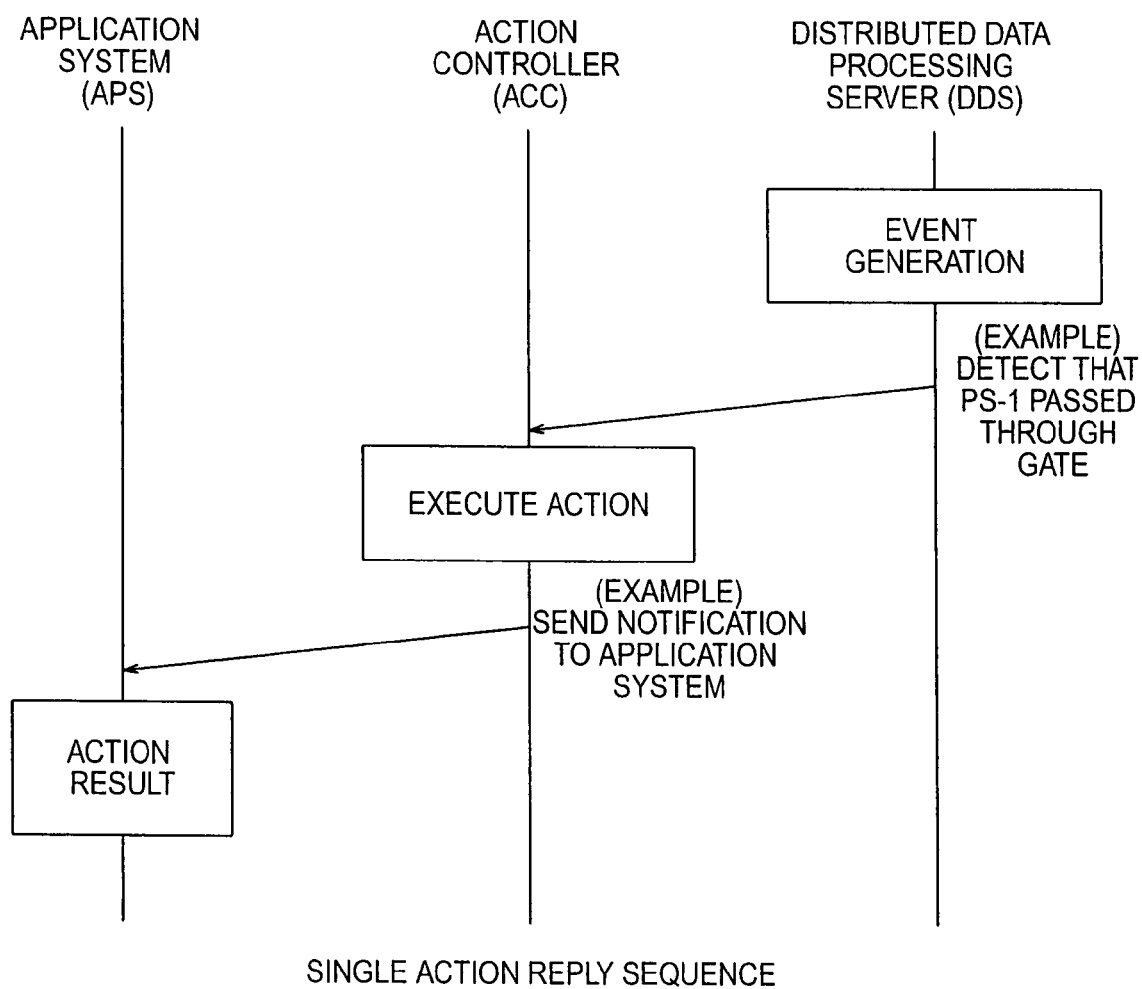
FIG. 33 is a time chart showing an example of a reply flow of a single action.

FIG. 33 is a time chart showing execution of the registered action. If the measured data of a monitoring sensor node changes to "00", which is an event generation condition, and "passing through the gate of Mr. X" is determined, then the distributed data processing server DDS-1 generates an event notification regarding the data ID=X2.

This event generation is notified from the distributed data processing server DDS to the directory server DRS and is received by the event receiver ERC of FIG. 28. The action manager AMG in the directory server DRS retrieves the action table ATB of FIG. 31 from the ID of the received event, and determines if there is a relevant action. As the received event of ID=X2 is defined in the action table ATB, the action manager AMG notifies the action and the parameter of the action table ATB to the action executer ACE.

The action executer ACE notifies the application system APS of the fact that the person PS-1 passed through the gate, and executes the action. Then, the application system APS receives the action result.

In addition, although an example of carrying out one action with one event generation has been described in the above, the setting may be made such that a certain action is carried out if two or more event generation conditions are satisfied, or the setting may be also made such that a plurality of actions are carried out with one event generation.

The event-action control described above may be executed in the directory server or may be executed in the data processing server, and it is preferable that this is set depending on the contents of the event and action. For example, if the decision of an event can be executed with the data stored in one data processing server, it is preferable that the event-action control is executed in the data processing server also in order to lighten the load on the directory server and the load on communication paths. On the other hand, if the data is distributed across a plurality of data processing servers, the event-action control may be executed in the directory server, or the determination of an event may be assigned to a certain data processing server.

<Distance Estimation Between Locator Node and Sensor Node>

Figure 34:
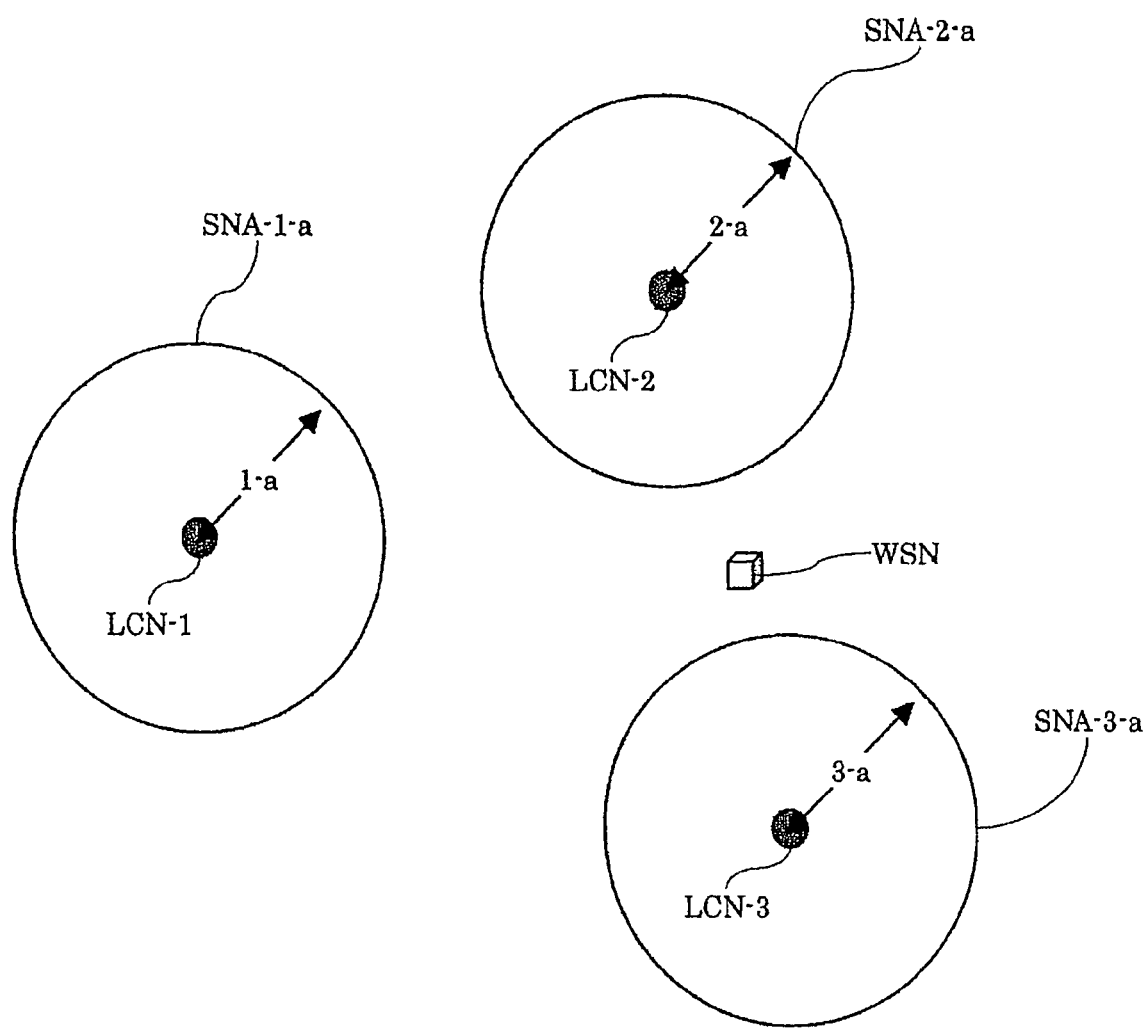
FIG. 34 is a view explaining an example of a method for setting detection areas of locator nodes.
Figure 35:
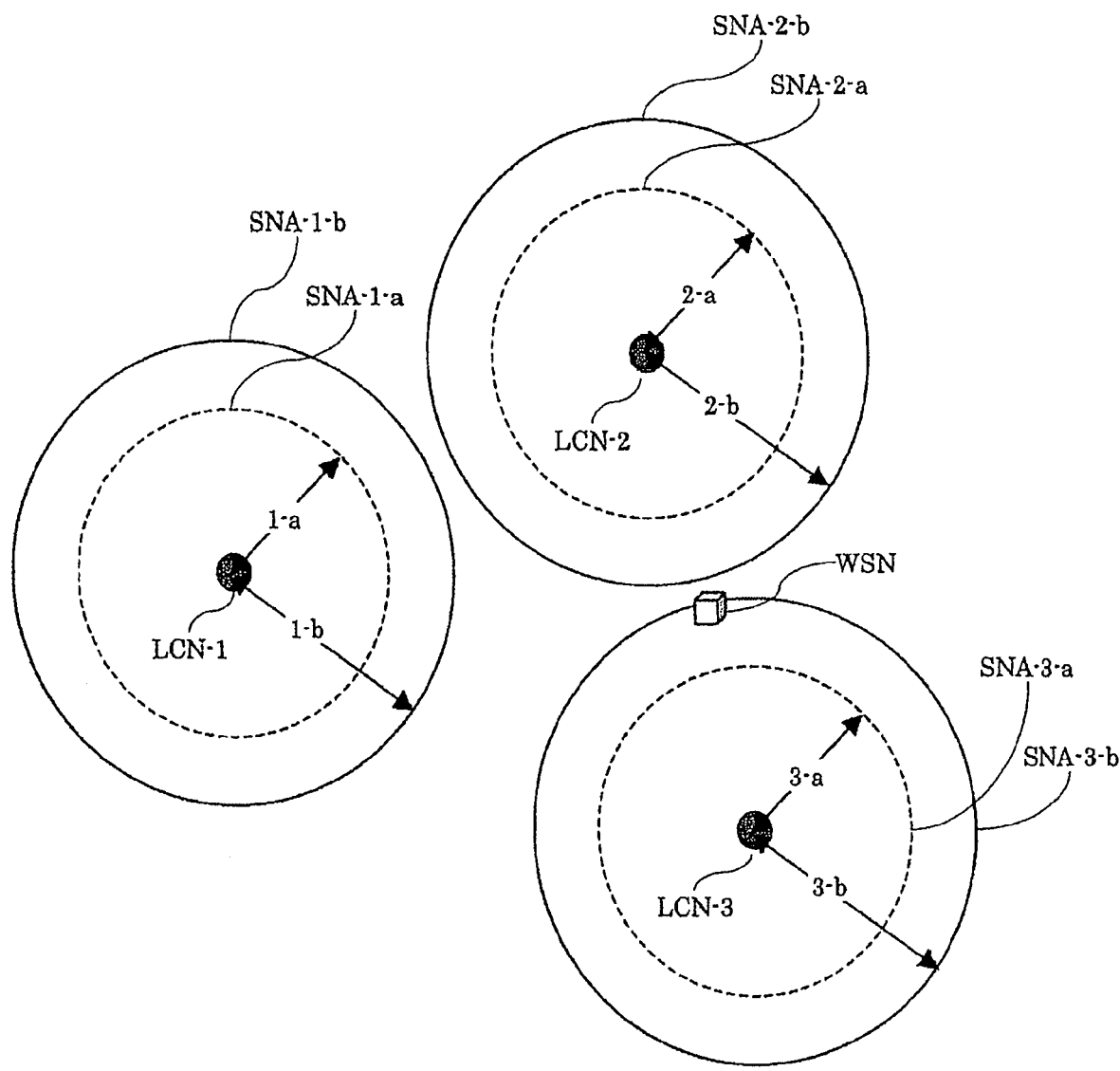
FIG. 35 is a view explaining an example of the method for setting the detection areas of the locator nodes.
Figure 36:
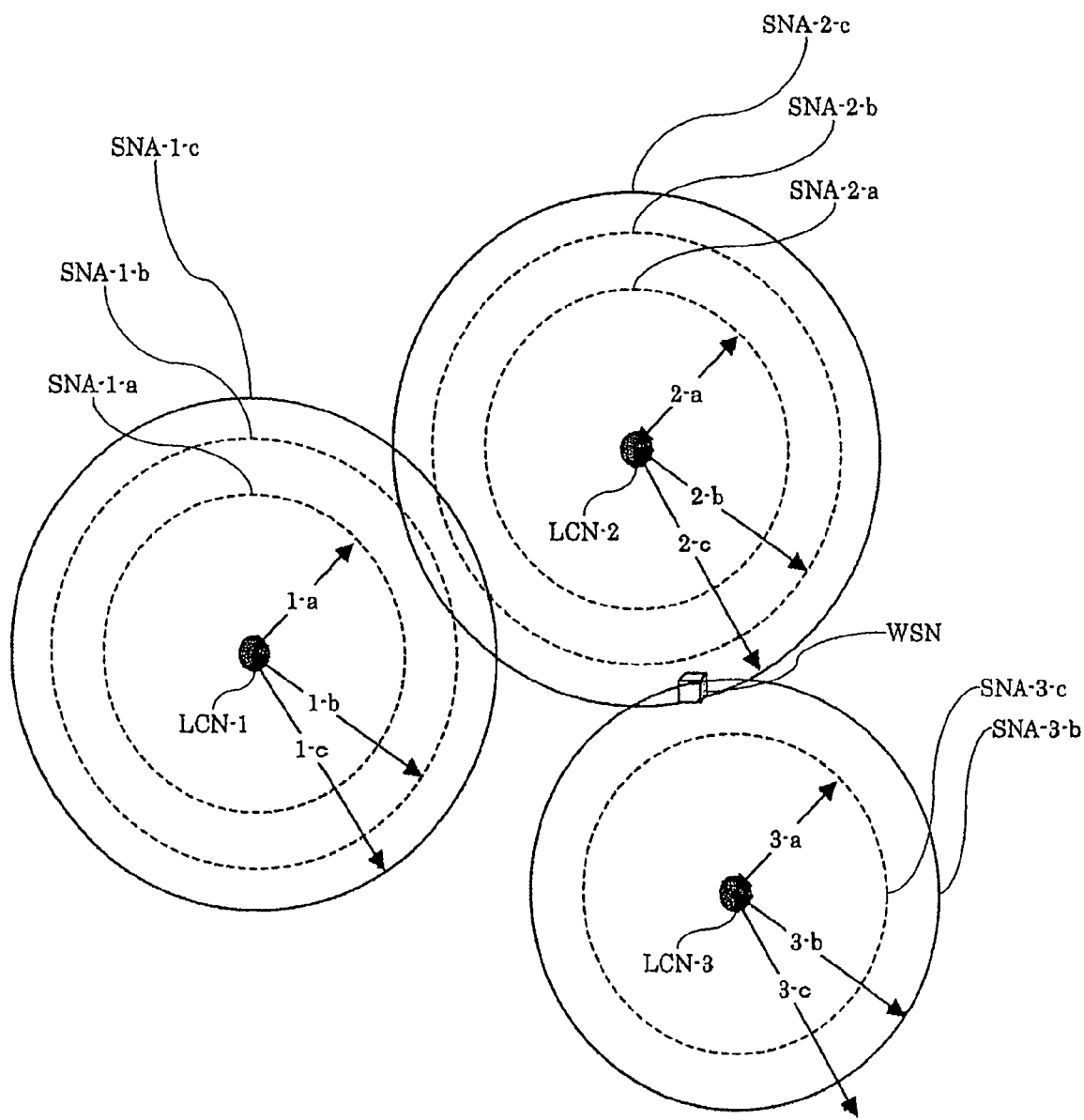
FIG. 36 is a view explaining an example of the method for setting the detection areas of the locator nodes.

FIGS. 34-36 are views explaining a method for setting the detection area SNA of the locator node LCN.

In FIG. 34, the locator nodes LCN-1 to LCN-3 are arranged and there is a wireless sensor node WSN. Assume that each locator node and the sensor node are connected to either one of the base stations belonging to the sensor-net system SNS. Now, assume that for the current detection areas SNA-1-*a*, SNA-2-*a* and SNA-3-*a* of the respective locator nodes LCN-1 to LCN-3, the detection radiuses are set to 1-*a*, 2-*a* and 3-*a*, respectively. In the state of FIG. 34, the sensor node WSN is not detected by the locator nodes LCN-1 to LCN-3 because it does not exist within the detection area of any locator node. However, if the communication with a base station has been already set, the data is transmitted to the base station from the sensor node, so that the sensor node connected through each layer of the base station BST, the distributed data processing server DDS, and the directory server DRS of the sensor-net system SNS, is managed, and thus the presence of WSN is known. In order to identify the position of the sensor node WSN in such situation, the detection radius of the detection area SNA is adjusted.

FIG. 35 shows a situation in which the detection radiuses of the detection area of the locator nodes LCN-1 to LCN-3 are extended to SNA-1-*b*, SNA-2-*b* and SNA-3-*b*, respectively. When the locator nodes LCN-1 to LCN-3 each did not detect the sensor node even over a "determination time of not detecting a node" preset by the locator nodes LCN-1 to LCN-3 each, the locator nodes LCN-1 to LCN-3 each extend the detection radius of the respective detection areas using a processing function preset in the controller CNT. In FIG. 35, the sensor node WSN is now within the detection area SNA-3-*b* of the locator node LCN-3 due to this processing, so that the locator node LCN-3 can detect the sensor node WSN. At this time, the distance between the sensor node WSN and the locator node LCN-3 can be estimated as in the range from 3-*a* to 3-*b*.

FIG. 36 shows a situation in which after extending the detection area at the timing of FIG. 35, the locator nodes LCN-1, LCN-2 having not yet detected the sensor node even over a respectively preset "determination time of not detecting a node" extends the detection area further. In FIG. 36, the sensor node WSN is now within the range of the detection area SNA-2-c of the locator node LCN-2, so that the locator node LCN-2 can detect the sensor node WSN. At this time, the distance between the sensor node WSN and the locator node LCN-2 can be estimated as in the range from 2-b to 2-c.

In a similar manner, LCN-1 also can extend the detection area until the sensor node WSN can be detected. As a result, if three or more locator nodes can detect one sensor node WSN simultaneously, the coordinate of the sensor node WSN can be calculated by carrying out trilateration using the estimated distances.

In contrast to the above-described method of extending the detection area, when the same sensor node or a plurality of sensor nodes are detected more than or equal to a specified frequency within a preset time period for each locator node, the detection area may be reduced until the sensor node can not be detected. In this case, the detection area radius with which the sensor node could be detected lastly is fixed to a set value.

Thus, if a series of detection area adjusting methods are carried out temporally continuously in an observation field where a plurality of sensor nodes exist, the detection areas of locator nodes in the observation field can be adjusted automatically.

The above-described adjustment itself of the detection area SNA of a locator node is carried out by the controller of each locator node controlling the wireless processor. A trigger for starting to adjust the detection area is provided by a locator node receiving a control command from the command manager of the distributed data processing server DDS through the base station BST. Moreover, the judgment of the necessity of adjustment of the detection radius such as extending or narrowing the detection area, and of the degree of adjustment are carried out in the event-action manager, and this decision result may be included in the above-described control command.

The distributed data processing server DDS registers, as an event, a condition that a detection signal of the sensor node is not received from any locator node belonging to a base station, to which this sensor node belongs, even after a predetermined time elapsed despite the event-action manager EAC confirmed that this sensor node is connected to the base station. Moreover, the distributed data processing server DDS registers an action of issuing a command for starting to adjust the detection area to a locator node through the command manager CMC-D. Then, the distributed data processing server DDS executes this action upon generation of this event.

Upon completion of the adjustment of the detection area, the locator node notifies the current set value of the detection area radius to the directory server DRS through the base station and the distributed data processing server DDS. The directory server DRS stores a positional accuracy of the detected sensor node in the model table for real world MTB shown in FIG. 24 as a real world model information based on the information on the detection area radius, and notifies this to the locator node through the distributed data processing server and the base station in accordance with a request from the application system APS.

In addition, in the case where a communication method is employed in which a command from a base station with respect to each locator node is transmitted to the locator node as a reply for transmission from the locator node to the base station, a command can not be received unless there is transmission from the locator node to the base station. Because a locator node usually waits in the sniff mode, it can receive a command only at the time of transmitting a node detection signal or a signal for release, except in the case where the communication mode and the sniff mode are configured to be operable in parallel as shown in FIG. 9 or 10. Then, a means for measuring the time during which the sensor node is not detected may be provided in each locator node, so that if the locator node did not detect a sensor node within a preset time, then it may transmit a "sensor node not-detecting signal" from the locator node to the base station so as to receive a command for instructing to adjust the detection area. Alternatively, the locator node can also start to adjust the detection area immediately without inquiring the host system.

In this case, a time measurement means may be provided in the locator node so as to synchronize by setting the timing for adjusting the detection area to a specific preset time and modify the detection area radius of a target locator node simultaneously. This allows all the target locator nodes to carry out the detection processing in a new detection area when the sensor node carries out communication, so that the adjustment can be completed promptly.

Moreover, if the target sensor node is the mobile sensor node MSN, the sensor node may move, and therefore, by changing the detection area radius simultaneously, all the locator nodes can carry out adjustment based on the same communication which the mobile sensor node transmitted, thus allowing more accurate adjustment of the detection area radius to be carried out.

<When a Plurality of Locator Nodes Detected a Sensor Node>

Figure 37:
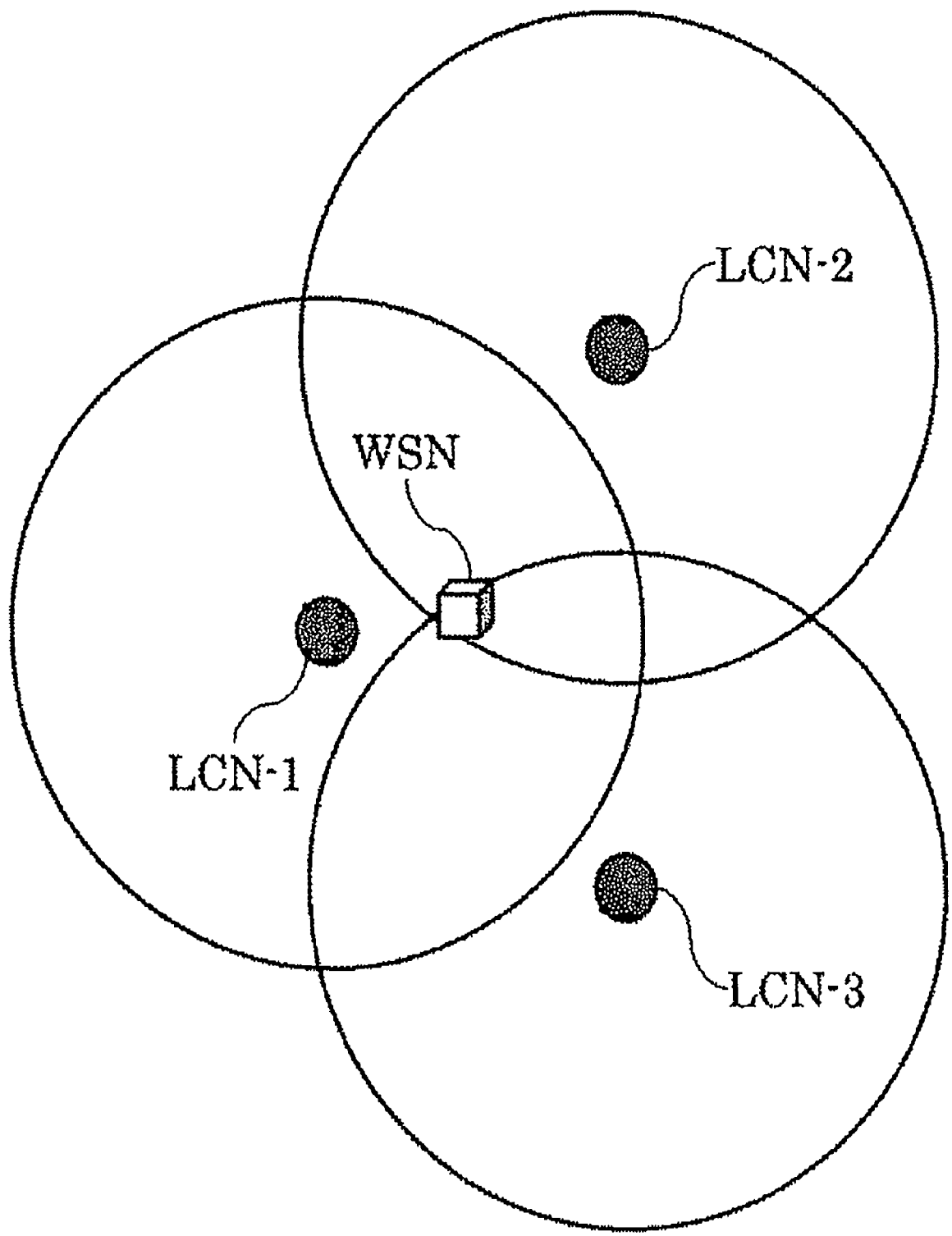
FIG. 37 is a view explaining an example of a selection method when a plurality of locator nodes detected a sensor node.

As shown in FIG. 37, when a plurality of locator nodes (e.g., LCN-1, LCN-2, LCN-3) detected one sensor node WSN, it is necessary to determine either one of the locator node positions as the position of the sensor node WSN. When more precise locationing is required, instead of regarding the position of a locator node as the position of a sensor node, it is also possible to estimate an intermediate position between the locator nodes by taking a weighted average with the radio field strength RSSI or the like being as a weighting factor. However, here, a method for selecting either one of the locator nodes is disclosed.

A first method is the method for providing a means for measuring RSSI of a transmission signal of a sensor node which each locator node sniffed, and for selecting a locator node with the RSSI of the largest absolute value.

Figure 38:
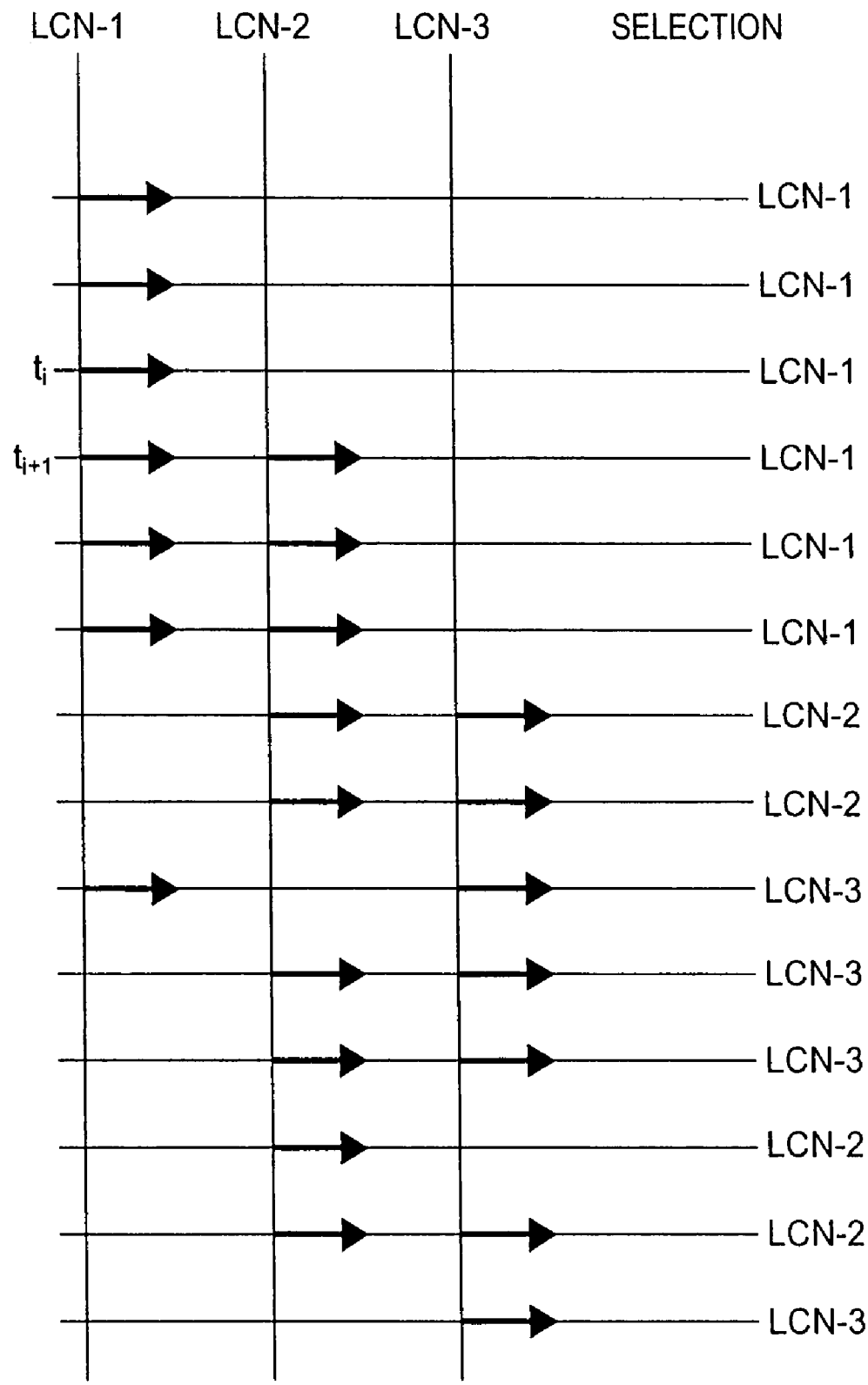
FIG. 38 is a view explaining an example of a selection method when a plurality of locator nodes detected the sensor node.

A second method is the method for determining based on the time continuity of detection of a sensor node by each locator node. FIG. 38 shows an example in which each of the locator nodes LCN-1 to LCN-3 detect the sensor node WSN for each time slot of each communication of the sensor node WSN. An arrow in the view indicates that the locator node detected the sensor node. When a plurality of locator nodes detected the sensor node, as shown in the view, a locator node with the highest number of slots, in which the sensor node has been detected continuously in the past seen from this time point, is selected. Accordingly, it is possible to prevent effects when a state of detecting the sensor node has changed abruptly due to passing or the like of an object that affects the radio wave propagation, such as passing of people. This judging process is carried out in the event-action manager of the distributed data processing server DDS. At this time, the detection history of the sensor node by a locator node is stored in the database DB in the disk DSK of the distributed data processing server as measured data/attribute. In addition, the first method and second method may be used in combination. Moreover, as previously described, the detection area of each locator node may be reduced so that only one locator node may detect the sensor node.

<Operation Timing of a Locator Node>

A locator node is assumed to wait in the node sniffing mode for sniffing the communication of the sensor node except when carrying out communication with a base station. Accordingly, usually, the wireless processor always operates, thus resulting in an increase in power consumption. For this reason, a long-time continuous operation with a small battery or the like is difficult. Then, a method for reducing the power consumption of a locator node is disclosed.

A first method is the method of changing to the node sniffing mode in synchronization with the timing when a sensor node carries out communication, and otherwise sleeping. Depending on the protocol of wireless communication, the timing when nodes belonging to the same PAN carry out communication synchronously is adjusted. For example, in the ZigBee wireless standard, a device called a coordinator for adjusting the entire PAN transmits a beacon signal periodically, and other nodes carry out communication only during the period specified by the beacon signal. In case of using such communication method, a locator node also just needs to sniff the communication of the sensor node only during the communication period specified by the beacon signal, so that by sleeping in periods except this period, power consumption can be saved.

A second method for reducing the power consumption of a locator node is the method for detecting that the sensor node carries out communication by a certain means, and then changing to the node sniffing mode by this detection result being a trigger. For example, just before carrying out communication, the sensor node activates an actuator ATT which the sensor node itself has, e.g., a loudspeaker, an infrared LED or the like, to transmit information, such as outputted sound, beam or the like. A locator node detects this information by a detection means which the locator node has.

Figure 39:
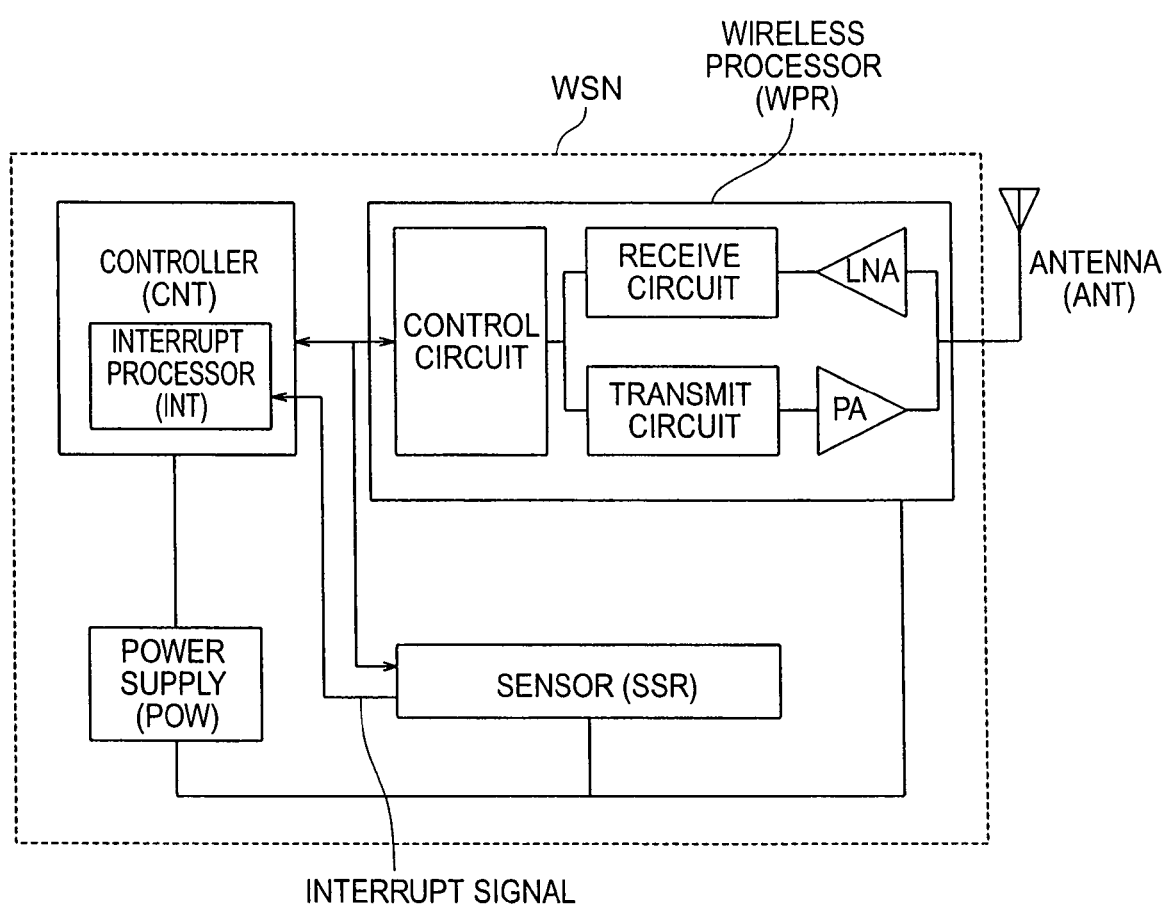
FIG. 39 is a view showing a configuration example of a locator node with a sensor.

FIG. 39 shows a configuration example of a locator node in case of applying this method. In FIG. 39, a sensor SSR is added to the configuration example of the locator node described in FIG. 7. The sensor SSR is supplied with power from the power supply POW, and has a function to transmit an interrupt signal to the controller CNT when sensing an amount of information sufficient for detecting a sensing target, for example, such as, when a sensor for sensing a sound pressure from a microphone or the like sensed a sound exceeding a predetermined sound pressure level, or when an infrared receiving sensor such as a photodiode detected a predetermined light quantity. The controller CNT changes the locator node to the node sniffing mode when an interrupt signal processor INT received this interrupt signal. If the power consumption of a sensor is sufficiently low and functions except the functions required for receiving the interrupt signal and changing to the node sniffing mode can be stopped, the power consumption of the sensor node can be reduced. The examples of the sensor SSR include: for example, a human sensor and a microwave sensor for detecting the motion of a mobile object; a microphone for detecting audible sound or ultrasonic wave or the like which a sensor node outputs from a loudspeaker immediately before communication; and a photodiode or a photo transistor, or the like for receiving light which a node causes an infrared LED to emit immediately before communication. In addition, although here, only an example of adding a sensor to the configuration of FIG. 7 has been described, it is apparent that the sensor can be added to the configurations of FIGS. 8-10 in a similar manner.

<Other Application Methods of Locator Node Function>

Although the function of a locator node disclosed hereto is assumed to be realized basically using a dedicated hardware, the function of the locator node can be realized with an ordinary sensor node configuration. Accordingly, for example, a stationary sensor node installed in an observation field for use can be used as the locator node, or a transponder of a radio multihop network or a mesh network, or a wireless processor of a base station can be used as the locator node. Moreover, the mobile sensor node MSN can be also used as the locator node.

Accordingly, by moving with a mobile sensor node, it is possible to identify the installation position of a stationary sensor node. In this case, for example, a locationing means, such as GPS, is provided in the mobile sensor node, and the position of the mobile sensor node when detecting the stationary sensor node is measured by GPS and is transmitted to a base station together with the ID information of the stationary sensor node, thereby identifying the position of the stationary sensor node. Moreover, if another mobile sensor node is detected by the mobile sensor node, this can be utilized as information of the presence of people.

In addition, the process flow in this embodiment is configured as a program, so that each manager and each processor can carry out by reading the program from a computer.

Although examples of the present invention have been described hereto, it should be understood by those skilled in the art that the present invention is not limited to the above-described embodiments, and that various modifications are possible and the above-described embodiments each can be combined suitably.

As described above, according to the present invention, it is possible to identify the position of mobile objects, such as people, commodities, animals, in the fields of: the security management for behavior of people in buildings, urban areas, or the like; the commodities control in the distribution process in warehouses, stores, or the like; the health and safety management of people in medical facilities or homes; the condition monitoring of pets or livestock, and the like. Therefore, it is possible to precisely grasp the situation of breaking into a restricted entry area by a facility worker, of tracing a distribution channel of commodities, of checking a patient's location, or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sensor-net system, comprising: a node including a sensor for obtaining a sensing data, a first controller that generates a first transmit data including the sensing data and a node ID information, and a first wireless processor that transmits the first transmit data to a base station; a locator node including a second wireless processor that sniffs a transmit data from the node to the base station when the node exists in a detection area of the locator node, and a second controller that extracts a node ID information from the transmit data and generates a second transmit data including the extracted node ID information and a locator node ID information; a base station including a node communication processor that receives the first transmit data and extracts the first node ID information when the node exists in a communication area of the base station, and receives the second transmit data and extracts the extracted node ID information and the locator node ID information when the second transmit data is transmitted from the locator node, and a node manager that transmits to a server the ID information extracted from at least one of the first transmit data and the second transmit data; and a server including an event-action manager that receives the ID information, a recording part that records in a locator node position table that relates the locator node ID information to a position of the locator node, and a database manager that identifies the position of a node existing in at least one of the detection area and the communication area, using the received ID information and the locator node position table.

2. The sensor-net system according to claim 1, wherein
when the node exists within a communication area of the base station and within a detection area of the locator node,
the node communication processor receives the first and second transmit data, and
when the first and the second node ID information are the same, the database manager regards the position of the locator node as the position of the node and relates the position of the node to the sensing data.

3. The sensor-net system according to claim 2, wherein
the node communication processor converts, using an address conversion table, the first and second node ID information into first and second node global addresses indicative of the node ID in the sensor-net system, and the locator node ID information into a locator node global address indicative of the ID of the locator node in the sensor-net system,
the node manager transmits the first and second node global addresses and the locator node global address to the event-action manager,
the event-action manager receives the first and the second node global addresses and the locator node global address, and
when the first and second node global addresses are the same, the database manager relates the locator node global address to the position of the locator node.

4. The sensor-net system according to claim 3, wherein
the server manages a plurality of base stations,
the plurality of base stations each have a network ID that identifies a network comprising the base station, a node and a locator node which the base station manages,
the node ID information and the locator node ID information include a network ID of a network to which the node and the locator node belong, and
when the respective network IDs of the node and the locator node extracted from the node ID information and the locator node ID information are the same as a network ID of the base station, the respective node communication processors of the plurality of above-described base stations carry out the above-described conversion.

5. The sensor-net system according to claim 1, wherein
when the node exists within a communication area of the base station and does not exist within a detection area of the locator node,
the node communication processor receives the first transmit data,
the event-action manager determines that the second node ID information that is the same as a received first node ID information does not exist,
the command manager transmits to the sensor node manager an instruction for changing the detection area, wherein the second wireless processor receives the instruction through the node communication processor, and
the second controller controls the second wireless processor based on the instruction, and thereby the second wireless processor sniffs the first transmit data.

6. The sensor-net system according to claim 1, wherein
when a node exists in a area where detection areas of a plurality of locator nodes overlap to each other, and
when the plurality of locator nodes sniff a transmit data from the node to the base station,
the database manager selects one locator node based on a history that the plurality of locator nodes that are recorded in the recording part detected the node, and identifies the position of the node based on a locator node ID information of the selected locator node.

7. The sensor-net system according to claim 1, wherein
the locator node includes a sniff mode for sniffing the transmit data, a detection processing mode for extracting the node ID information, and a communication mode for transmitting the second transmit data, and
when the locator node sniffs the transmit data in the sniff mode by the second controller controlling the second wireless processor, it changes to the detection processing mode, and when the locator node extracts the node ID information, it changes to the communication mode, and after transmitting the second transmit data, the locator node changes to the sniff mode.

8. The sensor-net system according to claim 7, wherein
when the locator node extracts the same node ID information within a predetermined time in the detection processing mode after changing to the sniff mode, it changes to the sniff mode, and
when the locator node did not extract the same node ID information within the predetermined time from the latest time point that it extracted the same node ID information, it transmits to the base station an information indicative of departure from the detection area of the node.

9. The sensor-net system according to claim 1, wherein
when a radio field strength of radio wave with which the second wireless processor sniffed the transmit data exceeds a predetermined value,
the second controller extracts the second node ID information from the sniffed transmit data.

10. The sensor-net system according to claim 1, wherein
the second wireless processor includes an amplifier for amplifying a radio field strength of receiving radio wave,
the amplifier amplifies a radio field strength of radio wave, with which the second wireless processor sniffed the transmit data, with a predetermined amplification factor, and
the second controller extracts the second node ID information from the sniffed transmit data when the amplified radio field strength exceeds a predetermined value.

11. The sensor-net system according to claim 7, wherein
the node further includes an actuator that generates a predetermined information before transmitting the first transmit data, and
the locator node detects the predetermined information by means of a detection unit and starts the sniff mode.

12. A sensor-net locationing program stored on a computer readable medium for causing a locator node to execute a sensor-net locationing method, the program causing the locator node to execute steps of: when a node exists in a detection area of the locator node, sniffing a first transmit data including a sensing data and node ID information that are transmitted from the node to a base station; extracting the node ID information from the first transmit data, and generating a second transmit data including the extracted node ID information and locator node ID information; and with the use of the first transmit data, the first node ID information extracted from the second transmit data, the extracted node ID information and the locator node ID information, and a locator node position table that relates the locator node ID information to the position of the locator node, transmitting the generated second transmit data to a base station connected to a server that relates the position of the node to the sensing data.

13. The sensor-net locationing program stored on a computer readable medium according to claim 12, wherein the locator node has a sniff mode for sniffing the transmit data, a detection processing mode for extracting the node ID information, and a communication mode for transmitting the second transmit data, the program causing the locator node to execute step of changing to the detection processing mode upon sniffing the transmit data in the sniff mode, changing to the communication mode upon extraction of the node ID information, and changing to the sniff mode after transmitting.

14. The sensor-net locationing program stored on a computer readable medium according to claim 13, the program causing the locator node to execute steps of: changing to the sniff mode when the locator node extracts the same node ID information within a predetermined time in the detection processing mode after changing to the sniff mode; and transmitting to the base station an information indicative of departure from the detection area of the node when the locator node does not extract the same node ID information within the predetermined time from the latest time point that the locator node extracted the same node ID information.

15. The sensor-net locationing program stored on a computer readable medium according to claim 12, the program causing the locator node to execute step of when a radio field strength of radio wave with which the locator node sniffed the transmit data exceeds a predetermined value, extracting the second node ID information from the sniffed transmit data.

16. The sensor-net locationing program stored on a computer readable medium according to claim 12, the program causing the locator node to execute steps of: amplifying a radio field strength of radio wave, with which the locator node sniffed the transmit data, with a predetermined amplification factor; and extracting the second node ID information from the sniffed transmit data when the amplified radio field strength exceeds a predetermined value.

17. The sensor-net locationing program stored on a computer readable medium according to claim 13, the program causing the locator node to execute step of detecting predetermined information and starting the sniff mode before the first transmit data is transmitted in the node.

18. A sensor-net locationing program stored on a computer readable medium for causing a base station to execute a sensor-net locationing method, the program being for causing the base station to execute steps of: receiving a first transmit data including a sensing data and a first node ID information transmitted from a node, and a second transmit data including a extracted node ID information and a locator node ID information transmitted from a locator node; and with the use of an ID information extracted from the first and second transmit data, and a locator node position table that relates the locator node ID information to a position of the locator node, transmitting the ID information to a server that relates the position of the node to the sensing data.

19. The sensor-net locationing program stored on a computer readable medium according to claim 18, the program causing the base station to execute steps of: converting the first and second node ID information into first and second node global addresses indicative of an ID of the node in a sensor-net system, and converting the locator node local address into a locator node global address indicative of an ID of the locator node in the sensor-net system; and when the first and second node global address are the same, transmitting the first an second node global addresses and the locator node global address to the server that relates the locator node global address to the position of the locator node.

20. The sensor-net locationing program stored on a computer readable medium according to claim 19, wherein the server manages a plurality of base stations, the plurality of base stations each have a network ID that identifies a network comprising the base station, a node and a locator node which the base station manages, the node ID information and the locator node ID information include a network ID of a network to which the node and the locator node belong, and when the respective network ID's of the node and the locator node extracted from the node ID information and the locator node ID information are the same as a network ID of the base station, the plurality of above-described base stations each carry out the above-described conversion.

* * * * *